(12) United States Patent
Koyama et al.

(10) Patent No.: US 6,188,529 B1
(45) Date of Patent: Feb. 13, 2001

(54) PROJECTING APPARATUS FOR A HIGH-RESOLUTION COLOR LIQUID CRYSTAL PROJECTOR

(75) Inventors: Osamu Koyama, Hachioji; Junko Kuramochi, Yokohama; Saburo Sugawara, Kawasaki, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/290,498

(22) Filed: Apr. 12, 1999

Related U.S. Application Data

(62) Division of application No. 08/965,049, filed on Nov. 5, 1997, now Pat. No. 5,999,335.

(30) Foreign Application Priority Data

Nov. 6, 1996 (JP) .................................................. 8-310025
Nov. 11, 1996 (JP) .................................................. 8-314241
Nov. 18, 1996 (JP) .................................................. 8-322283

(51) Int. Cl.$^7$ .............................. G02B 9/00; G02B 27/10; G02B 21/26; G02B 21/14
(52) U.S. Cl. ........................... 359/738; 359/618; 353/37; 353/97
(58) Field of Search ..................................... 359/618, 638, 359/738, 739, 740; 353/34, 37, 97; 349/5–9

(56) References Cited

U.S. PATENT DOCUMENTS

| | | | |
|---|---|---|---|
| 5,467,207 | * 11/1995 | Forkner et al. | 359/40 |
| 5,623,349 | 4/1997 | Clarke | 349/8 |
| 5,651,598 | 7/1997 | Yoshida et al. | 353/37 |

* cited by examiner

Primary Examiner—Ricky Mack
(74) Attorney, Agent, or Firm—Morgan & Finnegan, LLP

(57) ABSTRACT

This invention is to provide a projecting apparatus which focuses a plurality of color light components through a lens, illuminates reflection optical modulation elements arranged in units of color light components through a first deflection unit provided near a position where the color light components are focused, guides a light beam from at least one optical modulation element to a projection optical system through a second deflection unit, and superposes and projects pieces of image information based on the optical modulation elements on a predetermined surface through the projection optical system, wherein the second deflection unit is arranged near the stop of the projection optical system to divide the aperture of the stop into a plurality of areas, the first deflection unit is arranged near the stop of the projection optical system, and the optical modulation elements are illuminated with light beams tilted in a direction of division of the stop aperture and in a direction perpendicular to the direction of division.

40 Claims, 44 Drawing Sheets

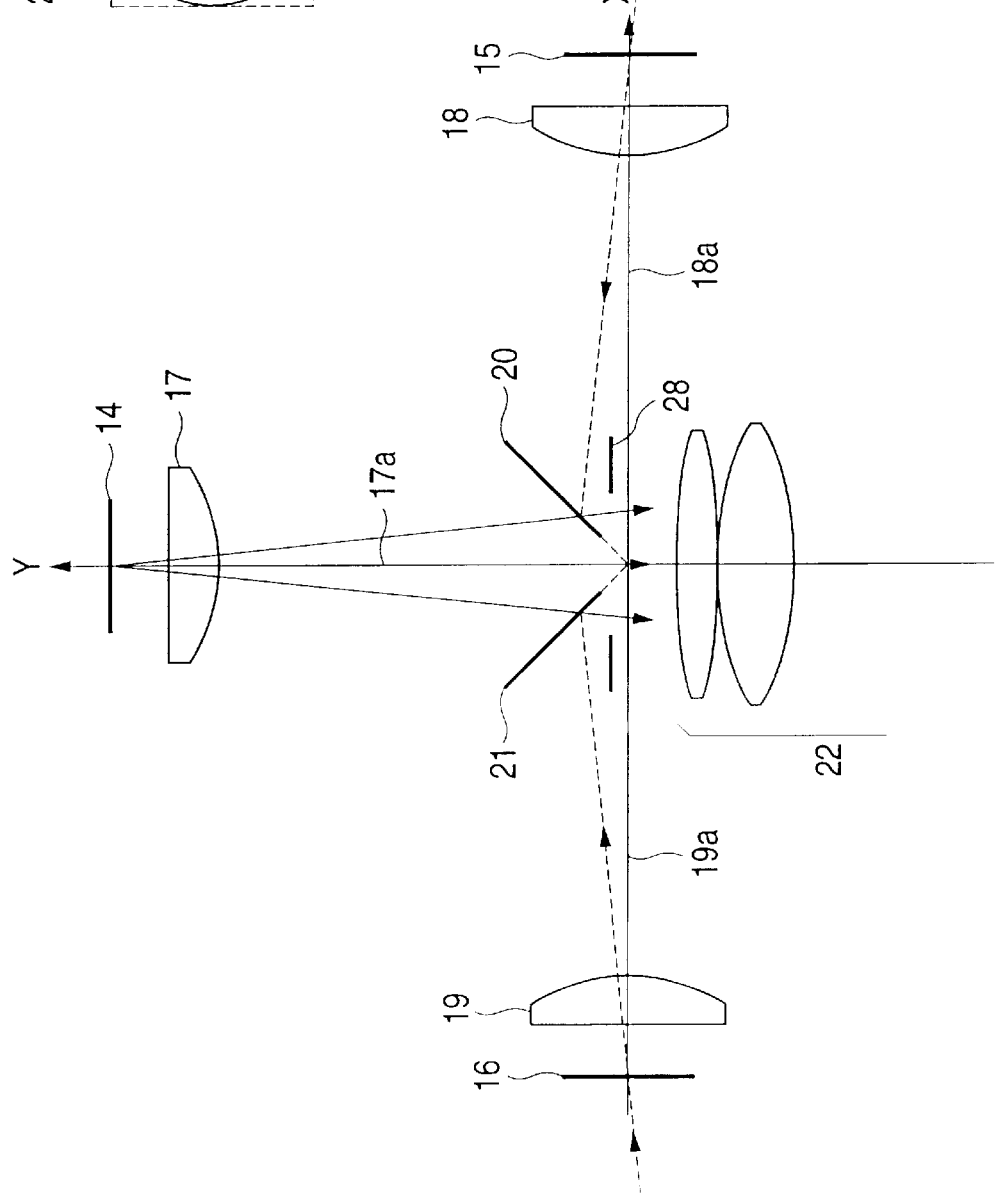
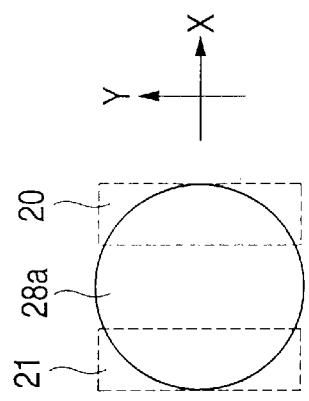
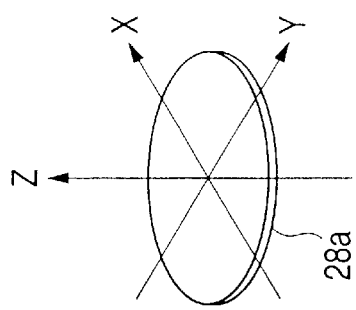

3-1

3-2

ARROW 3-2'

3-2'

PROJECTING APPARATUS FOR A HIGH-RESOLUTION COLOR LIQUID CRYSTAL PROJECTOR

This is a divisional of prior application Ser. No. 08/965,049 now U.S. Pat. No. 5,999,335 filed Nov. 5, 1997.

BACKGROUND OF THE INVENTION

1. Field of the Invention

The present invention relates to a projecting apparatus suitable for, e.g., a color liquid crystal projector for enlarging and projecting image information displayed on one or a plurality of optical modulation elements such as liquid crystal panels on a screen or the like.

2. Related Background Art

A variety of color liquid crystal projectors for projecting image information displayed on a liquid crystal panel as an optical modulation element on a screen are conventionally proposed. An optical system for a liquid crystal projector using a transmission liquid crystal is proposed, i.e., Japanese Laid-Open Patent Application No. 61-99118. FIG. 1 is a view schematically showing the optical system of this prior art.

Referring to FIG. 1, light emitted by a light source 1 is roughly collimated by a reflector 2 (parabolic mirror) and incident on a dichroic mirror 34 which transmits the blue light component (B light component) and reflects the green light component (G light component) and the red light component (R light component). The C and R light components reflected by the dichroic mirror 34 enter a dichroic mirror 35 which reflects the green light component (G light component) and transmits the red light component (R light component). The green light component reflected by the dichroic mirror 35 illuminates a liquid crystal panel 14 for G light, and the red light component transmitted through the dichroic mirror 35 illuminates a liquid crystal panel 15 for R light. The blue light component transmitted through the dichroic mirror 34 illuminates a liquid crystal panel 16 for B light.

The light beams transmitted through the liquid crystal panels 14, 15, and 16 are modulated in accordance with image information in units of colors. The light beams from the liquid crystal panels 14 and 16 are synthesized by a dichroic mirror 37 which transmits a blue light component and reflects a green light component. The red light component from the liquid crystal panel 15 passes through a mirror 38 and reaches a dichroic mirror 39 which transmits a red light component and reflects blue and green light components.

The red, blue, and green light components are synthesized by the dichroic mirror 39 into a full-color image. This full-color image is projected on a screen 23 through a projection optical system 48. The liquid crystal panels 14 to 16 use, e.g., a twisted nematic (TN) liquid crystal or a super twisted nematic (STN) liquid crystal.

FIG. 2 is a view schematically showing an optical system for a color liquid crystal projector using a transmission liquid crystal proposed in Japanese Laid-Open Patent Application No. 1-131593.

Referring to FIG. 2, light emitted by a light source 1 is roughly collimated by a reflector 2 (parabolic mirror) and incident on a dichroic mirror 34' which reflects a blue light component (B light component) and transmits a green light component (G light component) and a red light component (R light component). The light components transmitted through the dichroic mirror 34' are incident on a dichroic mirror 35' which transmits the green light component and reflects the red light component. The green light component transmitted through the dichroic mirror 35' illuminates a liquid crystal panel 14 for green, and the red light component reflected by the dichroic mirror 35' illuminates a liquid crystal panel 15 for red through mirrors 38 and 41. The blue light component reflected by the dichroic mirror 34' illuminates a liquid crystal panel 16 for blue through mirrors 36 and 40.

The light beams transmitted through the liquid crystal panels 14, 15, and 16 are modulated in accordance with image information in units of colors. The light beams reach a cross dichroic prism 42 and synthesized into a full-color image. The cross dichroic prism 42 is formed by crossing a dichroic mirror for transmitting a green light component and reflecting a blue light component and a dichroic mirror for transmitting a green light component and reflecting a red light component. The full-color image synthesized by the cross dichroic prism 42 is projected on a screen 23 through a projection optical system 48.

FIGS. 3 and 4 are views schematically showing color projectors each using an optical system for synthesizing a full-color image without using a plurality of flat dichroic mirrors or prisms, which are proposed in Japanese Laid-Open Patent Application No. 4-428.

In FIG. 3, transmission liquid crystal panels 14, 15, and 16 are illuminated with light beams in corresponding wavelength bands. Light beams transmitted through the liquid crystal panels and modulated according to image information in units of colors are brought to a focus near the stop of a projecting lens 48 through field lenses 45, 46, and 47 arranged behind the liquid crystal panels. Tilted mirrors 20 and 21 are inserted near the stop of the projecting lens 48 at an interval. The light beam transmitted through the liquid crystal panel 14 passes between the two mirrors.

The liquid crystal panel 15 and the field lens 46 are decentered from each other by a distance s and so are the liquid crystal panel 16 and the field lens 47. The light beam transmitted through the liquid crystal panel 15 is deflected through the field lens 46 and reflected by the mirror 20. Similarly, the light beam transmitted through the liquid crystal panel 16 is deflected through the field lens 47 and reflected by the mirror 21. The color light components are transmitted through the projecting lens 48, synthesized into a full-color image, and projected on a screen 23.

In FIG. 4, the positions of each liquid crystal panel and a corresponding field lens are reversed to those in FIG. 3. In this case as well, a liquid crystal panel 15 and a field lens 46' are decentered from each other by a distance s', and so are a liquid crystal panel 16 and a field lens 47'. The light beam deflected through the field lens 46' is focused, transmitted through the liquid crystal panel 15, and reflected by a mirror 20.

Likewise, the light beam deflected through the field lens 47' is focused, transmitted through the liquid crystal panel 16, and reflected by a mirror 21. The color light components are transmitted through a projecting lens 48, synthesized into a full-color image, and projected on a screen 23.

FIG. 5 is a view schematically showing an optical system for a color liquid crystal projector using the reflection liquid crystal proposed in Japanese Laid-Open Patent Application No. 6-265842. This optical system is called a Schlieren optical system.

Referring to FIG. 5, light emitted by a light source 1 is roughly collimated by a reflector 2 (parabolic mirror), reflected by a mirror 36, and condensed through a condenser lens 4 to form a light source image near a reflection mirror 43 arranged at the position of the aperture stop of a projecting lens 48. The light beam is reflected by the reflection mirror 43 toward a plano-convex lens 44, collimated by the plano-convex lens 44, and separated into three colors by a cross dichroic prism 42. The three color light components respectively illuminate reflection liquid crystal panels 25, 26, and 27 of the corresponding wavelength bands.

The light beams modulated by the reflection liquid crystal panels 25 to 27 are synthesized into a full-color image by the cross dichroic prism 42. The full-color image is focused by the plano-convex lens 44, passes through a stop 28, and is projected on a screen 23 through the projecting lens 48.

A liquid crystal, e.g., a polymer dispersed liquid crystal is sealed in each liquid crystal panel. When the white level is to be displayed, the liquid crystal panel becomes transparent to reflect an incoming light beam. In displaying the black level, it scatters the light beam. The light components reflected by the liquid crystal panels and synthesized by the cross dichroic prism 42 are focused near the stop 28 of the projecting lens 48 through the plano-convex lens 44. Most light components reflected by the liquid crystal panels pass through the aperture of the stop 28 to display the white level on the screen 23 through the projecting lens 48. However, only a few of light beams scattered by the liquid crystal panels pass through the aperture of the stop 28 to display the black level on the screen 23.

Image information is displayed using scattering in liquid crystal panels and displayed on the screen through the projecting lens.

The conventional color liquid crystal projectors shown in FIGS. 1 to 5 have the following problems.

The optical system shown in FIG. 1 cannot achieve color separation and synthesis without four dichroic mirrors (34, 35, 37, and 38) which are hard to manufacture. Additionally, the flat dichroic mirrors 39 and 37 must be arranged tilted between the projecting lens 48 and the liquid crystal panels 15 and 16, respectively. Astigmatism generated by the dichroic mirrors 37 and 39 degrades the projected image. If the resolution of the liquid crystal panel is low, the astigmatism can be ignored, but it is a problem in a high-resolution liquid crystal projector.

The color liquid crystal projector shown in FIG. 2 solves the above problem of astigmatism. In FIG. 2, the cross dichroic prism 42 is used in the color synthesis optical system, thereby preventing astigmatism. However, the cross dichroic prism 42 is more difficult to manufacture than the flat dichroic mirrors used in the color synthesis optical system shown in FIG. 1. This is because the prism vertical angle process accuracy, prism joint accuracy, prism refractive index, and the like must be strictly managed to prevent the projected image from being discontinuous at the four prism joint portions.

To obtain desired characteristics, the dichroic mirror film must have a multilayered structure having a larger number of layers than that of the flat dichroic mirror. This also results in difficulty in manufacturing.

In the color projectors shown in FIGS. 3 and 4, the color synthesis optical system has no cross dichroic prism. In the optical system shown in FIG. 3, however, the liquid crystal panel 15 and the field lens 46 are decentered from each other by the distance s, and so are the liquid crystal panel 16 and the field lens 47. For this reason, distortion due to this decentering poses a problem. The distortion makes it difficult to match the pixels of the three liquid crystal panels on the entire image. For this reason, this optical system is not fitted for application to a high-resolution liquid crystal projector used as, e.g., a computer monitor.

In the optical system shown in FIG. 4, the liquid crystal panels are arranged in the focused light beam. Therefore, the incident angle of illumination light changes depending on the position of the liquid crystal panel, resulting in contrast variations or color variations in the projected image. In addition, as no field lens is inserted between each liquid crystal panel and the projecting lens 48, distortion and curvature of field of the projecting lens are hard to correct. For this reason, again this optical system is not fitted for application to a high-resolution liquid crystal projector used as, e.g., a computer monitor.

In the color liquid crystal projector shown in FIG. 5, the transparent type liquid crystal in FIG. 2 is replaced with a reflection liquid crystal. The cross dichroic prism 42 is used not only as a color separation optical system but also as a color synthesis optical system, so the flat dichroic mirrors 34' and 35' can be omitted. However, this apparatus also uses the cross dichroic prism which is hard to manufacture.

Each of the color liquid crystal projectors shown in FIGS. 3 and 4 synthesizes three color light components through the entrance pupil of the projecting lens 48 and guides the synthesized light to the projecting lens 48. However, the color balance on the screen 23 depends on the arrangement of the mirrors 20 and 21. Since it is difficult to accurately arrange the mirrors 20 and 21, the color balance on the screen is unsatisfactory.

In the general projecting apparatus such as a color liquid crystal projector, the light amount distribution on the screen for the respective channels of the red light component (R light component), the green light component (G light component), and the blue light component (B light component) must be unified. However, the solid angles of the mirrors 20 and 21 subtended at given points on the liquid crystal panels 15 and 16 differ, so no uniform light amount distribution can be attained.

Also, various single plate projecting apparatuses using, as an optical modulation-element, an optical modulation element using a liquid crystal to project color image information on a predetermined surface are proposed. In the single plate color optical modulation element using an optical modulation element comprising a liquid crystal, the black matrix for shielding, from light, the interconnection of an optical modulation control portion around the pixels of the optical modulation element (liquid crystal) has a large occupied area in the optical modulation element. This lowers the light utilization efficiency of the entire apparatus.

FIG. 63 is a view schematically showing such an optical modulation device 1200 using a liquid crystal to improve the light utilization efficiency. In FIG. 63, a microlens array 1121 is arranged in front of color filers 1151R, 1151G, and 1151B to focus illumination light W from a white light source onto the B, G, and R pixels of an optical modulation element 1120. With this arrangement, the light utilization efficiency of the optical modulation element 1200 is raised. This element also has a transparent substrate 1122 and a black matrix 1205 (FIG. 63).

The optical modulation element shown in FIG. 63 uses color filters as members for extracting color light components corresponding to the pixels of each optical modulation element. However, each color filter transmits only a light component having a predetermined wavelength in white light incident on each pixel, and therefore is useless for other wavelength components, so the light utilization efficiency is very low.

SUMMARY OF THE INVENTION

It is an object of the present invention to provide a projecting apparatus suitable for a high-resolution color liquid crystal projector used as, e.g., a computer monitor.

According to the present invention, there is provided a first projecting apparatus which focuses a plurality of color light components through lens means, illuminates reflection optical modulation elements arranged in units of color light components through first deflection means provided near a position where the color light components are brought to a focus, guides a light beam from at least one optical modulation element to a projection optical system through second deflection means, and superposes and projects pieces of image information based on the optical modulation elements on a predetermined surface through the projection optical system, wherein the second deflection means is arranged near a stop of the projection optical system to divide an aperture of the stop into a plurality of areas, the first deflection means is arranged near the stop of the projection optical system, and the optical modulation elements are illuminated with light beams tilted in a direction of division of the stop aperture and in a direction perpendicular to the direction of division.

According to the present invention, there is also provided a second projecting apparatus which illuminates optical modulation elements arranged in units of color light components with a plurality of color light components through optical means, guides a light beam based on at least one optical modulation element to a projection optical system through second deflection means, and superposes and projects pieces of image information based on the optical modulation elements on a predetermined surface through the projection optical system, wherein the second deflection means is arranged near a stop of the projection optical system to divide an aperture of the stop into a plurality of areas, and the optical means illuminates at least one optical modulation element with a light beam tilted in a direction of division of the stop aperture.

According to the present invention, there is also provided a third projecting apparatus which illuminates optical modulation elements arranged in units of color light components with a plurality of color light components through optical means, guides a light beam based on at least one optical modulation element to a projection optical system through second deflection means, and superposes and projects pieces of image information based on the optical modulation elements on a predetermined surface through the projection optical system, wherein a central axis of each optical modulation element matches an optical axis of a corresponding lens, the second deflection means is arranged near a stop of the projection optical system to divide an aperture of the stop into a plurality of areas, and the optical means illuminates at least one optical modulation element with a light beam tilted in a direction of division of the stop aperture.

According to the present invention, there is also provided a fourth projecting apparatus which illuminates reflection optical modulation elements arranged in units of color light components with a plurality of color light components through optical means, guides a light beam based on at least one optical modulation element to a projection optical system through second deflection means, and superposes and projects pieces of image information based on the optical modulation elements on a predetermined surface through the projection optical system, wherein the second deflection means is arranged near a stop of the projection optical system to divide an aperture of the stop into a plurality of areas, and the optical means illuminates at least one optical modulation element with a light beam tilted in a direction of division of the stop aperture and in a direction perpendicular to the direction of division.

According to the present invention, there is also provided a fifth projecting apparatus which illuminates reflection optical modulation elements arranged in units of color light components with a plurality of color light components through optical means, guides a light beam based on at least one optical modulation element to a projection optical system through second deflection means, and superposes and projects pieces of image information based on the optical modulation elements on a predetermined surface through a stop aperture and the projection optical system, wherein a member of the optical means is arranged to occupy one area near an entrance pupil of the projection optical system to guide each color light component to a corresponding optical modulation element, the stop aperture is formed to occupy the other area near the entrance pupil of the projection optical system, and the second deflection means is arranged to divide the stop aperture into a plurality of areas along a direction perpendicular to a juxtaposed direction of the member of the optical means and the stop aperture.

In the first to fifth projecting apparatuses of the present invention, the plurality of color light components are obtained by separating a light beam from light source means by color separation means.

The plurality of color light components are based on light beams from a plurality of light source means.

The color separation means comprises a transmission diffraction grating.

The color separation means comprises a reflection diffraction grating.

The color separation means comprises a plurality of dichroic mirrors tilted at different angles.

The color separation means is arranged in a collimated light beam.

The reflection diffraction grating is used under a condition of conical diffraction.

The plurality of dichroic mirrors have no light separation direction in a light deflection plane.

Of the plurality of mirrors, a dichroic mirror for reflecting a green light component finally receives a light beam.

The first deflection means has a plurality of mirrors for reflecting a light beam.

The first deflection means has a plurality of prisms for refracting a light beam.

The second deflection means has a plurality of mirrors for reflecting a light beam.

The second deflection means has a plurality of prisms for refracting a light beam.

In the second deflection means, a green light component passes through a central area of the plurality of areas of the stop aperture of the projection optical system, and blue and red light components pass through peripheral areas on both sides of the central area, respectively.

A lens system for guiding a collimated light beam to a corresponding optical modulation element is inserted in an optical path of each color light component.

At least one of the optical modulation elements receives an obliquely incoming light beam.

Each of the reflection optical modulation elements has a rectangular shape, and at least one optical modulation element receives a light beam that obliquely becomes incident on both long and short sides thereof.

The plurality of mirrors comprise high-reflection mirrors each optimized in accordance with a wavelength band to be reflected.

The plurality of mirrors comprise high-reflection mirrors each optimized in accordance with a wavelength band to be reflected.

The second deflection means has a plurality of mirrors arranged tilted at an interval.

The second deflection means has a plurality of mirrors arranged tilted at an interval, and at least one of the plurality of color light components passes between the mirrors arranged at an interval and is incident on the projection optical system.

The second deflection means has a plurality of mirrors arranged tilted at an interval, and at least one of the plurality of color light components is reflected by one of the plurality of mirrors arranged tilted at an interval and incident on the projection optical system.

A lens for focusing the light beam from the corresponding optical modulation element near the stop of the projection optical system is inserted in an optical path of each optical modulation element, and a central axis of the optical modulation element matches an optical axis of the corresponding lens.

A lens for focusing the light beam from the corresponding optical modulation element near the stop of the projection optical system is inserted in an optical path of each reflection optical modulation element, and a central axis of the optical modulation element matches an optical axis of the corresponding lens.

Extended lines of mirror surfaces of the plurality of mirrors match an intersection of optical axes of the lenses.

The second deflection means has a plurality of mirrors arranged at an interval, the plurality of mirrors are arranged near the stop of the projection optical system, a lens for focusing the light beam from a corresponding optical modulation element near the second deflection means is inserted in an optical path of each of the plurality of optical modulation elements, a central axis of the optical modulation element matches an optical axis of a corresponding lens, at least one of the plurality of color light components passes between the plurality of mirrors arranged at an interval and is incident on the projection optical system, and when an optical path of a first optical modulation element and a first lens along which the light beam is reflected by one of the plurality of mirrors and incident on the projection optical system is folded back about the mirror, the first optical modulation element and the first lens are respectively superposed on a second optical modulation element and a second lens along which the light beam passes between the plurality of mirrors and is incident on the projection optical system.

The second deflection means has a plurality of mirrors arranged at an interval, the plurality of mirrors are arranged near the stop of the projection optical system, at least one of the plurality of color light components passes between the plurality of mirrors arranged at an interval and is incident on the projection optical system, and when an optical path of a first optical modulation element and a first lens along which the light beam is reflected by one of the plurality of mirrors and incident on the projection optical system is folded back about the mirror, the first optical modulation element and the first lens are respectively superposed on a second optical modulation element and a second lens along which the light beam passes between the plurality of mirrors and is incident on the projection optical system.

The light beam passing between the plurality of mirrors is a green light component, and red and blue light components are reflected by the plurality of mirrors and incident on the projection optical system.

The second deflection means has two mirrors arranged tilted at an interval, and the two mirrors make an angle except 90° with respect to each other.

The optical modulation element essentially consists of a polymer dispersed reflection liquid crystal.

The optical modulation element essentially consists of a polymer dispersed liquid crystal.

The plurality of color light components are obtained by separating a light beam from light source means by color separation means, and the optical means has lens means for focusing the plurality of color light components from the color separation means and mirror means for reflecting at least one of the plurality of color light components focused through the lens means.

The mirror means corrects a diffraction angle difference according to peak wavelengths of diffraction light beams from a diffraction grating constituting the color separation means and guides the light beams at an equal angle with respect to the optical modulation elements.

The plurality of color light components are obtained by separating a light beam from light source means by color separation means, and the first deflection means corrects a diffraction angle difference according to peak wavelengths of diffraction light beams from a diffraction grating constituting the color separation means and guides the light beams at an equal angle with respect to the optical modulation elements.

The stop of the projection optical system is inserted between the projection optical system and the optical modulation elements.

The mirror means and the second deflection means are separately arranged in one area and the other area obtained by dividing the stop aperture of the projection optical system into two areas.

The mirror means and the second deflection means are separately arranged in one area and the other area obtained by dividing the stop aperture of the projection optical system into two areas including an optical axis of the projection optical system.

The first deflection means and the second deflection means are separately arranged in one area and the other area obtained by dividing the stop aperture of the projection optical system into two areas.

The first deflection means and the second deflection means are separately arranged in one area and the other area obtained by dividing the stop aperture of the projection optical system into two areas including an optical axis of the projection optical system.

According to the present invention, there is also provided a sixth projecting apparatus which illuminates optical modulation elements arranged in units of R, G, and B light components with the R, G, and B light components, guides image information based on at least one optical modulation element to a projection optical system through deflection means, and synthesizes and projects the image information on a predetermined surface through the projection optical system, wherein the deflection means is arranged near a stop of the projection optical system to divide an aperture of the stop into three areas, the G light component passing through a central portion of the three areas, and the R and B light components passing through peripheral portions.

According to the present invention, there is also provided a seventh projecting apparatus having optical modulation elements arranged for a plurality of color light components, which illuminates the optical modulation elements with the respective color light components, and superposes and projects pieces of image information displayed on the optical modulation elements on a predetermined surface through a projecting lens, wherein the color light components from the image information are guided near an entrance pupil of the projecting lens through condenser lenses arranged in units of color light components, the guided color light components are at least partially guided to the projecting lens through a mirror provided near the entrance pupil, and a light shielding member is inserted in an optical path between the mirror and the projecting lens to partially shield the light beam guided to the projecting lens.

In the seventh projecting apparatus of the present invention, the light shielding members is arranged for each of color light components from the pieces of image information.

A plurality of mirrors are arranged near the entrance pupil, and the light shielding member is arranged for each of the plurality of mirrors.

The plurality of light shielding members are tilted with respect to an optical axis of the projecting lens.

The plurality of light shielding members are tilted with respect to an optical axis of the projecting lens, and an opening of a light beam passage area has a partially elliptical shape for shielding the light beam.

The plurality of light shielding members can be exchanged or displaced to change an amount of each color light component incident on the entrance pupil area of the projecting lens.

A plurality of mirrors are arranged near the entrance pupil, and divide an area of the entrance pupil.

A light beam from light source means is collimated by reflection means and sent to color separation means.

The color separation means comprises a diffraction grating.

A positive lens having a convex surface facing the projecting lens is arranged in front of each image information.

The projecting-lens-side convex surface of the positive lens comprises an aspherical surface in which positive refracting power decreases with increasing distance from an optical axis.

The aspherical surface comprises a hyperbolic surface.

According to the present invention, there is also provided an eighth projecting apparatus which illuminates optical modulation elements arranged in units of color light components with corresponding color light components, modulates the color light components by the corresponding optical modulation elements to supply image information, and projects the color light components from the optical modulation elements on a display surface through a projecting lens to form a color image, comprising reflection means, arranged at or near an entrance pupil of the projecting lens, for reflecting a color light component from at least one optical modulation element and sending the color light component to the projecting lens, and correction means for correcting, on the display surface, an illuminance variation of the color light component reflected by the reflection means.

In the eighth projecting apparatus, the correction means comprises a light shielding member (e.g., a light shielding plate) or a light attenuation member (e.g., an ND filter) arranged between the reflection means and the projecting lens.

The correction means comprises a light attenuation member (e.g., an ND filter) for varying amounts of the color light components for illuminating the optical modulation elements.

The correction means has a drive circuit for varying a magnitude of a modulation signal (drive signal) of the optical modulation element.

According to the present invention, there is also provided a ninth projecting apparatus which illuminates three optical modulation elements arranged in units of three primary color light components with corresponding color light components, modulates the color light components by the corresponding optical modulation elements to supply image information, and projects the color light components from the optical modulation elements on a display surface through a projecting lens to form a color image, comprising a first reflection mirror arranged at or near an entrance pupil of the projecting lens to reflect the color light component from a first optical modulation element and send the color light component to the projecting lens, a second reflection mirror arranged at or near the entrance pupil of the projecting lens to reflect the color light component from a second optical modulation element and send the color light component to the projecting lens, and correction means for correcting, on the display surface, illuminance variations of the color light components reflected by the first and second reflection mirrors.

The ninth projecting apparatus of the present invention further comprises a third reflection mirror arranged at or near the entrance pupil of the projecting lens to reflect the color light component from a third optical modulation element and send the color light component to the projecting lens, and wherein the correction means also corrects, on the display surface, an illuminance variation of the color light components reflected by the third reflection mirror.

The correction means comprises a light shielding member (e.g., a light shielding plate) or a light attenuation member (e.g., an ND filter) inserted between the projecting lens and each of the reflection mirrors.

The correction means comprises a light attenuation member for varying amounts of the color light components for illuminating the optical modulation elements.

The correction means has a drive circuit for varying a magnitude of a modulation signal (drive signal) of the optical modulation element.

The optical modulation element can be switched between a transmission mode and a scattering mode as a nontransmission mode, and the modulation signal sets the optical modulation element in the transmission mode.

The eighth or ninth projecting apparatus of the present invention further comprises two light source units for emitting the three primary color light components.

The eighth or ninth projecting apparatus further comprises a white light source, and color separation means for separating a light beam from the white light source into the three primary color light components.

The color separation means comprises a diffraction grating.

The color separation means comprises a plurality of dichroic mirrors.

The optical modulation element comprises a transmission liquid crystal display element.

The optical modulation element comprises a reflection liquid crystal display element.

According to the present invention, there is also provided a tenth projecting apparatus (or light amount balance adjusting method) which illuminates a plurality of optical modulation elements with different color light components, focuses the color light components from the plurality of optical modulation elements near an entrance pupil of a projection optical system, guides at least one of the focused color light components to the projection optical system through a mirror arranged near the entrance pupil to divide an area of the entrance pupil, and when images displayed on the optical modulation elements are to be projected on a predetermined surface through the projection optical system, adjusts a position of the mirror to adjust light amount balance of the color light components on the predetermined surface.

In the tenth projecting apparatus of the present invention, the plurality of optical modulation elements are illuminated with the plurality of color light components obtained by separating a light beam from light source means by color separation means.

The mirror is movable in a direction 45° with respect to an optical axis of the projection optical system.

A plurality of mirrors are arranged to divide an area of the entrance pupil.

The light beam from the light source means is collimated by reflection means and sent to the color separation means.

The color separation means comprises a diffraction grating.

A positive lens having a convex surface facing the projection optical system is arranged in front of each of the optical modulation elements.

The projecting-lens-side convex surface of the positive lens comprises an aspherical surface in which positive refracting power decreases with increasing distance from an optical axis.

The aspherical surface comprises a hyperbolic surface.

According to the present invention, there is also provided a first optical modulation device which comprises a diffraction grating for separating incident light into a plurality of color light components, and an optical modulation element having a plurality of pixels to optically modulate the incident light in units of pixels, and sends the color light components generated from the diffraction grating when the light beam is obliquely incident on the diffraction grating to the pixels of the optical modulation element, which are arranged in units of color light components, thereby performing optical modulation, wherein the diffraction grating comprises a one-dimensional grating, and a plane defined by a central axis of the light beam incident on the diffraction grating and a central axis of 0th-order diffraction light from the diffraction grating is parallel to a grating direction of the diffraction grating.

According to the present invention, there is also provided a second optical modulation device which comprises a diffraction grating for separating incident light into a plurality of color light components, and optical modulation elements arranged in units of color light components and having a plurality of pixels to optically modulate the incident light in units of pixels, and sends the color light components generated from the diffraction grating when the light beam is obliquely incident on the diffraction grating to the plurality of optical modulation elements, thereby performing optical modulation, wherein the diffraction grating comprises a one-dimensional grating, and a plane defined by a central axis of the light beam incident on the diffraction grating and a central axis of 0th-order diffraction light from the diffraction grating is parallel to a grating direction of the diffraction grating.

In the first and second optical modulation devices of the present invention, the diffraction grating comprises a one-dimensional binary diffraction grating.

The one-dimensional binary diffraction grating has an echelon step structure having uneven step widths.

The color light components from the diffraction grating are sent to the pixels of the optical modulation element through a condenser lens.

Each device further comprise color filters corresponding to the-respective color light components and arranged in optical paths of the color light components incident on the plurality of pixels of the optical modulation element at a position where the color light components are spatially separated.

The plurality of pixels are formed from a liquid crystal.

The liquid crystal is a polymer dispersed liquid crystal.

Light shielding walls are formed between the plurality of pixels.

The liquid crystal is a TN liquid crystal.

The light beams modulated by the pixels of the optical modulation element are reflected by reflection means and output.

According to the present invention, there is also provided an eleventh projecting apparatus for projecting an image displayed on an optical modulation element of the first or second optical modulation device on a predetermined surface.

BRIEF DESCRIPTION OF THE DRAWINGS

FIGS. 7A, 7B and 7C are schematic views of part of an optical system shown in FIG. 6;

DETAILED DESCRIPTION OF THE PREFERRED EMBODIMENTS

Figure 6:
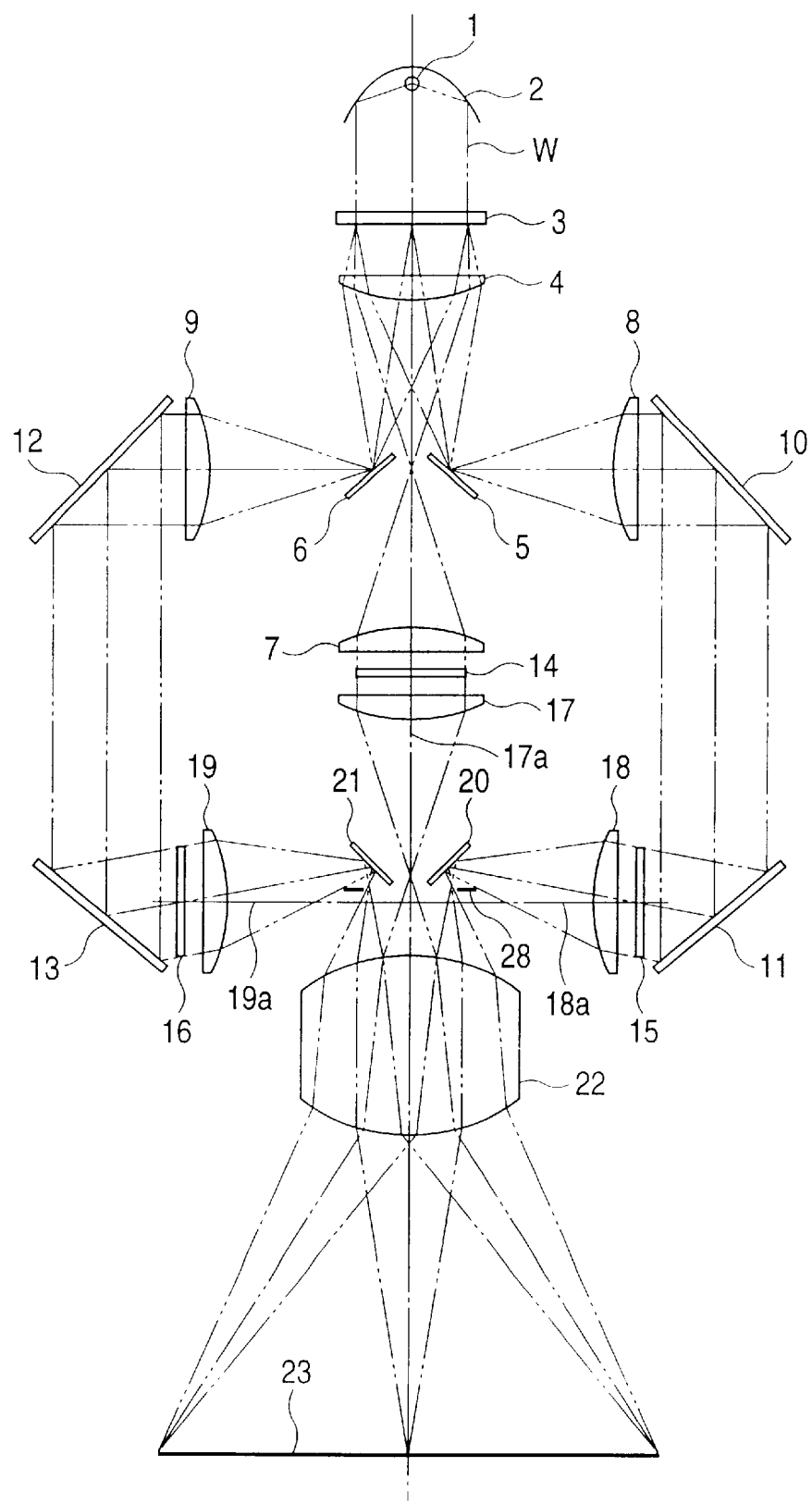
FIG. 6 is a schematic view of the first embodiment of the present invention.
Figure 8:
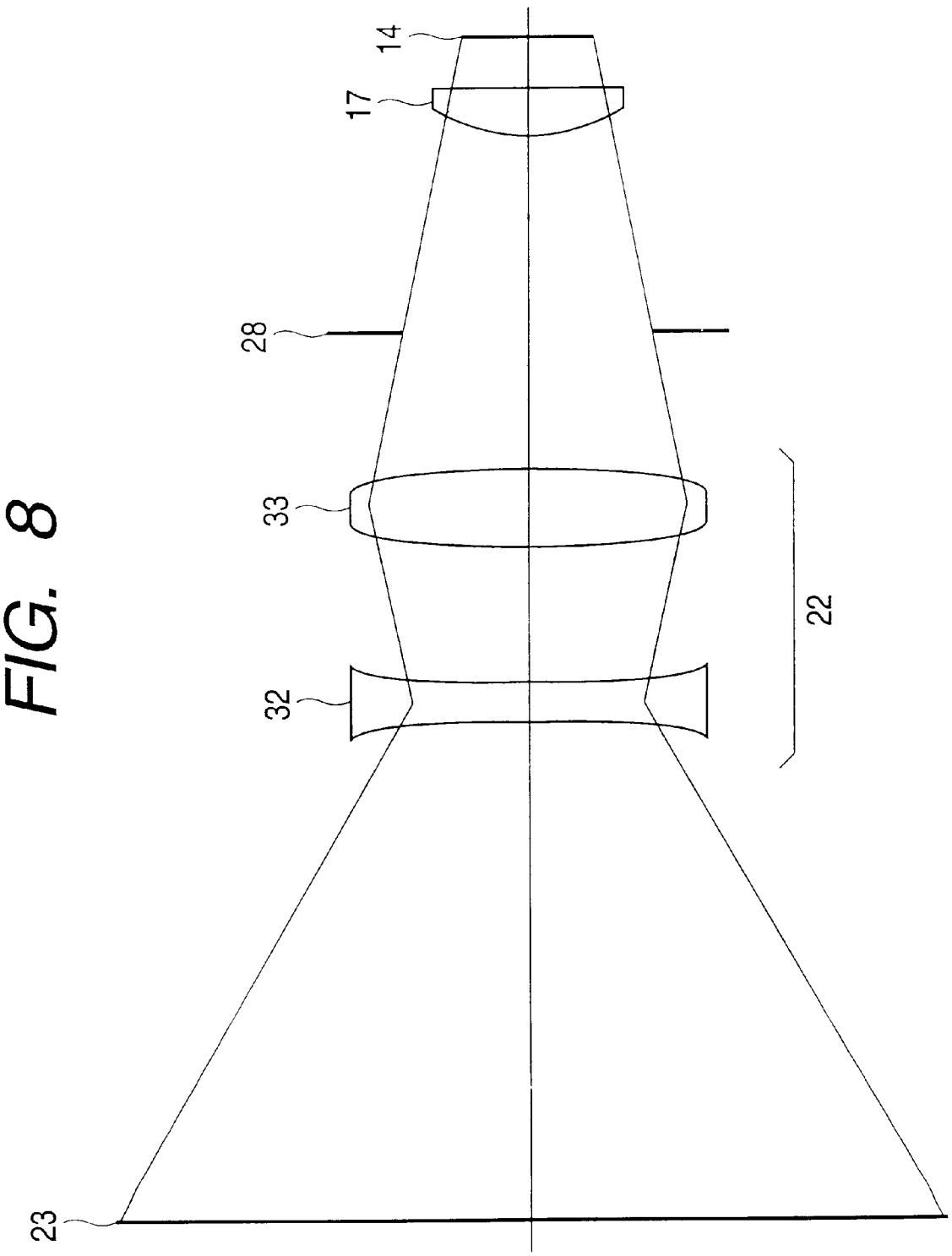
FIG. 8 is a schematic view of part of the optical system shown in FIG. 6.
Figure 9:
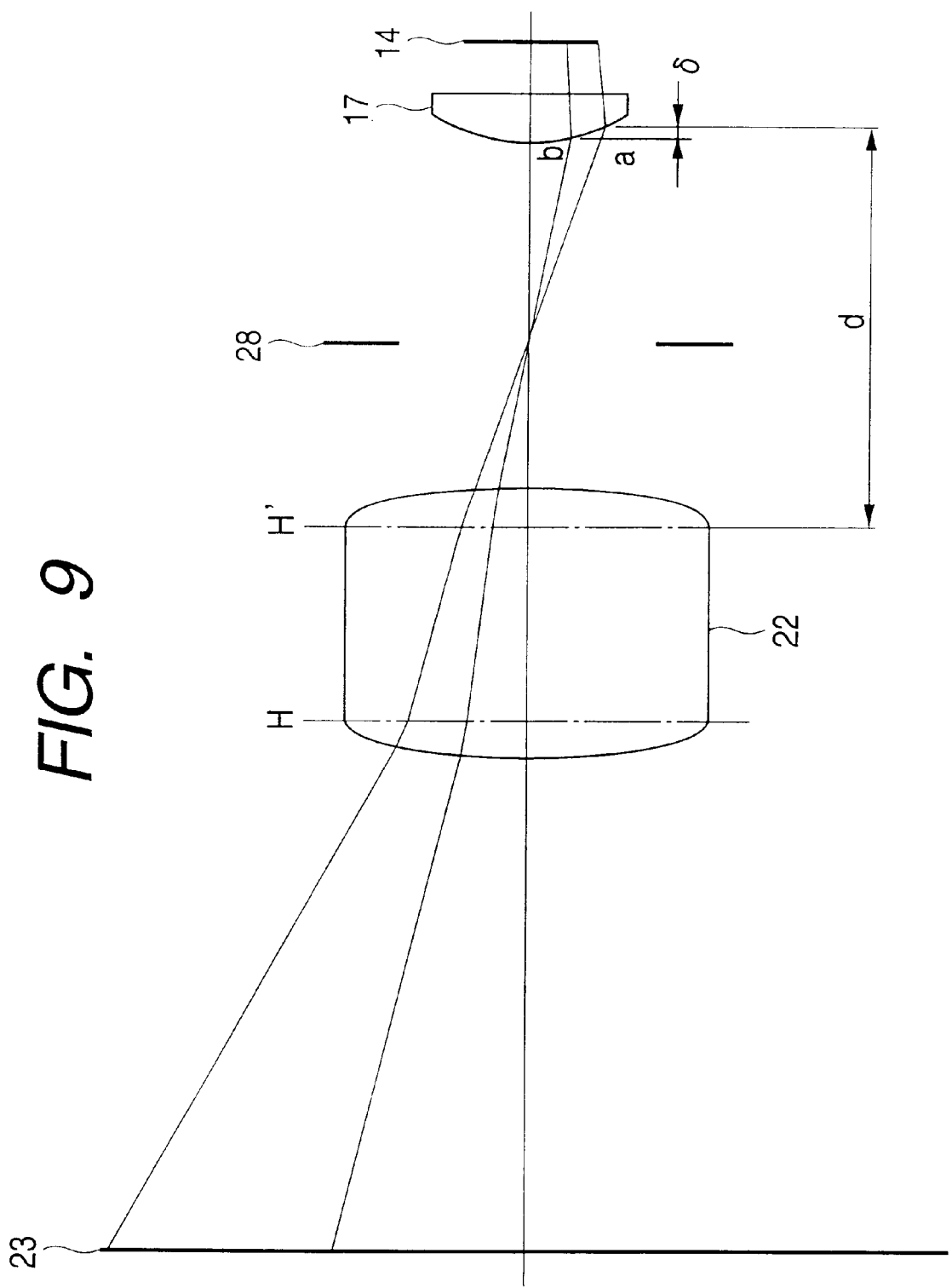
FIG. 9 is a schematic view of part of the optical system shown in FIG. 6.
Figure 10:
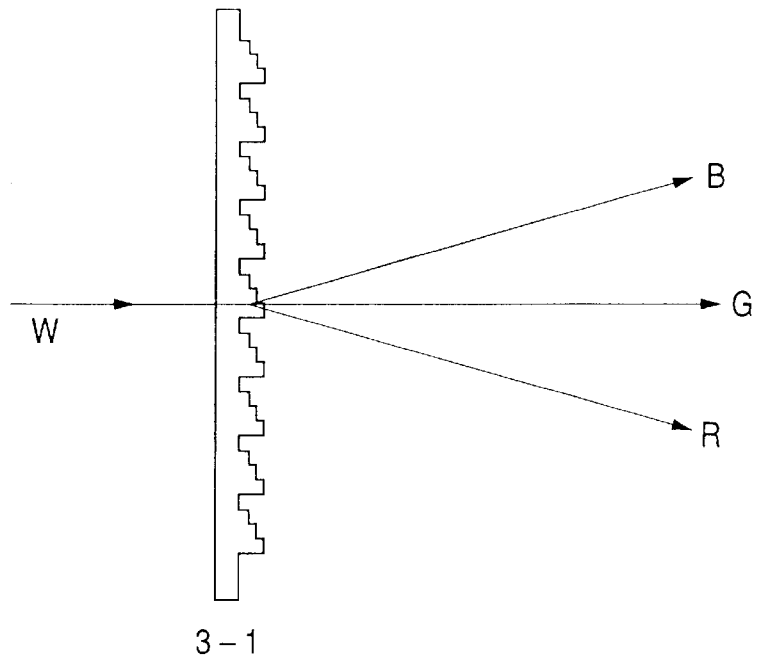
FIG. 10 is an explanatory view of a color separation means shown in FIG. 6.

FIG. 6 is a schematic view of the first embodiment of the present invention. FIGS. 8 and 9 are schematic views of part of an optical system shown in FIG. 6. FIG. 10 is an explanatory view of part of the arrangement shown in FIG. 6. In this embodiment, the projecting apparatus is applied to a color liquid crystal projector using a transmission liquid crystal panel (also called a "liquid crystal") as an optical modulation element.

Referring to FIG. 6, white light W emitted by a light source (light source means) 1 is reflected and roughly collimated by a reflector 2 (parabolic mirror) and separated into light beams corresponding to a plurality of wavelength ranges (e.g., a red light component (R light component), a green light component (G light component), and a blue light component (B light component): to be abbreviated as "R light component, G light component, and B light component" hereinafter) by a color separation element (color separation means) 3.

FIG. 10 is a sectional view of the color separation element of this embodiment. The color separation element of this embodiment is of transmission type and comprises an echelon diffraction grating 3-1. As shown in FIG. 10, the incident white light W is transmitted through the diffraction grating 3-1 and separated into 0th- and ±1st-order diffraction light components each having its diffraction efficiency peak in a specific wavelength range in accordance with the optical path difference in the fine echelon structure which passes the white light. These light components emerge as light beams corresponding to the wavelength bands of R, G, and B light components.

Figure 11:
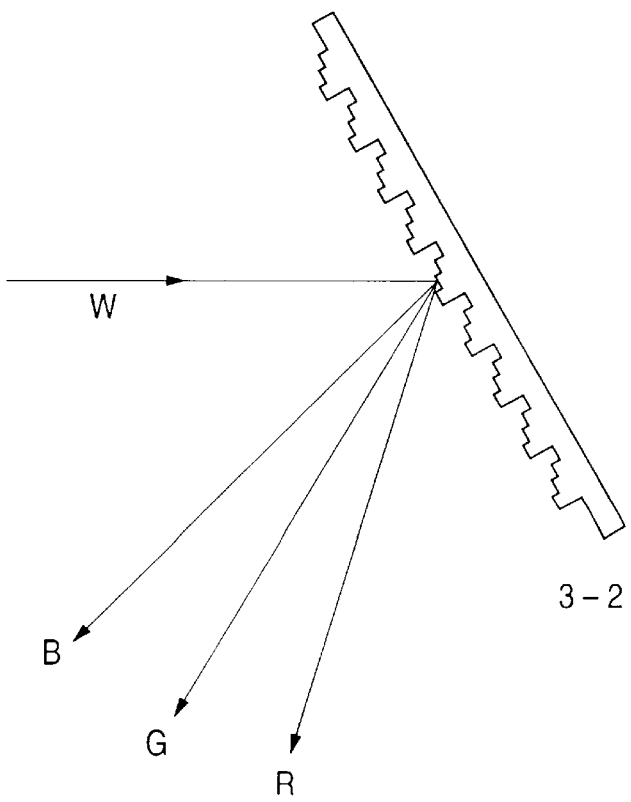
FIG. 11 is an explanatory view of another example of the color separation means shown in FIG. 6.

A reflection diffraction grating 3-2 shown in FIG. 11 may be used in place of the transmission diffraction grating as the color separation element 3 of this embodiment.

In FIG. 11, the incident white light W is reflected by the diffraction grating and separated into 0th- and ±1st-order diffraction light components each having its diffraction efficiency peak in a specific wavelength range in accordance with the optical path difference in the fine echelon structure which reflects the white light. These light components are reflected as light beams corresponding to the wavelength bands of R, G, and B light components. In the reflection diffraction grating 3-2, the optical path deflects upon reflection. In FIG. 6, this diffraction grating is developed into a transmission optical system.

Figure 12:
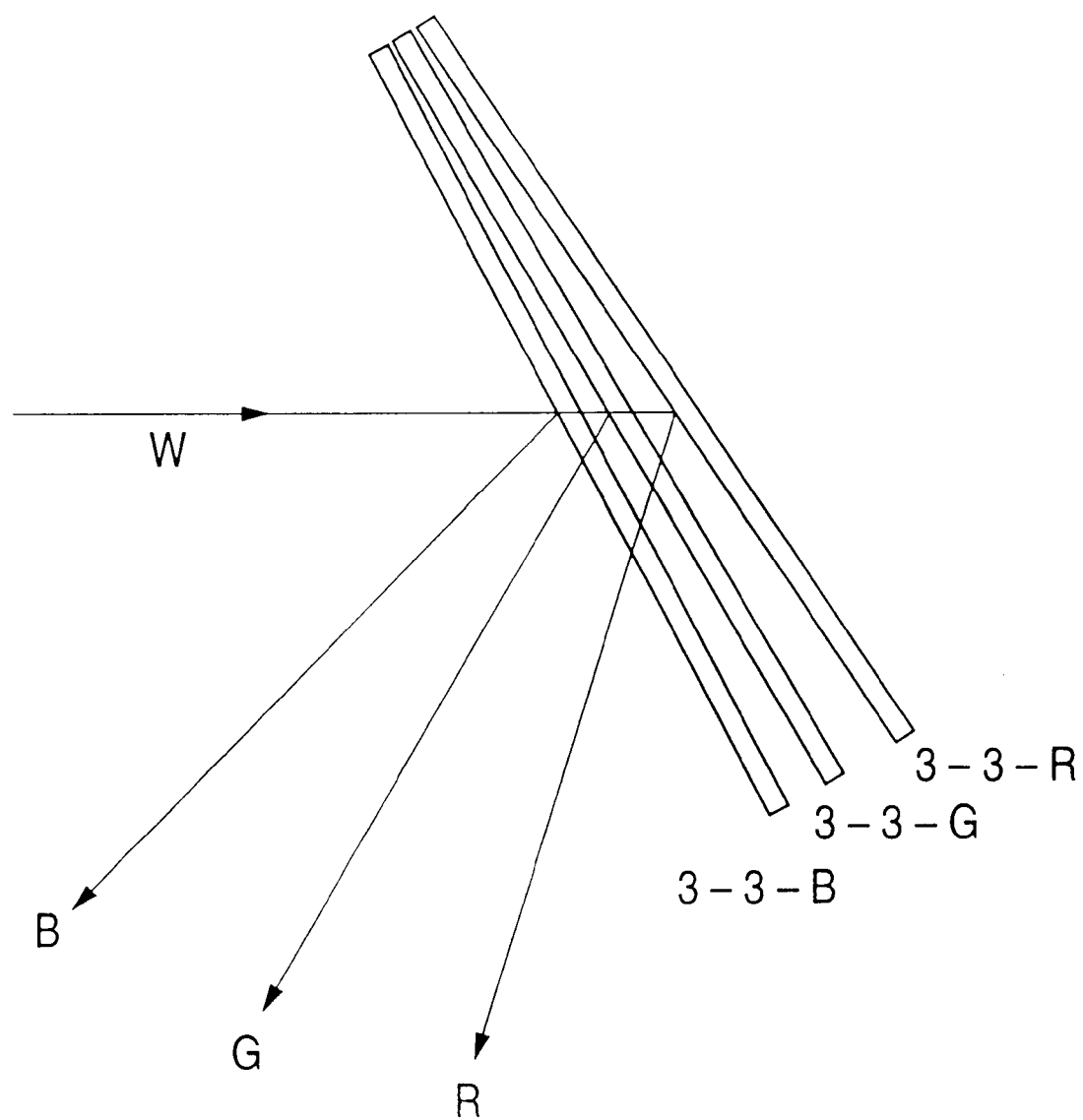
FIG. 12 is an explanatory view of still another example of the color separation means shown in FIG. 6.

FIG. 12 is a schematic view showing the color separation element of the present invention, which comprises three dichroic mirrors 3-3-B, 3-3-G, and 3-3-R. The dichroic mirror 3-3-B has spectral characteristics in which the B light component in the blue wavelength band is reflected, and G and R light components are transmitted. The dichroic mirror 3-3-G has spectral characteristics in which the G light component in the green wavelength band is reflected, and B and R light components are transmitted. The dichroic mirror 3-3-R has spectral characteristics in which the R light component in the red wavelength band is reflected, and the orange wavelength band is transmitted. The dichroic mirrors are tilted so that the reflected light is separated into R, G, and B light components. Instead of the dichroic mirror, a simple high-reflection mirror can be used as the dichroic mirror 3-3-R. In the dichroic mirrors, the optical path deflects upon reflection. In FIG. 6, these dichroic mirror are developed into a transmission optical system.

Both the diffraction gratings 3-1 and 3-2 as color separation elements shown in FIGS. 10 and 11 and the dichroic mirrors shown in FIG. 12 have spectral characteristics representing large dependence on light incident angle. In these color separation elements, the dependence on light incident angle results in color variations or luminance variations of illumination.

In this embodiment, the color separation element is placed in the substantially collimated light beam reflected by the reflector 2 having a parabolic surface, thereby preventing color variations or luminance variations.

Referring back to FIG. 6, the R, G, and B light components from the color separation element 3 are incident on a condenser lens (lens means) 4 at different angles and focused through the condenser lens 4 such that light source images are formed near mirrors 5 and 6 as the first deflection means which are arranged tilted at an interval.

Of these three color light components, e.g., the G light component passes between the mirrors 5 and 6, is roughly collimated by a lens system 7, and illuminates a transmission liquid crystal panel 14. The light beam modulated by the liquid crystal panel 14 in accordance with image information is focused through a-field lens (lens) 17 such that a light source image is formed again between mirrors 20 and 21 as the second deflection means disposed near a stop 28 of a projection optical system (also called a "projecting lens") 22.

The R light component is reflected by the mirror 5, roughly collimated by a lens system 8, and illuminates a transmission liquid crystal panel 15 through mirrors 10 and 11. The light beam modulated by a transmission liquid crystal panel 15 in accordance with image information is focused through a field lens (lens) 18 such that a light source image is formed again on the mirror 20 arranged near-the stop 28 of the projection optical system 22.

Similarly, the B light component is reflected by the mirror 6, roughly collimated by a lens system 9, and illuminates a transmission liquid crystal panel 16 through mirrors 12 and 13. The light beam modulated by the transmission liquid crystal panel 16 in accordance with image information is focused through a field lens (lens) 19 such that a light source image is formed again on the mirror 21 arranged near the stop 28 of the projection optical system 22.

From the viewpoint of aberration correction, the field lenses 17 to 19 preferably comprise plano-convex lenses with their flat surfaces facing the liquid crystal panels 14 to 16, respectively, and more preferably, aspherical plano-convex lenses.

The mirrors 5 and 6 make up one element of the first deflection means, and the mirrors 20 and 21 one element of the second deflection means.

The G light component passes between the mirrors 20 and 21, and the R and B light components are reflected by the mirrors 20 and 21, respectively, and guided to the projection optical system 22. The projection optical system 22 synthesizes the pieces of image information from the liquid crystal panels 14 to 16 into a full-color image and projects it on a screen 23.

In this embodiment, the lens means 4, the first deflection means 5 and 6, and the lens systems 7 to 9 form one element of the optical means.

The arrangement of the field lenses 17 to 19, the liquid crystal panels 14 to 16, and the mirrors 20 and 21, and the method of illuminating each liquid crystal panel in this embodiment will be described next with reference to FIGS. 7A to 7C.

The field lenses 18 and 19 have a common optical axis (alternate long and short dashed line in FIG. 6) perpendicular to the optical axis of the field lens 17. In this embodiment, each of the mirrors 20 and 21 is arranged at an angle of 45° with respect to the common optical axis. The angle formed by the mirrors 20 and 21 is 90°. When the mirror surfaces of the mirrors 20 and 21 are extended toward the projection optical system, they cross at the intersection of the common optical axis of the field lenses 18 and 19 and the optical axis of the field lens 17.

More specifically, when the field lens 18 and the liquid crystal panel 15 are folded back about the mirror 20, they overlap the field lens 17 and the liquid crystal panel 14. Similarly, when the field lens 19 and the liquid crystal panel 16 are folded back about the mirror 21, they overlap the field lens 17 and the liquid crystal panel 14.

In FIG. 7A, the optical path of the field lens 18 and the liquid crystal panel 15 which are folded back about the mirror 20 and the optical path of the field lens 19 and the liquid crystal panel 16 which are folded back about the mirror 21 are indicated by solid lines, and the actual optical paths are indicated by dotted lines. Each optical path is represented by the principal ray from the liquid crystal panel. The liquid crystal panels are arranged at optically equivalent positions with respect to the projection optical system 22. The light beams from the liquid crystal panels are transmitted through different portions of the stop 28 of the projection optical system 22 and synthesized into a full-color image on the screen. Note that only the rear element of the projection optical system 22 is illustrated.

To match the liquid crystal panel positions and to make the light beams pass through different portions of the stop 28 of the projection optical system 22, at least the liquid crystal panels 15 and 16 are illuminated with light beams tilted with respect to the optical axis (18a or 19a), as shown in FIG. 7A.

The mirrors 20 and 21 as the second deflection means are placed to divide a stop aperture 28a of the projection optical system 22 into a plurality of areas, as shown in FIG. 7B. The X-axis is set along the direction of division.

As shown in FIG. 7C, when the Y-axis is set along an optical axis 22a of the projection optical system 22, light beams tilted in the direction of division (X-direction) of the stop aperture 28a and illuminating the liquid crystal panels 15 and 16 mean light beams having a gradient along the direction of division (X-direction) when they are projected on the X-Y plane.

When the liquid crystal panels and the field lenses are arranged on the common optical axis, as described above, the pixels match over the entire screen with minimum distortion, thereby obtaining a high-resolution projected image. In addition, each of the images of the R, G, and B light components, which are formed through the field lenses 17, 18, and 19, respectively, has a size fit for the stop 28 of the projection optical system 22, so that the light beams can be efficiently used.

Figure 1:
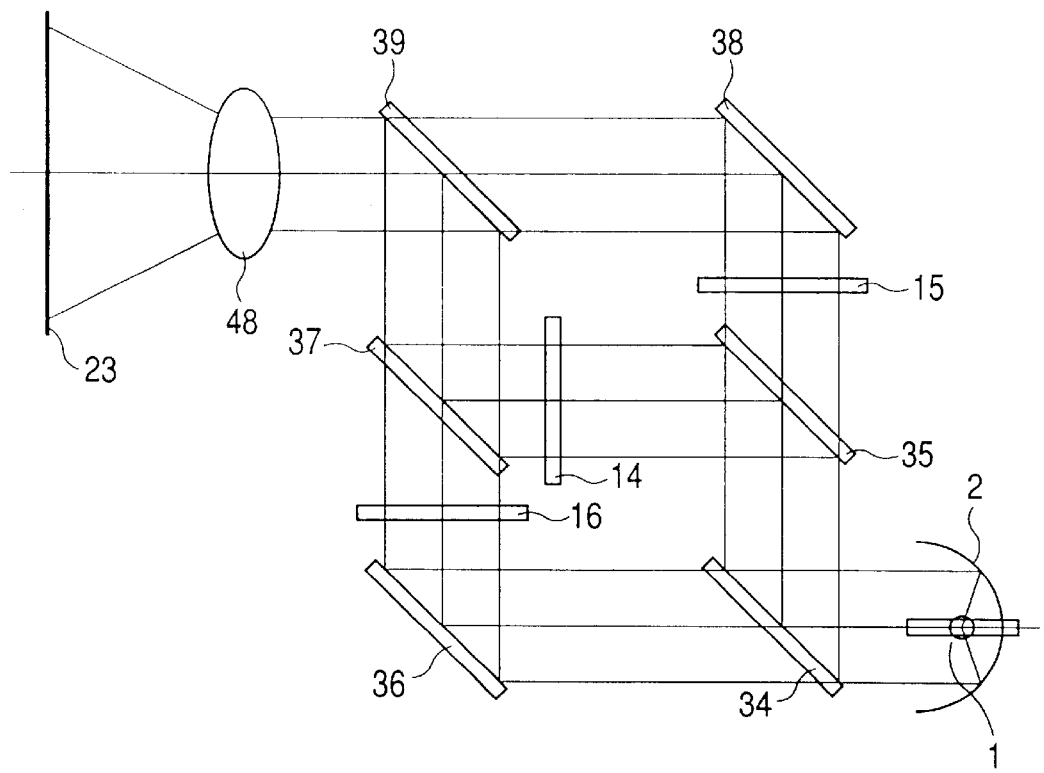
FIGS. 1, 2, 3, 4 and 5 are schematic views of conventional projecting apparatuses.
Figure 2:
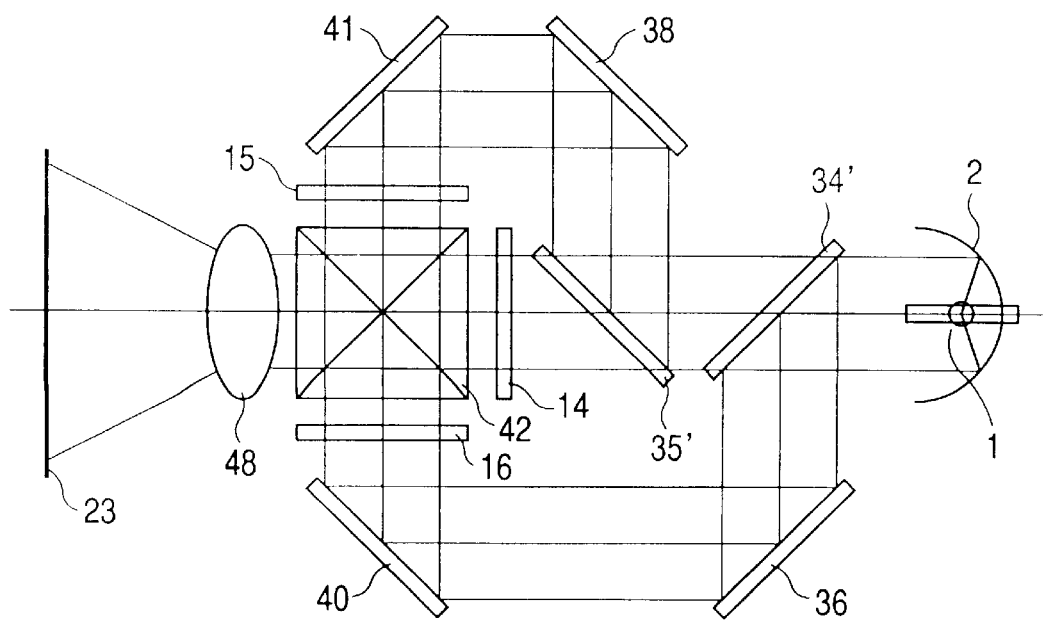
Figure 3:
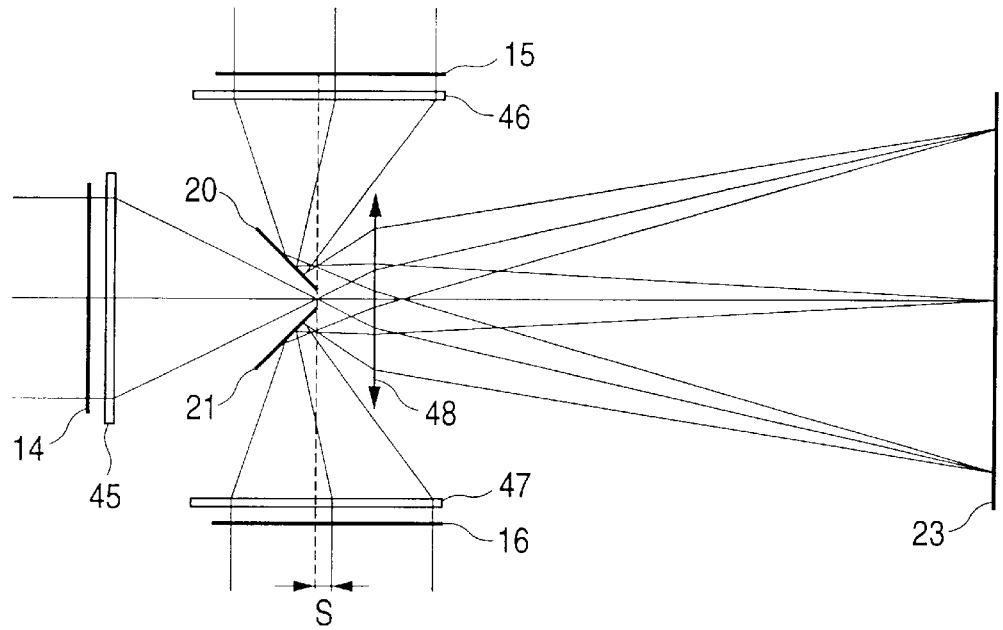

The difference between this embodiment and the color synthesis optical system shown in FIG. 3 will be described below in detail. In the optical system shown in FIG. 3, the liquid crystal panel 15 and the field lens 46 are decentered from each other by the distance s, and so are the liquid crystal panel 16 and the field lens 47. That is, when the field lens 46 and the liquid crystal panel 15 are folded back about the mirror 20, the field lens 46 does not overlap the field lens 45. This also applies to the field lens 47. Distortion due to this decentering is a problem in a high-resolution liquid crystal projector.

In this embodiment, each liquid crystal panel and the corresponding field lens are set on the common axis, as described above. To pass the respective color light components through the stop at different portions, the illumination light beams are sent to become incident on the panel at an angle instead of decentering the liquid crystal panel and the field lens, unlike the prior art.

Since distortion can be minimized, and the pixels can be matched over the whole image, this embodiment is suitable for a high-resolution liquid crystal projector as, e.g., a computer monitor.

Figure 4:
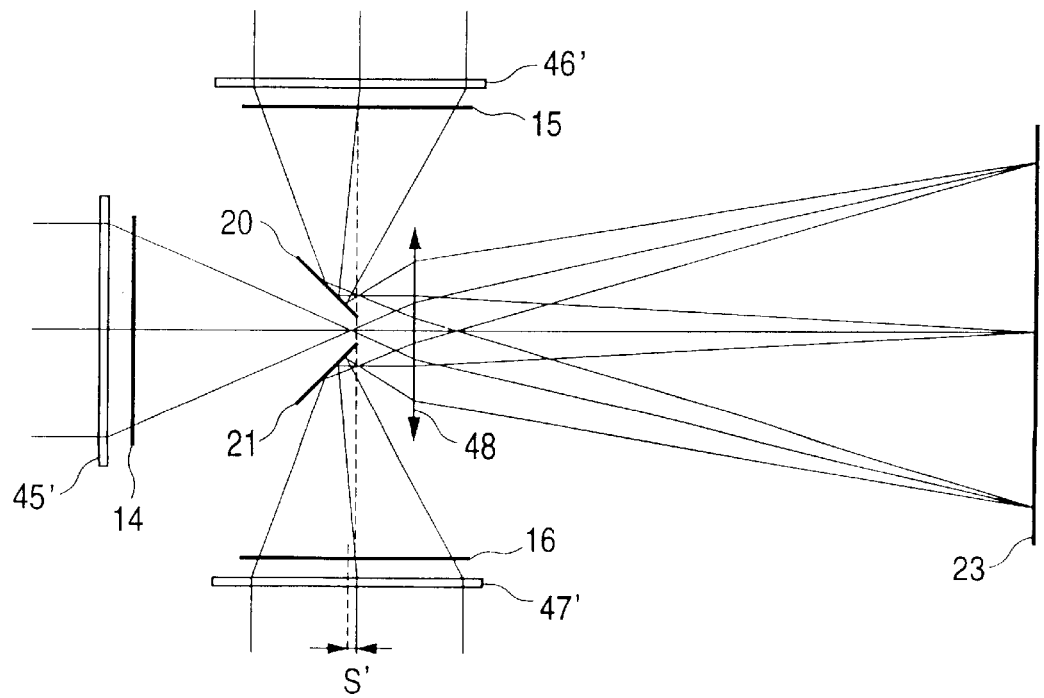
Figure 5:
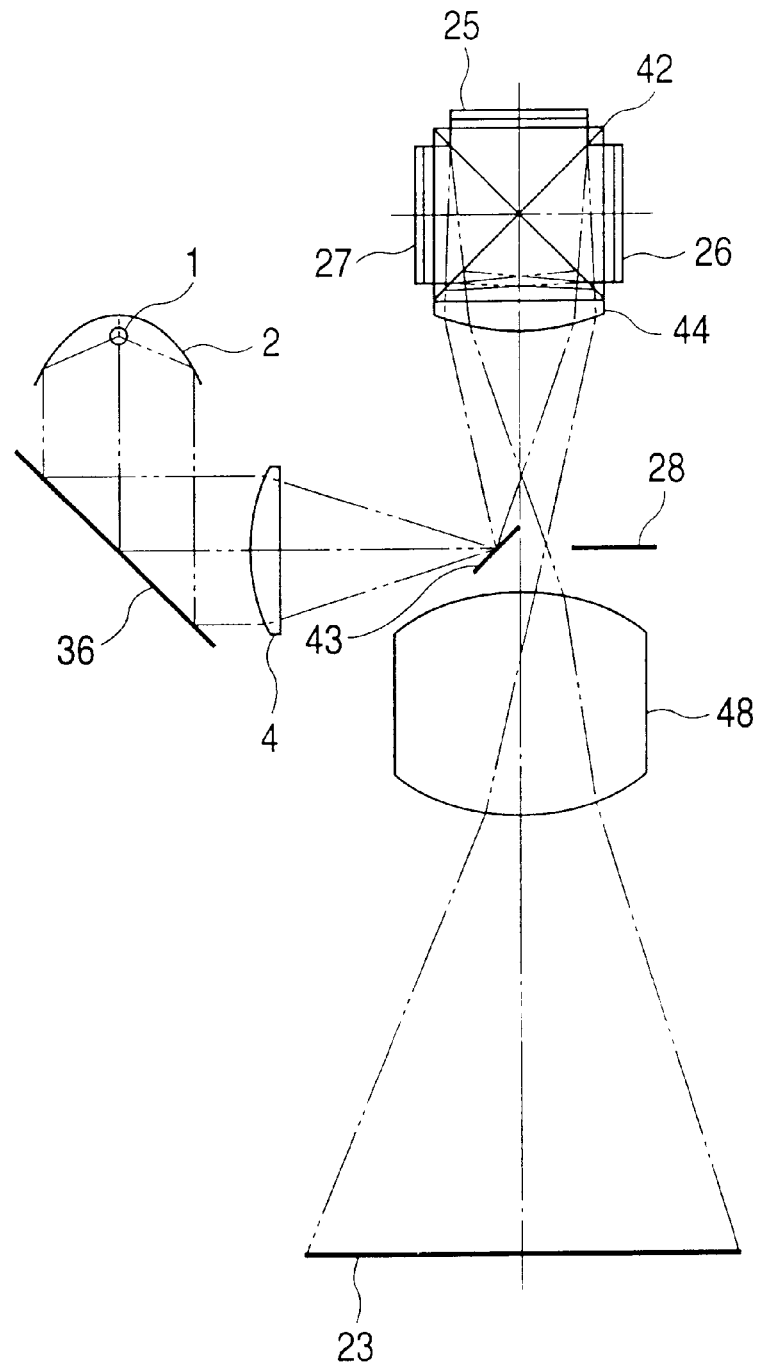

In the optical system shown in FIG. 4, as the liquid crystal panels are placed in focused light beams, the incident angle of illumination light changes depending on the position of the liquid crystal panel, resulting in contrast variations or color variations. In this embodiment, however, an approximately collimated light beam is incident on each liquid crystal panel, so the above problem is not posed.

In the optical system shown in FIG. 4, as no field lens is inserted between each liquid crystal panel and the projecting lens 48, the curvature of field and distortion of the projecting optical system are hard to correct. The curvature of field at this time will be described next with reference to FIG. 8.

In the projection optical system 22 of this embodiment, to accommodate the mirrors 20 and 21, the stop 28 must be set behind the projection optical system 22, and the projection optical system 22 is preferably of a retrofocus type.

In the projecting lens 48 shown in FIG. 4, likewise, the stop must be set behind the projecting lens 48 to arrange the mirrors 20 and 21. The projection optical system 22 is assumed to be a retrofocus type system having a concave lens group 32 and a convex lens group 33, as shown in FIG. 8.

To obtain a compact and wide-angled projection optical system 22, the negative power of the first group, i.e., the concave lens group 32 must be increased. To reduce astigmatism to minimize curvature of field, the Petzval sum is preferably a small positive value. However, this condition is hard to satisfy if no field lens is inserted between the projection optical system and each liquid crystal panel, as in the prior art, so high optical performance and a compact and wide-angled projection optical system cannot be simultaneously realized.

In this embodiment, as the field lens 17 (plano-convex lens) is arranged between the projection optical system 22 and the liquid crystal panel 14, the Petzval sum can be easily kept at a small positive value due to the positive power of the convex lens group 33 and the field lens 17. Therefore, a high resolution can be attained while realizing a compact and wide-angled projection optical system.

Distortion will be described next with reference to FIG. 9. In this embodiment, the field lens 17 (plano-convex lens) is inserted between the projection optical system 22 and the liquid crystal panel 14.

Considering the off-axis light components, the distances between the image plane and the refraction planes a and b are different because of the image height. Both power $\phi 1$ of the projection optical system 22 and power $\phi 2$ of the field lens 17 are positive power. Synthesized power $\phi$ is given by:

$$\phi = \phi 1 + \phi 2 - d \cdot \phi 1 \cdot \phi 2 \qquad [1]$$

where the power $\phi 1$ and $\phi 2$ are the reciprocals of the focal distances of the respective lenses, and d is the distance between the synthesis lens and the field lens 17 and, more specifically, considered as the distance between the rear principal point of the synthesis lens and the refraction plane of the field lens 17.

Consider the light beam for each image height. As the image height of the field lens 17 increases, the distance d between lenses increases relative to the image height ($\delta$ as the difference between the points a and b).

According to equation [1], the synthesized power $\phi$ decreases as the image height increases. The distortion of a normal convex lens of, e.g., the projection optical system 22 has a barrel shape (or a pincushion shape when projection of the liquid crystal panel on the screen is taken into consideration), i.e., the power is large at the peripheral portion of the liquid crystal panel 14 with a large image height.

The field lens 17 arranged between the projection optical system 22 and the liquid crystal panel, as in this embodiment, functions to reduce the power at the peripheral portion where the image height increases, i.e., relax the barrel-shaped distortion, or conversely, the pincushion-shaped distortion considering projection of the liquid crystal panel on the screen. This apparatus is suitable for a liquid crystal projector used as, e.g., a computer monitor. which must be exempt of distortion as compared to a TV monitor.

In this embodiment, an aspherical plano-convex lens having small power at the peripheral portion is employed as a field lens, thereby obtaining the same effect as described above.

To the contrary, in the conventional optical system shown in FIG. 4b no field lens is arranged between a projecting lens 48 and each liquid crystal panel, so the distortion having a barrel shape (or a pincushion shape when projection of the liquid crystal panel on the screen is taken into consideration) is hard to correct. Therefore, the optical system shown in FIG. 4 is not preferable for a liquid crystal projector as, e.g., a computer monitor.

In this embodiment, a light beam almost perpendicularly enters the diffraction grating 3-1 as a transmission color separation element shown in FIG. 10. A diffraction angle $\theta_{\pm 1}$ of the pest-order diffraction light beams with respect to the 0th-order light is represented by:

$$\sin\theta_{\pm 1} = \lambda_{\pm 1}/P \quad [2]$$

where p is the pitch of the echelon grating, and $\lambda_{\pm 1}$ is the peak wavelength of the diffraction light.

If p=5 µm, the +1st-order diffraction light, i.e., the R light component (peak wavelength: 610 nm) and the −1st-order diffraction light, i.e., the B light component (peak wavelength: 460 nm) respectively have asymmetrical diffraction angles of 7.0° and 5.3°.

Similarly, a light beam is incident on the diffraction grating 3-2 as a reflection color separation element shown in FIG. 11 at an incident angle i. The diffraction angle $\theta_{\pm 1}$ of the ±1st-order diffraction light beams with respect to the 0th-order light is represented by:

$$\sin(i+\theta_{\pm 1}) = \sin\cdot i + \lambda_{\pm 1}/p \quad [3]$$

where p is the pitch of the echelon grating, and $\lambda_{\pm 1}$ is the peak wavelength of the diffraction light.

If the incident angle i=30°, and p=5 µm, the +1st-order diffraction light, i.e., the R light component (peak wavelength: 610 nm) and the −1st-order diffraction light, i.e., the B light component (peak wavelength: 460 nm) respectively have asymmetrical diffraction angles of 8.5° and 6.3°. The mirrors 5 and 6 are tilted at angles for correcting these asymmetrical diffraction angles, so the liquid crystal panels 15 and 16 are illuminated at an equal tilt angle. The asymmetrical diffraction angles may be corrected by mirrors 10 to 13.

In this embodiment, the color separation optical system and the color synthesis optical system are constituted such that the green light component travels through the central portion of the projection optical system 22, and the blue and red light through the peripheral portion of the stop 28.

This is because the green light component has the largest amount of light from the light source and the highest luminous efficiency and therefore greatly contributes to the resolution. Since the blue and red light components have lower luminous efficiencies and less contribute to the resolution, even when some aberration is generated in the projection optical system, the apparent decrease in resolution poses no problem.

The mirrors in this embodiment are preferably high-reflection Al (aluminum) mirrors. When the mirrors 5, 10, 11, and 20 have reflection increasing films for increasing the reflectance in the red band, and the mirrors 5, 10, 11, and 20 have reflection increasing films for increasing the reflectance in the blue band, the efficiency of utilization of light from the light source is improved, and a bright image can be obtained on the screen.

The diffraction grating as a color separation element shown in FIG. 10 or 11 can be easily copied by the replica technique. The flat type dichroic mirror shown in FIG. 12 or the combination of the flat type dichroic mirror and a high-reflection mirror can also be relatively easily manufactured.

The mirrors 5 and 6 for guiding the light beams from the color separation element are high-reflection mirrors. These mirrors are placed at a position where light source images are formed by the condenser lens 4, and can have a small size as far as they can reflect the light source images. Likewise, the mirrors 20 and 21 for synthesizing light beams from the liquid crystal panels are high-reflection mirrors. These mirrors are disposed at a position where light source images are formed by the field lenses 18 and 19, and can have a small size as far as they can reflect the light source images.

In this embodiment, the mirrors are used as means for guiding the light beams from the color separation element to the color liquid crystal panels. However, as far as the light beams can be deflected, reflection prisms or refraction prisms may be used. These first deflection means are arranged near the light source images formed through the condenser lens 4 and can have a small size as far as they can deflect the light source images. The second deflection means 20 and 21 for synthesizing the light beams from the liquid crystal panels may also use reflection prisms or refraction prisms as far as they can deflect the light beams. These deflection means are arranged near the light source images formed by the field lenses 18 and 19 and can have a small size as far as they can deflect the light source images.

In this embodiment, the white light beam W from one light source is separated into the R, G, and B light components using the color separation element 3. Alternatively, a plurality of light sources may be arranged in units of colors.

As described above, the color separation optical system of this embodiment is formed mainly using high-reflection mirrors which can be easily manufactured, instead of using any expensive cross dichroic prism which is difficult to manufacture.

According to this embodiment, the light beam is never transmitted through a tilted flat type dichroic mirror, unlike the prior art. Therefore, no astigmatism is generated, and an image having a satisfactory resolution can be obtained.

This embodiment is suitable for a liquid crystal projector used as, e.g., a computer monitor free from distortion because each field lens need not be decentered from a corresponding liquid crystal panel in the color separation illumination system of the color synthesis optical system. In addition, in this embodiment, a field lens is inserted between each liquid crystal panel and the projection optical system to reduce distortion and curvature of field while realizing a compact and wide-angled projection optical system 22.

Figure 13:
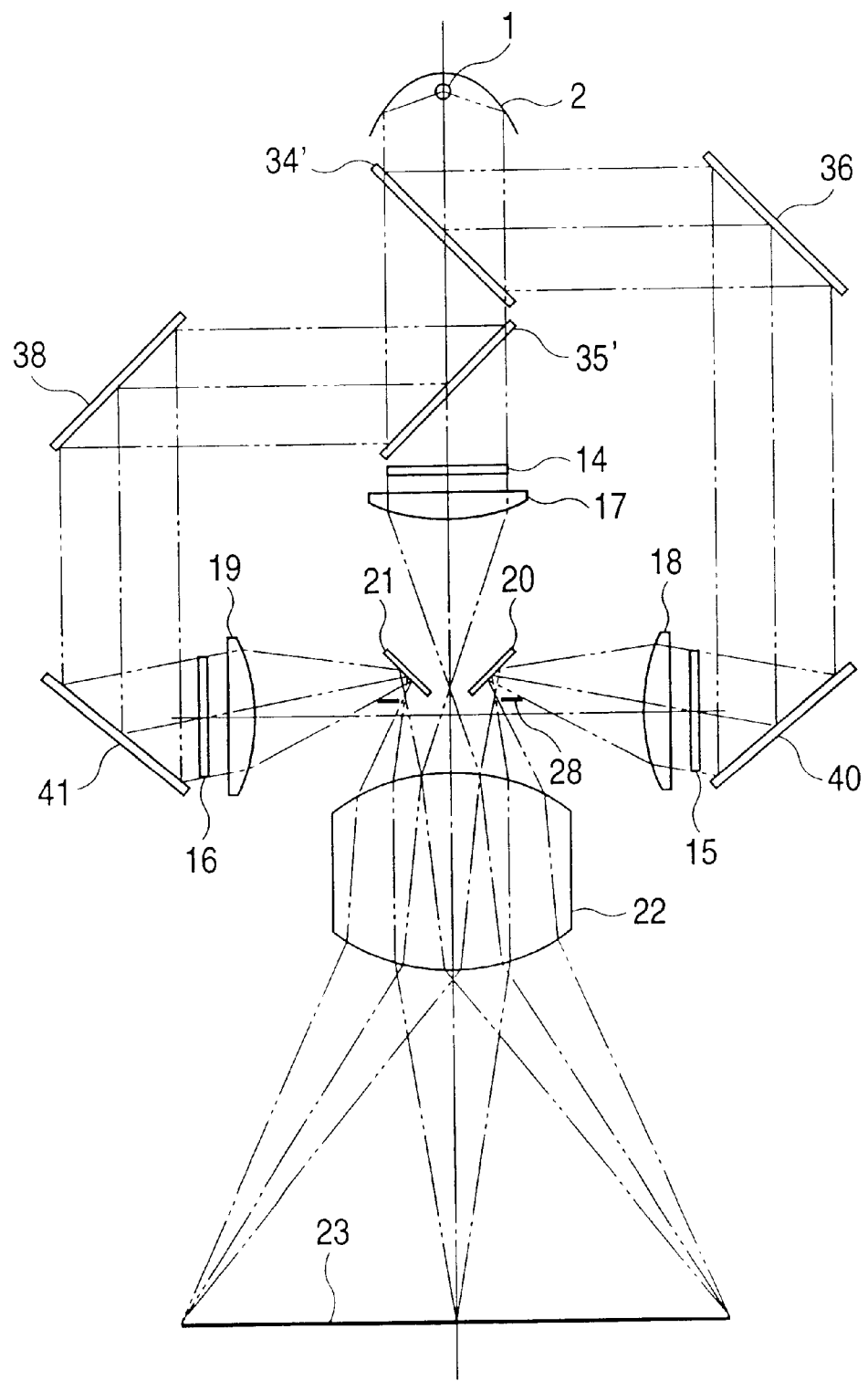
FIG. 13 is a schematic view of the second embodiment of the present invention.

FIG. 13 is a schematic view of the second embodiment of the present invention. The second embodiment basically has the same arrangement as that of the first embodiment shown in FIG. 6 except that two dichroic mirrors 341 and 35' are used as a color separation means in place of a transmission diffraction grating, and the condenser lens 4, the mirrors 5 and 6, and the lenses 7 to 9 are omitted.

The same reference numerals as in FIG. 6 denote the same elements in FIG. 13. Referring to FIG. 13, light emitted by a light source 1 is roughly collimated by a reflector 2 (parabolic mirror) and incident on the dichroic mirror 341 which reflects a blue light component and transmits green and red light components. The green and red light components transmitted through the dichroic mirror 34' reach the dichroic mirror 35' which transmits the green light component and reflects the red light component. The green light component transmitted through the dichroic mirror 356 illuminates a liquid crystal panel 14. The red light component reflected by the dichroic mirror 35' illuminates a liquid crystal panel 16 through mirrors 38 and 41. The blue light component reflected by the dichroic mirror 34' illuminates a liquid crystal panel 15 through mirrors 36 and 40.

The image of the light beam modulated by the transmission liquid crystal panel 14 in accordance with image information is formed again, through a field lens 17, between mirrors 20 and 21 placed near a stop 28 of a projection optical system 22. The image of the B light component modulated by the transmission liquid crystal panel 15 in accordance with image information is formed again, through a field lens 18, on the mirror 20 set near the stop 28 of the projection optical system 22.

In a similar fashion, the image of the R light component modulated by the transmission liquid crystal panel 16 in accordance with image information is formed again, through a field lens 19, on the mirror 21 set near the stop 28 of the projection optical system 22. The G light component passes between the mirrors 20 and 21, and the B and R light components are reflected by the mirrors 20 and 21, respectively. These light components are synthesized into a full-color image and projected on a screen 23 through the projection optical system 22.

As in FIG. 6, the field lenses 18 and 19 have a common optical axis (alternate long and short dashed line) perpendicular to the optical axis of the field lens 17. When the field lens 18 and the liquid crystal panel 15 are folded back about the mirror 20, they overlap the field lens 17 and the liquid crystal panel 14. Also, when the field lens 19 and the liquid crystal panel 16 are folded back about the mirror 21, they overlap the field lens 17 and the liquid crystal panel 14.

That is, the liquid crystal panels are arranged at optically equivalent positions with respect to the projection optical system. The light beams from the liquid crystal panels are transmitted through different portions of the stop of the projection optical system 22 and synthesized into a full-color image on the screen. To obtain the relationship described in FIGS. 7A, 7B, and 7C, the liquid crystal panels 15 and 16 are illuminated with light beams tilted with respect to the optical axis. Since each liquid crystal panel is arranged on the optical axis of the corresponding field lens, the pixels can be matched over the entire screen with minimum distortion. For this reason, this apparatus is suitable for a high-resolution liquid crystal projector used as, e.g., a computer monitor.

Each of the images of the R, G, and B light components, which are formed through the field lenses 17, 18, and 19, respectively, has a size fit for the stop 28 of the projection optical system, so that the light beams can be efficiently used. In this embodiment, the color separation optical system and the color synthesis optical system are constituted such that the green light component passes through the central portion of the stop 28 of the projection optical system 22, and the blue and red light through the peripheral portion of the stop 28, as in the first embodiment. With this arrangement, a projected image having a high resolution can be obtained.

The mirrors in this embodiment are preferably high-reflection Al (aluminum) mirrors. When the mirrors 38 and 41 have reflection increasing films for increasing the reflectance in the red band, and the mirrors 36 and 40 have reflection increasing films for increasing the reflectance in the blue band, the efficiency of utilization of light from the light source is improved, and a bright image can be obtained on the screen.

The mirrors 20 and 21 for synthesizing the light beams from the liquid crystal panels are high-reflection mirrors. These mirrors are arranged at the positions of the light source images formed through the field lenses 18 and 19 and can have a small size as far as they can reflect the light source images.

As described above, the color separation optical system and the color synthesis optical system of this embodiment can be formed mainly using simple high-reflection mirrors without using a number of flat type dichroic mirrors or a cross dichroic prism which is hard to manufacture. The light beam is never transmitted through a tilted flat type dichroic mirror, unlike the prior art. Therefore, no astigmatism is generated, and an image having a satisfactory resolution can be obtained.

This embodiment is suitable for a liquid crystal projector used as, e.g., a high-resolution computer monitor free from distortion because each field lens need not be decentered from a corresponding liquid crystal panel in the color separation illumination system of the color synthesis optical system. In addition, in this embodiment, a field lens is disposed between each liquid crystal panel and the projection optical system to reduce distortion and curvature of field while realizing a compact and wide-angled projection optical system 22.

Figure 14:
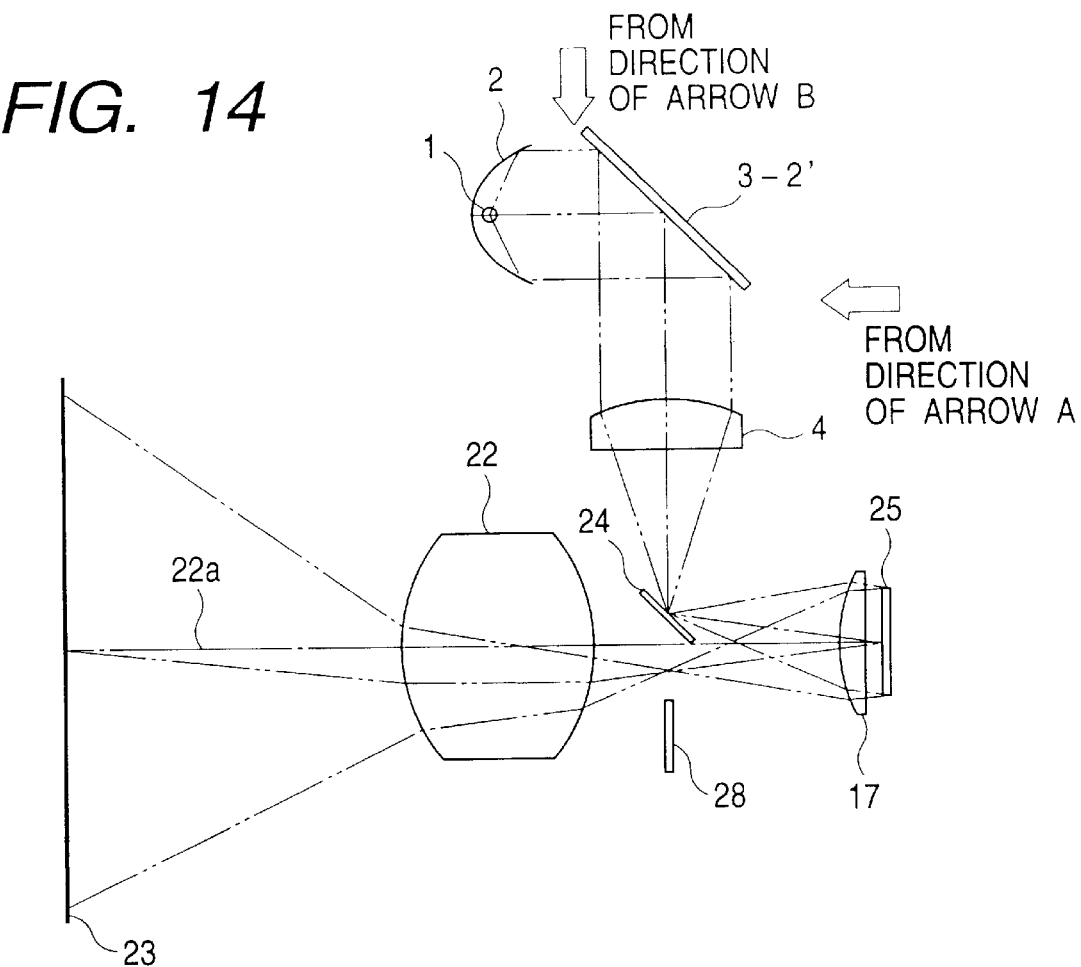
FIG. 14 is a front view of the third embodiment of the present invention.
Figure 15:
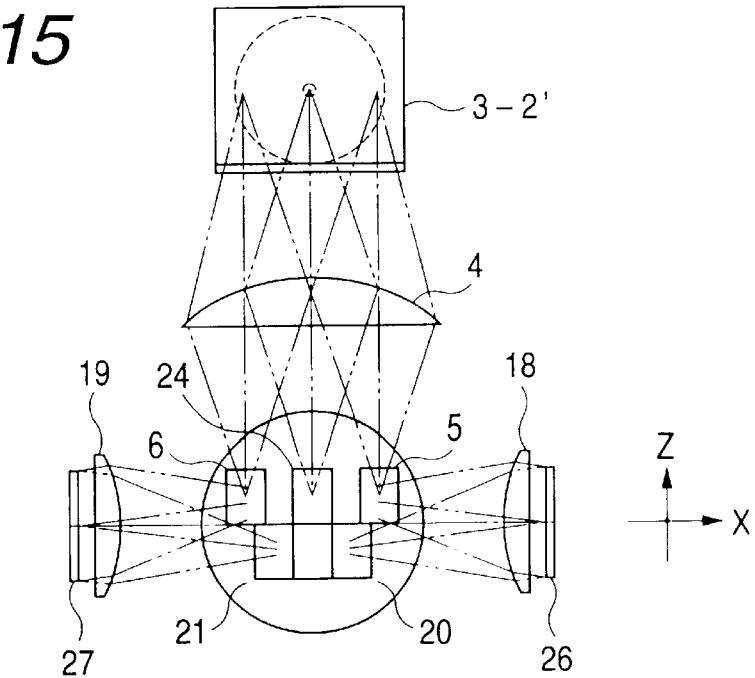
FIG. 15 is a view from the direction of an arrow A in FIG. 14.
Figure 16:
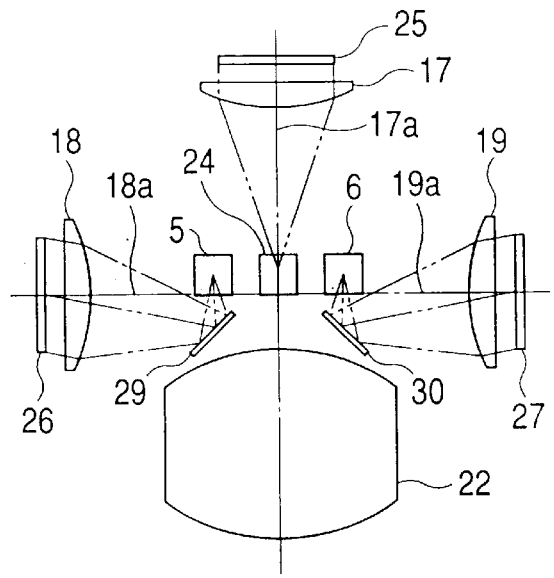
FIG. 16 is a view from the direction of an arrow B in FIG. 14.

FIGS. 14 to 17 are schematic views of the third embodiment of the present invention. In this embodiment, the apparatus is applied to a color liquid crystal projector using a reflection liquid crystal panel as an optical modulation element. FIG. 14 is a front view. FIG. 15 is a view from the direction of an arrow A in FIG. 14. FIG. 16 is a view from the direction of an arrow B in FIG. 14, which explains an optical system arranged on the upper side of an optical axis 22a of a projection optical system 22 shown in FIG. 14.

Figure 17:
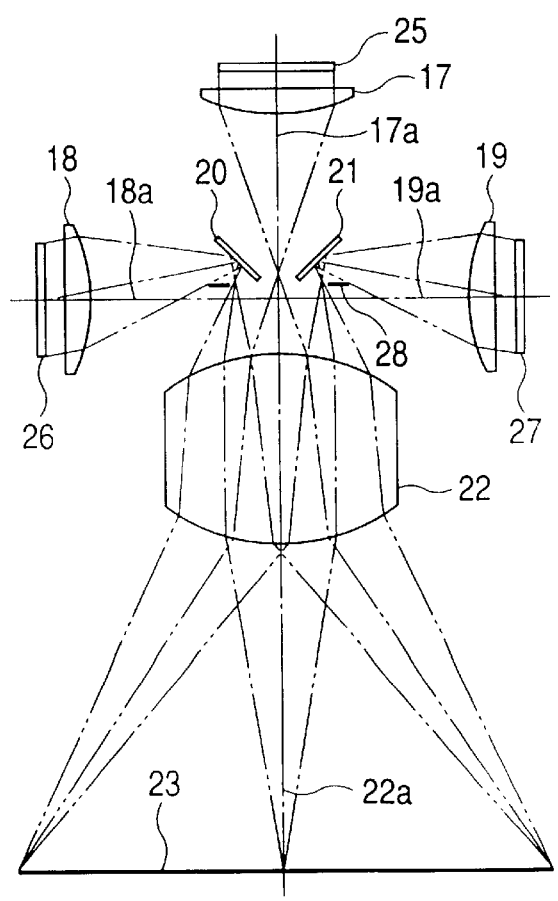
FIG. 17 is an explanatory view of part of the arrangement viewed from the direction of the arrow B in FIG. 14.
Figure 18:
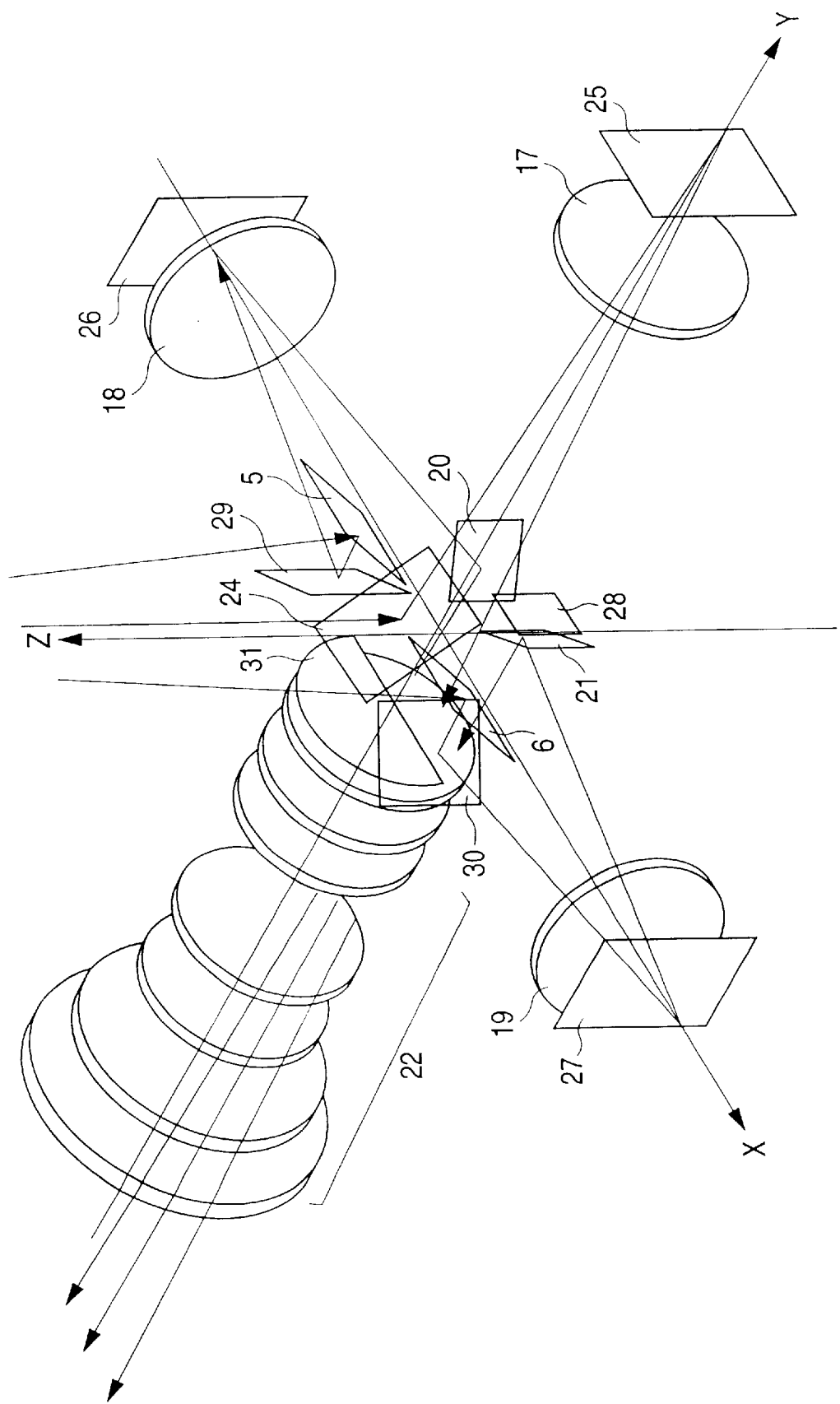
FIG. 18 is a perspective view partially showing the third embodiment of the present invention.

FIG. 17 is another view from the direction of the arrow B in FIG. 14, which explains an optical system arranged on the lower side of the optical axis 22a of the projection optical system 22 shown in FIG. 14. FIG. 18 is a bird's-eye view for explaining the mirror arrangement in the color separation optical system and the color synthesis optical system of the third embodiment of the present invention.

Referring to FIG. 14, white light W emitted by a light source 1 (light source means) is roughly collimated by a reflector 2 (parabolic mirror) and separated into light components corresponding to R, G, and B wavelengths by a reflection diffraction grating (color separation means) 3-2'. The reflection diffraction grating 3-2' is arranged in the roughly collimated light from the reflector 2 to prevent color variations or luminance variation of illumination.

Figure 19:
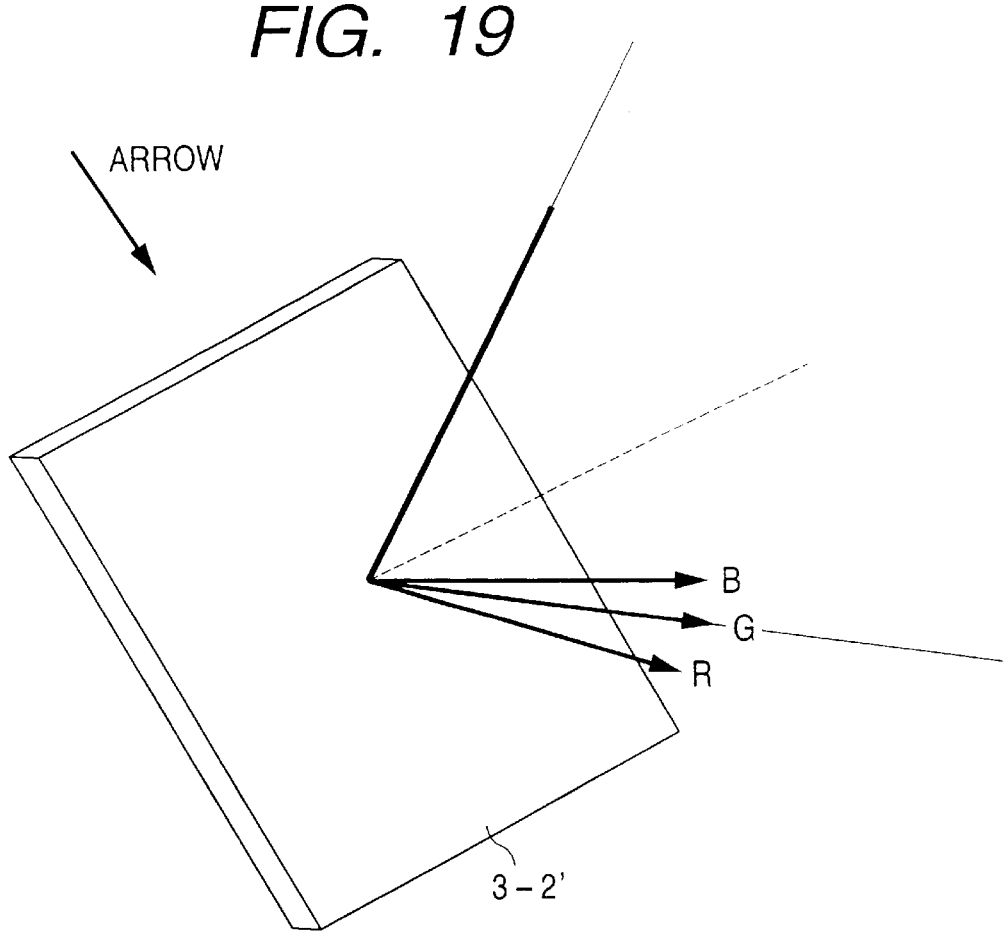
FIG. 19 is an explanatory view of a color separation means shown in FIG. 14.
Figure 20:
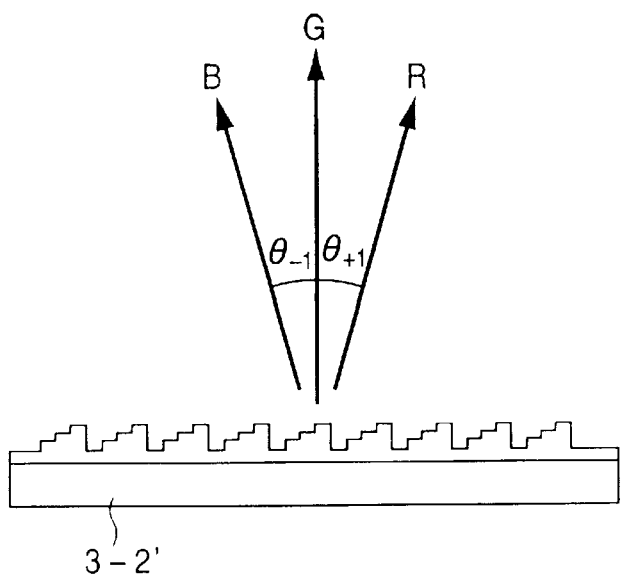
FIG. 20 is an explanatory view of the color separation means shown in FIG. 14.

The structure of the reflection diffraction grating 3-2' of this embodiment will be described with reference to FIGS. 19 and 20. FIG. 20 is a sectional view from the direction of an arrow in FIG. 19. In FIG. 19, the lines of the grating are parallel to a plane defined by the 0th-order diffraction light incident surface/reflection surface. The fine echelon grating structure extends along the plane defined by a surface on and by which the 0th-order diffraction light is incident and reflected, as shown in FIG. 20. The ±1st-order diffraction light is generated in the direction perpendicular to the plane. This manner of use of the diffraction grating is called conical diffraction.

To easily build the color separation optical system using mirrors as the characteristic feature of this embodiment, the separation angle of the ±1st-order diffraction light must be as large as 5° to 10°. When the ±1st-order diffraction light is generated in the same plane as that formed by a surface on and by which the 0th-order diffraction light is incident and reflected (FIG. 11), eclipse occurs in the vertical plane of the echelon grating to undesirably lower the diffraction efficiency. In this embodiment, this problem is solved by using conical diffraction of the reflection diffraction grating.

In a combination of a reflection liquid crystal panel and a reflection diffraction grating, when conical diffraction of the reflection diffraction grating is used, as in this embodiment, the light source unit 1, the reflector 2, and the projection optical system 22 which occupy a large area in the optical system can be arranged on the same plane, as shown in FIG. 14, so the projector apparatus can be made compact.

The color light components (R, G, and B light components) from the diffraction grating 3-2' are incident on a condenser lens (lens means) 4 at different angles along the direction perpendicular to the drawing of FIG. 14. The light components are brought to a focus through the condenser lens 4 to form light source images in the vicinity bf mirrors 24, 5, and 6 arranged tilted at an interval near a stop 28 of the projection optical system 22.

In the section shown in FIG. 14, the G light component is reflected by the mirror 24, roughly collimated by a field lens 17, and obliquely illuminates a reflection liquid crystal panel 25 from the upper side. The light beam modulated by the liquid crystal panel 25 in accordance with image information is obliquely reflected by the reflection liquid crystal panel 25 to the lower side and brought to a focus through the field lens 17 to form a light source image again between mirrors 20 and 21 arranged near the stop 28 of the projection optical system 22. The stop 28 is arranged to occupy approximately ½ of the entrance pupil of the projection optical system 22.

The R and B light components will be described next with reference to FIGS. 15 to 17. The R light component is sequentially reflected by the mirrors 5 and 29, roughly collimated by a field lens 18, and illuminates a reflection liquid crystal panel 26. The R light component illuminates the liquid crystal panel obliquely from the upper side in the section shown in FIG. 15, like the G light component, and obliquely from the lower side in the section shown in FIG. 16. The light beam modulated by the liquid crystal panel 26 in accordance with image information is reflected by the reflection liquid crystal panel 26 to the side opposite to the illumination light incident direction and brought to a focus through the field lens 18 to form a light source image again on the mirror 20 arranged near the stop 28 of the projection optical system 22.

In the same way, the B light component is sequentially reflected by the mirrors 6 and 30, roughly collimated by a field lens 19, and illuminates a reflection liquid crystal panel 27. The B light component illuminates the liquid crystal panel obliquely from the upper side in the section shown in FIG. 15, like the G light component, and obliquely from the lower side in the section shown in FIG. 16. The light beam modulated by the liquid crystal panel 27 in accordance with image information is reflected by the reflection liquid crystal panel 27 to the side opposite to the illumination light incident direction and brought to a focus through the field lens 19 to form a light source image again on the mirror 21 arranged near the stop 28 of the projection optical system 22.

The G light component passes between the mirrors 20 and 21, and the R and B light components are reflected by the mirrors 20 and 21, respectively. Then, the light components are guided to the projection optical system 22. The projection optical system 22 synthesizes the pieces of image information from the liquid crystal panels 25 to 27 into a full-color image and projects it on a screen 23. The field lenses 18 and 19 have a common optical axis (alternate long and short dashed line) 18a (19a) perpendicular to an optical axis 17a of the field lens 17.

Each of the mirrors 20 and 21 is arranged at an angle of 45° with respect to the common optical axis. The angle formed by the two mirrors is 90°. When the mirror surfaces of the mirrors 20 and 21 are extended toward the projection optical system 22, they cross at the intersection of the common optical axis (18a or 19a) of the field lenses 18 and 19 and the optical axis 17a of the field lens 17.

When the field lens 18 and the liquid crystal panel 26 are folded back about the mirror 20, they overlap the field lens 17 and the liquid crystal panel 25.

Likewise, when the field lens 19 and the liquid crystal panel 27 are folded back about the mirror 21, they overlap the field lens 17 and the liquid crystal panel 25. That is, the liquid crystal panels are arranged at optically equivalent positions with respect to the projection optical system 22. The light beams from the liquid crystal panels 25 to 27 pass through different portions of the stop 28 of the projection optical system 22 and are synthesized into a full-color image on the screen 23.

To obtain this relationship, the liquid crystal panels 15 and 16 are arranged on the optical axes of the corresponding field lenses. The liquid crystal panels 26 and 27 are illuminated with light beams tilted with respect to the optical axis in the sections shown in FIGS. 16 and 17. Each of the images of the R, G, and B light components, which are formed through the field lenses 17, 18, and 19, respectively, has a size fit for the stop 28 of the projection optical system 22, so that the light beams can be efficiently used.

The mirrors 5, 6, 24, 29, and 30 form one element of the mirror means, and the mirrors 20 and 21 one element of the second deflection means. The characteristic features of the elements of this embodiment will be described next with reference to FIGS. 19 to 21.

Figure 21:
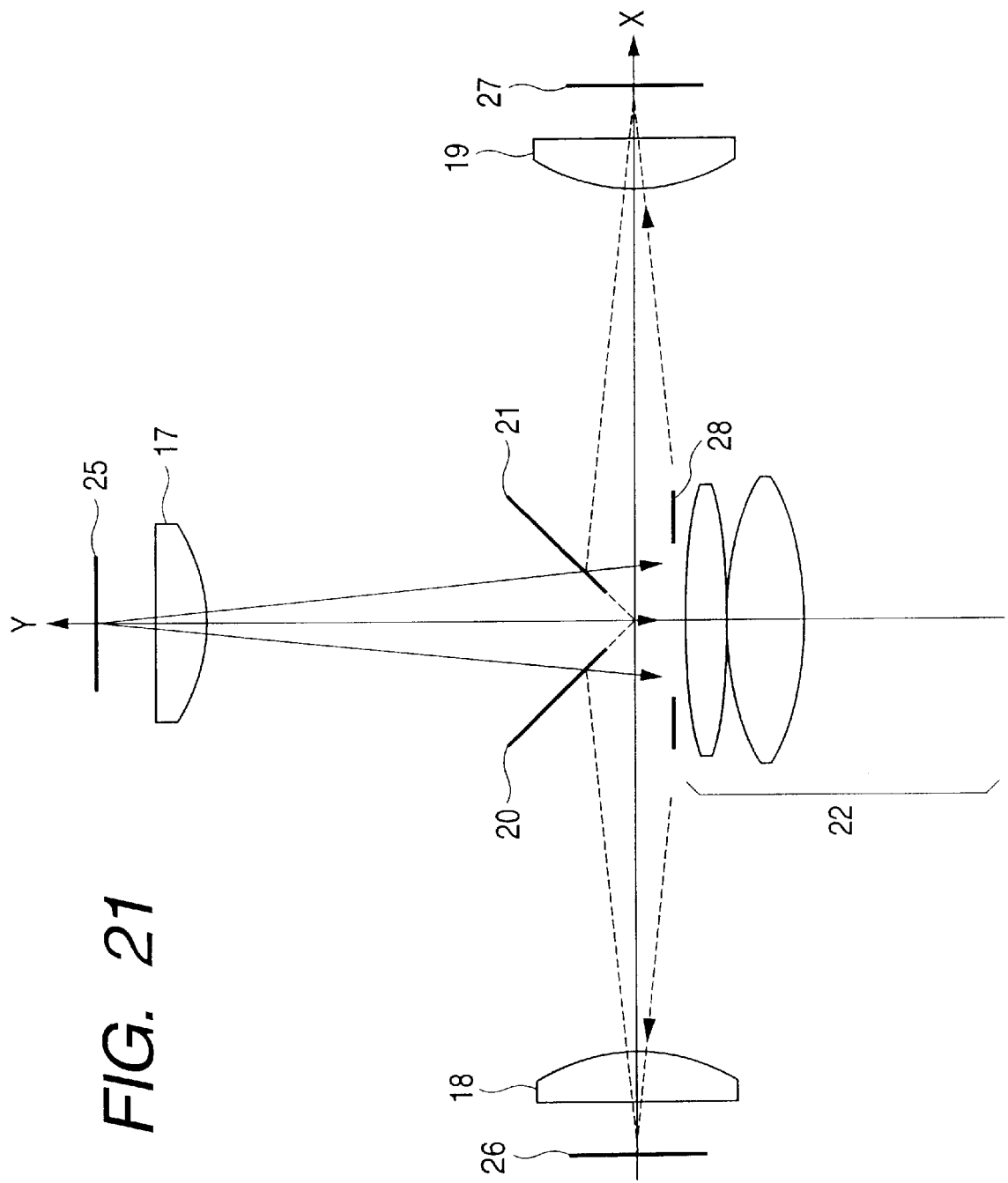
FIG. 21 is a schematic view of the third embodiment of the present invention.

In FIG. 21, the optical path of the field lens 18 and the liquid crystal panel 26 which are folded back about the mirror 20 and the optical path of the field lens 19 and the liquid crystal panel 27 which are folded back about the mirror 21 are indicated by solid lines, and the actual optical paths are indicated by dotted lines. Each optical path is represented by the principal ray from the liquid crystal panel.

The liquid crystal panels are arranged at optically equivalent positions with respect to the projection optical system. The light beams from the liquid crystal panels travel through different portions of the stop 28 of the projection optical system 22 and are synthesized into the full-color image on the screen. Note that only the rear element of the projection optical system 22 is illustrated. To match the liquid crystal panel positions, and make the light beams pass through different portions of the stop 28 of the projection optical system 22, at least the liquid crystal panels 26 and 27 are illuminated with light beams tilted with respect to the optical axis in the X-Y plane, as shown in FIG. 21.

To form a Schlieren optical system using reflection liquid crystal panels, the liquid crystal panels are illuminated with light beams tilted with respect to the optical axes in the Z-X plane, as shown in FIG. 15. In addition, when the liquid crystal panels and field lenses are arranged on the common optical axis, as described above, the pixels match over the entire screen with minimum distortion, thereby obtaining a high-resolution projected image. Each of the images of the R, G, and B light components, which are formed through the field lenses 17, 18, and 19, respectively, has a size fit for the stop 28 of the projection optical system, so that the light beams can be efficiently used.

The light beam is incident on the reflection color separation diffraction grating 3-2' at an incident angle i. In conical diffraction, ±1st-order diffraction light beams are generated in a direction almost perpendicular to a plane including the incident angle i. When the diffraction angle is small, a diffraction angle $\theta_{\pm1}$ of the 1st-order diffraction light with respect to the 0th-order diffraction light is approximately represented by:

$$\sin\theta_{\pm1} = \lambda_{\pm1}/P \qquad [2']$$

where p is the pitch of the echelon grating, and $\lambda_{\pm1}$ is the peak wavelength of the diffraction light.

The R light component as +1st-order diffraction light and the B light component as −1st-order diffraction light are asymmetrical. The mirrors 29 and 30 are tilted by angles for correcting these asymmetrical diffraction angles, so the liquid crystal panels 26 and 27 are illuminated at an equal tilt angle. Thus the light beams synthesized by the mirrors 20 and 21 can be efficiently transmitted through the stop 28 of the projection optical system 22 and guided to the screen.

In conical diffraction, literally, conical diffraction light is generated, so the +1st-order diffraction light beams are shifted along the plane including the incident angle i. The tilt angles of the mirrors 5 and 6 may be set such that the liquid crystal panels 26 and 27 are illuminated at an angle equal to that of the liquid crystal panel 25.

FIG. 18 is a perspective view of the mirrors 24, 5, 6, 29, and 30 in the color separation illumination optical system and the mirrors 20 and 21 in the color synthesis optical system. The positional relationship of the mirrors can be understood from this drawing. In FIG. 18, optical components from the light source 1 to the condenser lens 4 are omitted. A light shielding plate 31 is arranged on the upper half portion of the rear element of the projection optical system 22 to prevent stray light from the color separation illumination optical system from directly entering the projection optical system 22. By using the light shielding plate 31, a high-contrast projected image free from stray light is obtained.

The mirror means (5, 6, 24, 29 and 30) and the second deflection means (20 and 21) are respectively arranged in two areas formed by dividing the aperture of the stop 28 of the projection optical system 22 into areas including the optical axis 22a.

In this embodiment, the color separation optical system and the color synthesis optical system are preferably constituted such that the green light component passes through the central portion of the stop 28 of the projection optical system 22, and the blue and red light components the peripheral portion of the stop, as in the first embodiment. With this arrangement, a projected image having a high resolution can be obtained.

The mirrors in this embodiment are preferably high-reflection Al (aluminum) mirrors. When the mirrors 5, 29, and 20 have reflection increasing films for increasing the reflectance in the red band, and the mirrors 6, 30, and 21 have reflection increasing films for increasing the reflectance in the blue band, the efficiency of utilization of light from the light source is improved, and a bright image can be obtained on the screen.

The diffraction grating 3-2' as the color separation element of this embodiment can be easily copied by the replica technique. The mirrors 24, 5 and 6 for guiding the light beams from the diffraction grating as a color separation element are high-reflection mirrors.

These mirrors are arranged at a position where light source images are formed by the condenser lens 4, and can have a small size as far as they can reflect the light source images. Similarly, the mirrors 29 and 30 for guiding the light beams reflected by the mirrors 5 and 6 may also be high-reflection mirrors.

Likewise, the mirrors 20 and 21 for synthesizing light beams from the liquid crystal panels are high-reflection mirrors. These mirrors are arranged at a position where light source images are formed by the field lenses 18 and 19, and can have a small size as far as they can reflect the light source images.

A liquid crystal panel suitable for this embodiment is, e.g., a polymer dispersed liquid crystal panel. When the white level is to be displayed, the polymer dispersed liquid crystal becomes transparent to reflect light beams, and when the black level is to be displayed, the liquid crystal scatters incoming light beams. The light beams reflected by the liquid crystal panel are brought to a focus near the stop 28 of the projection optical system 22 by the field lenses 17 to 19, respectively. Most light components reflected by the liquid crystal panels pass through the stop aperture 28 to display the white level on the screen 23 through the projection optical system 22.

However, only a few of light beams scattered by the liquid crystal panels pass through the aperture of the stop 28 to display the black level on the screen 23. When a convex lens is used as a field lens on the projection optical system 22 side, hardly any reflected light beams from the lens vertex reach the screen, so a high-contrast projected image can be obtained. More specifically, when not a convex lens but a plano-convex lens is used on the liquid crystal panel side, reflected light beams from the surface on the liquid crystal panel side are not brought to a focused on the screen, so a high-contrast projected image can be obtained.

In this embodiment, the white light beam W from one light source is separated into the R, G, and B light components using the diffraction grating 3-2'. Alternatively, a plurality of light sources may be arranged in units of colors.

As described above, the color separation optical system of this embodiment is formed mainly using high-reflection mirrors which can be easily manufactured, instead of using any expensive cross dichroic prism which is difficult to manufacture. According to this embodiment, the light beam is never transmitted through a tilted flat type dichroic mirror, unlike the prior art. Therefore, no astigmatism is generated, and an image having a satisfactory resolution can be obtained, as in the second embodiment.

Figures 22, 23:
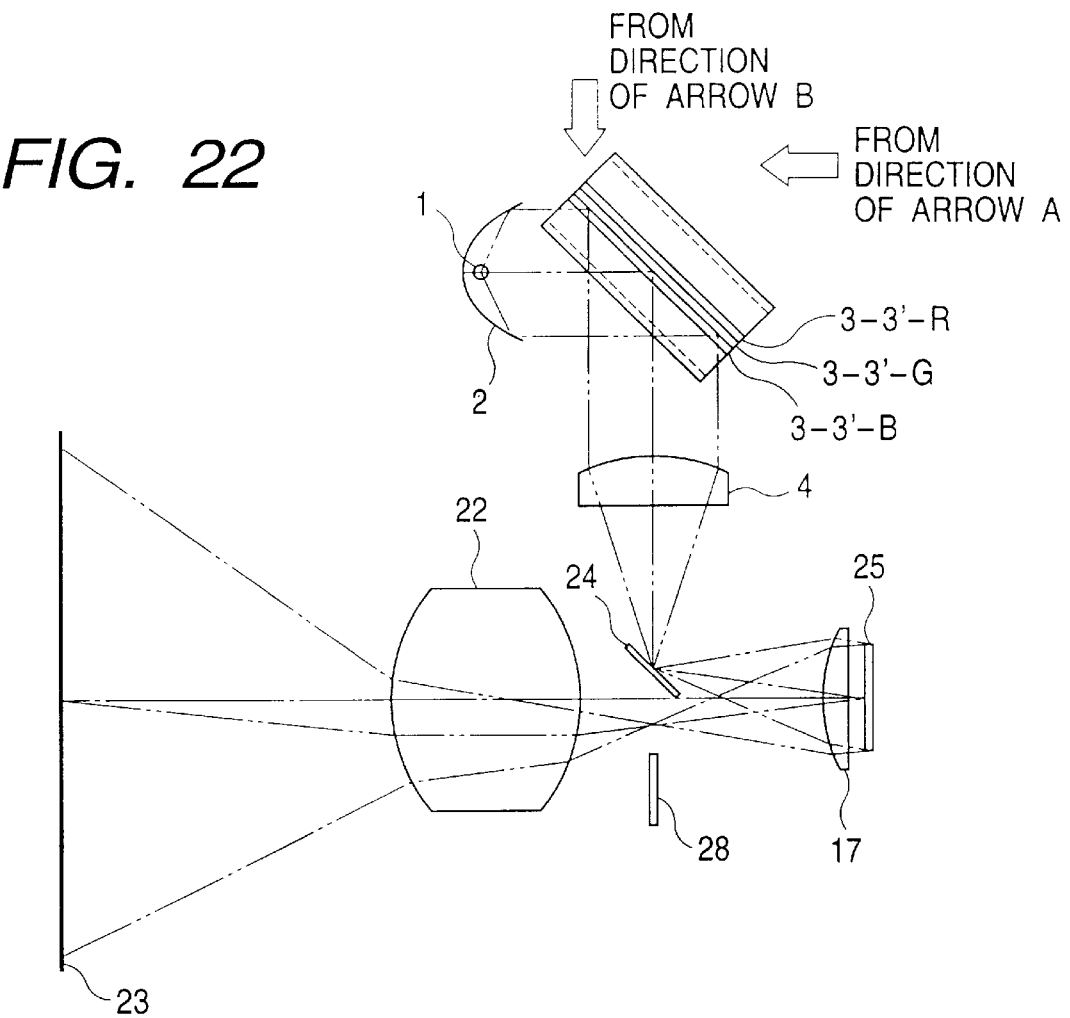
FIG. 22 is a front view of the fourth embodiment of the present invention.
FIG. 23 is a view from the direction of an arrow A in FIG. 22.

FIGS. 22 and 23 are schematic views of the fourth embodiment of the present invention. The fourth embodiment has the same arrangement as that of the third embodiment except that a plurality of dichroic mirrors are used as color separation elements.

FIG. 22 is a front view, and FIG. 23 is a view from the direction of an arrow A in FIG. 22. A view from the direction of an arrow B in FIG. 22 is the same as FIG. 16, and a detailed description thereof will be omitted. Similarly, a view for explaining an optical system below an optical axis 22a of a projection optical system 22 in FIG. 22 is the same as FIG. 17, and a detailed description thereof will be omitted.

The same reference numerals as in FIG. 14 denote the same optical elements in FIG. 22. In FIG. 22, the reflection diffraction grating 3-1 shown in FIG. 14 is replaced with three dichroic mirrors 3-3'-R, 3-3'-G, and 3-3'-B as shown in FIG. 12, and the remaining portions are the same as in FIG. 14.

White light emitted by a light source 1 is roughly collimated by a reflector 2 (parabolic mirror) and separated into light components corresponding to R, G, and G wavelength bands by the three dichroic mirrors. The dichroic mirrors 3-3'-R, 3-3'-G, and 3-3'-B are inserted in the nearly collimated light from the reflector to prevent color variations or luminance variation of illumination.

The arrangement of the three dichroic mirrors will be described with reference to FIGS. 24 and 25.

Figure 24:
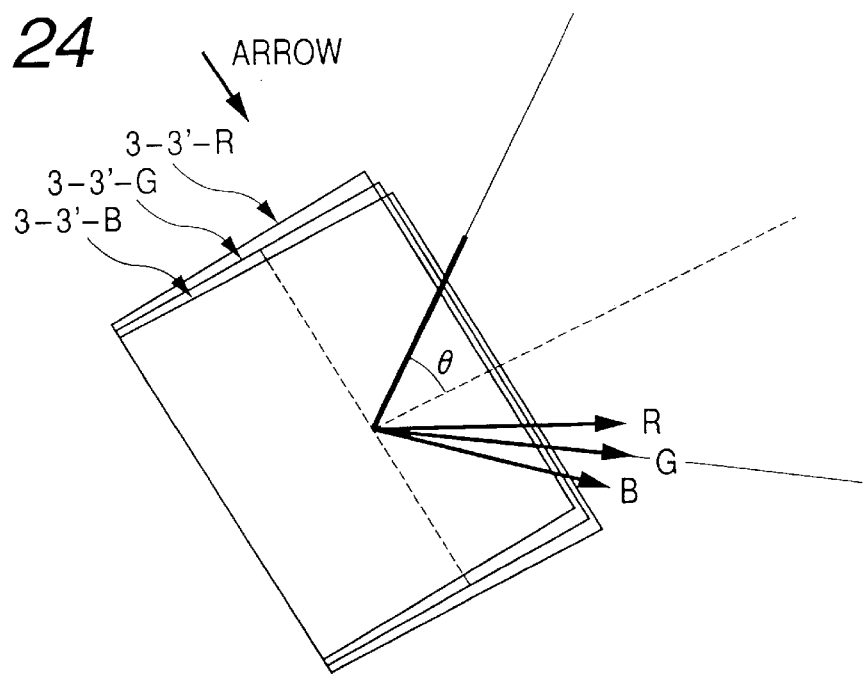
FIG. 24 is an explanatory view of a color separation means shown in FIG. 22.
Figure 25:
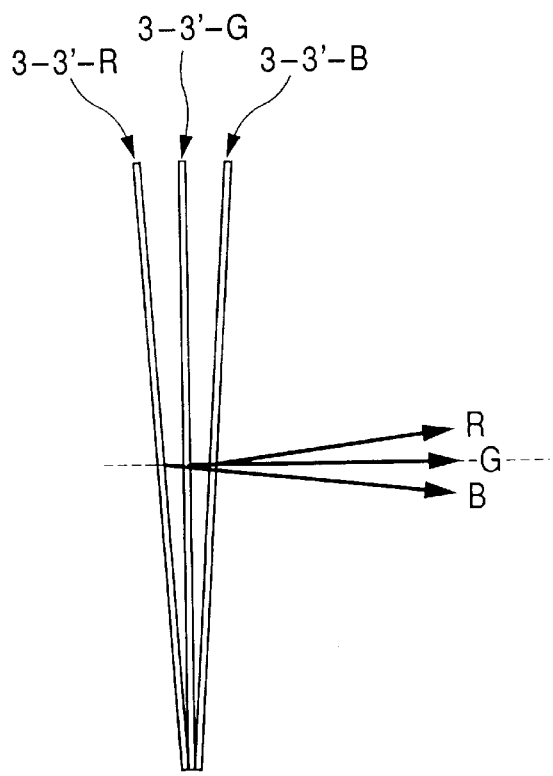
FIG. 25 is an explanatory view of the color separation means shown in FIG. 22.

FIG. 25 is a sectional view from the direction of an arrow in FIG. 24. The dichroic mirror 3-3'-B has spectral characteristics in which the light component in the blue wavelength band is reflected, and green and red light components are transmitted. The dichroic mirror 3-3'-G has spectral characteristics in which the light component in the green wavelength band is reflected, and blue and red light components are transmitted. The dichroic mirror 3-3'-R has spectral characteristics in which the light component in the red wavelength band is reflected, and the orange wavelength band is transmitted. The dichroic mirrors are tilted so that the reflected light is separated into light components in the R, G, and B wavelengths. A simple high-reflection mirror can be used in place of the dichroic mirror 3-3'-R.

In FIG. 24, the direction of separation of the color light components is perpendicular to a plane defined by a surface on and by which the G light component is incident and reflected, as shown in FIG. 25. In a combination of a reflection liquid crystal panel and three dichroic mirrors, when the dichroic mirrors are arranged as in this embodiment, the light source unit 1, the reflector 2, and the projection optical system 22, which occupy a large area in the optical system, can be arranged on the same plane, as shown in FIG. 22, so the projector apparatus can be made compact. However, when the color light component separation direction and the reflected light deflection direction are in the same plane, as shown in FIG. 12, the same effect as described above can hardly be obtained.

Figure 26:
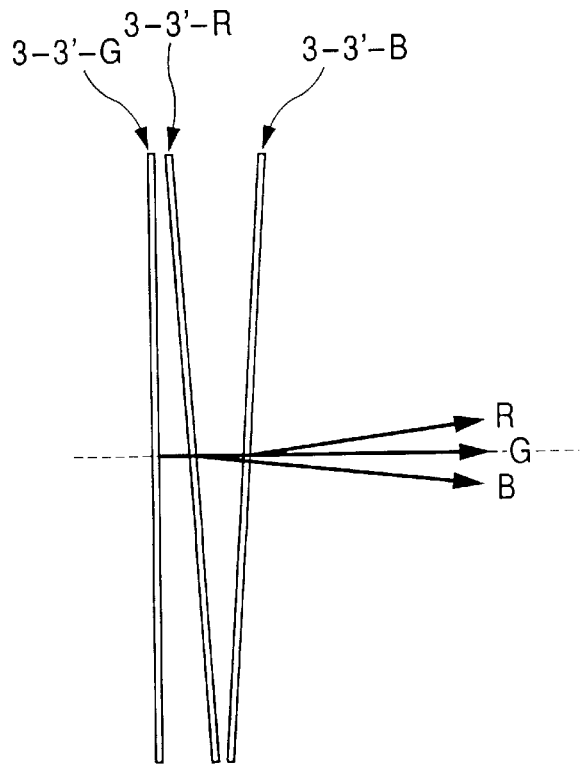
FIG. 26 is an explanatory view of the color separation means shown in FIG. 22.

The three dichroic mirrors may be arranged as shown in FIG. 26. In this case, the dichroic mirror 3-3'-G can have wedge filter spectral characteristics in which the light beam in the green wavelength band is reflected, and orange and red light components are transmitted. With this arrangement, bandpass filter characteristics in which the light component in the green wavelength band is reflected, and the blue and red light components are transmitted are not required. Since the number of films to be formed decreases, the dichroic mirror can be easily manufactured.

The transmittance of the bandpass filter is approximately 90% at most. For this reason, when the dichroic mirrors are placed as shown in FIG. 25, the light beam from the dichroic mirror 3-3'-R traverses the dichroic mirror 3-3'-G twice, so the attenuation cannot be ignored.

Generally, for a metal halide lamp or a high-pressure mercury lamp used as the light source of a liquid crystal projector, the amount of the bright line in the green band is large, and the amounts of light in the blue and red bands are smaller. That is, with the arrangement shown in FIG. 26, blue and red light can be efficiently used, a bright projected image can be obtained on the screen.

Referring back to FIG. 22, the R, G, and B light components from a color separation element 3-3 are incident on a condenser lens 4 at different angles along the direction perpendicular to the drawing of FIG. 22. The light components are focused through the condenser lens 4 to form light source images in the vicinity of mirrors 24, 5, and 6 arranged tilted at an interval near a stop 28 of the projection optical system 22.

In the section shown in FIG. 22, the G light component is reflected by the mirror 24, roughly collimated by a field lens 17, and obliquely illuminates a reflection liquid crystal panel 25 from the upper side. The light beam modulated by the liquid crystal panel 25 in accordance with image information is obliquely reflected by the reflection liquid crystal panel 25 to the lower side and focused through the field lens 17 to form a light source image again between mirrors 20 and 21 arranged near the stop 28 of the projection optical system 22. The stop 28 is arranged to occupy approximately ½ of the entrance pupil of the projection optical system 22.

The R and B light components will be described next with reference to FIG. 23. The R light component is sequentially reflected by the mirrors 5 and 29 (see FIG. 18), roughly collimated by a field lens 18, and illuminates a reflection liquid crystal panel 26. The light beam modulated by the liquid crystal panel 26 in accordance with image information is reflected by the reflection liquid crystal panel 26 to the side opposite to the illumination light incident direction and focused through the field lens 18 to form a light source image again on the mirror 20 arranged near the stop 28 of the projection optical system 22.

Similarly, the B light component is sequentially reflected by the mirrors 6 and 30 (FIG. 18), roughly collimated by a field lens 19, and illuminates a reflection liquid crystal panel 27. The light beam modulated by the liquid crystal panel 27 in accordance with image information is reflected by the reflection liquid crystal panel 27 to the side opposite to the illumination light incident direction and focused through the field lens 19 to form a light source image again on the mirror 21 arranged near the stop 28 of the projection optical system 22.

The G light component passes between the mirrors 20 and 21, and the R and B light components are reflected by the mirrors 20 and 21, respectively. Then, the light components are guided to the projection optical system 22. The projection optical system 22 synthesizes the pieces of image information from the liquid crystal panels 25 to 27 into a full-color image and projects it on a screen 23.

The positional relationship among the field lenses 17 to 19, the reflection liquid crystal panels 25 to 27, and the mirrors 20 and 21 are the same as in the third embodiment. That is, the liquid crystal panels are arranged at optically equivalent positions with respect to the projection optical system 22. The light beams from the liquid crystal panels are transmitted through different portions of the stop 28 of the projection optical system 22 and synthesized into a full-color image on the screen 23.

Each of the images of the R, G, and B light components, which are formed through the field lenses 17, 18, and 19, respectively, has a size fit for the stop 28 of the projection optical system 22, so that the light beams can be efficiently used. The color separation optical system and the color synthesis optical system are preferably constituted such that the green light component is arranged at the central portion of the stop 28 of the projection optical system 22, and the blue and red light components pass through the peripheral portion of the stop. With this arrangement, a projected image having a high resolution can be obtained.

Since the mirrors in this embodiment are high-reflection Al (aluminum) mirrors optimized for the wavelength bands to be used, as in the third embodiment, the efficiency of utilization of light from the light source is improved, and a bright image can be obtained on the screen.

The three flat dichroic mirrors shown in FIGS. 24, 25, and 26 of this embodiment, or a combination of two flat dichroic mirrors and a high-reflection mirror can be relatively easily manufactured. Each of the high-reflection mirrors 24, 5, and 6 for guiding the light beams from the dichroic mirrors to the corresponding liquid crystal panels has a small size. Each of the high-reflection mirrors 20 and 21 for synthesizing the light beams from the liquid crystal panels also has a small size.

A liquid crystal panel suitable for this embodiment is, e.g., a polymer dispersed liquid crystal panel, as in the third embodiment.

As described above, even in a combination with reflection liquid crystal panels, the color separation optical system and the color synthesis optical system of this embodiment can be formed mainly using high-reflection mirrors without using any cross dichroic prism which is hard to manufacture. According to this embodiment, an incoming light beam is never transmitted through a tilted flat type dichroic mirror, unlike the prior art. Therefore, no astigmatism is generated, and an image having a satisfactory resolution can be obtained, as in the third embodiment.

Figure 27:
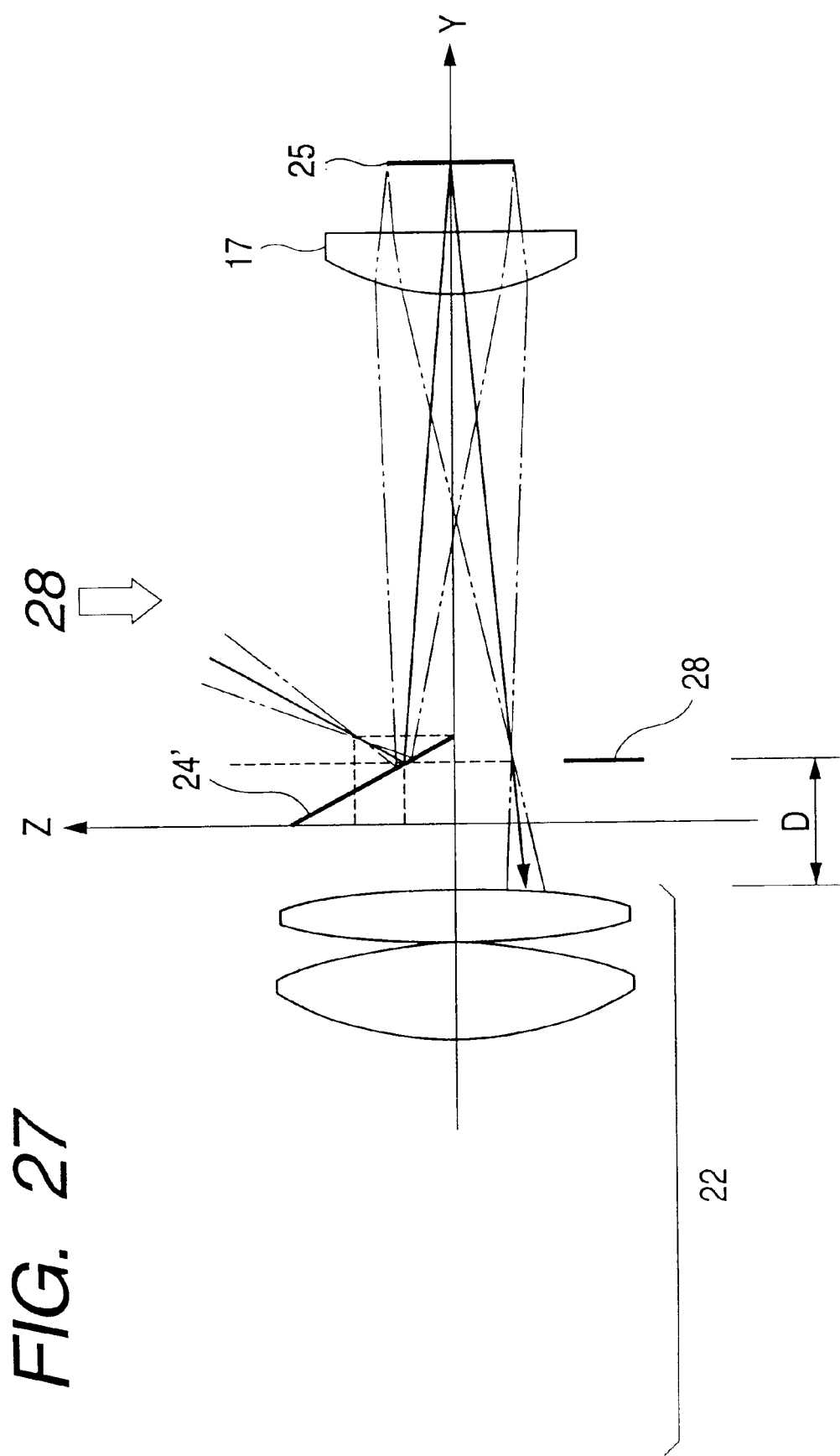
FIG. 27 is a front view of the fifth embodiment of the present invention.
Figure 28:
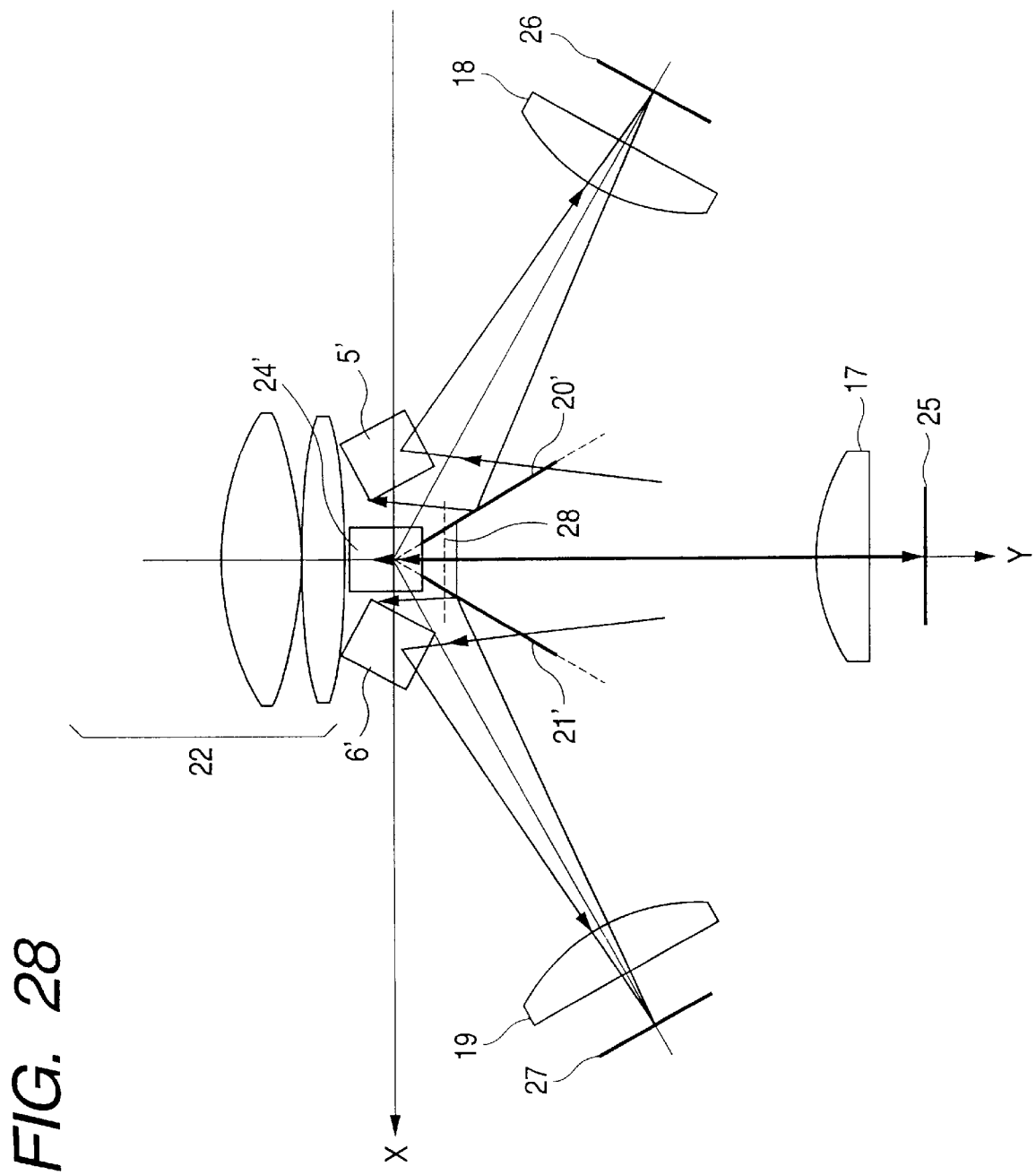
FIG. 28 is an explanatory view of part of the arrangement shown in FIG. 27.
Figure 29:
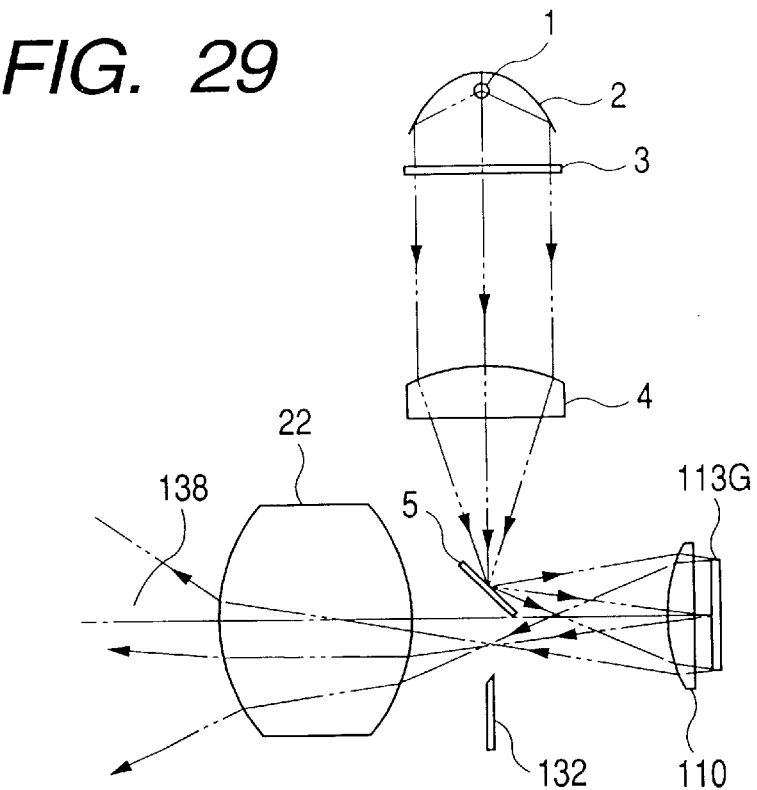
FIG. 29 is a side view of the sixth embodiment of the present invention.

FIGS. 27 and 28 are schematic views of the fifth embodiment of the present invention. The fifth embodiment has the same arrangement as that of the third embodiment except that at least one of the mirrors of the illumination optical system is three-dimensionally arranged.

FIG. 27 is a front view, and FIG. 28 is a view from the direction of an arrow 28 in FIG. 27. Optical elements from the light source 1 and the reflector 2 to the condenser lens 4 are omitted. As a color separation element, a transmission diffraction grating, a reflection diffraction grating, or a combination of three dichroic mirrors may be used. The same reference numerals as in FIGS. 14 to 18 denote the same optical elements in FIGS. 27 and 28.

Referring to FIGS. 27 and 28, R, G, and B light components from the color separation element are incident on a condenser lens 4 (not shown) at different angles along the direction perpendicular to the drawing of FIG. 27. The light from the light source is focused through the condenser lens 4 to form a light source image in the vicinity of mirrors 24', 5', and 6' shown in FIG. 28 arranged tilted at an interval near a stop 28 of a projection optical system 22 (only the rear element thereof is illustrated).

In this embodiment, the light beam is incident at an angle of 60° with respect to an optical axis 22a of the projection optical system 22. In the section shown in FIG. 27, the G light component is reflected by the mirror 24', roughly collimated by a field lens 17, and obliquely illuminates a reflection liquid crystal panel 25 from the upper side. The light beam modulated by the liquid crystal panel 25 in accordance with image information is obliquely reflected by the reflection liquid crystal panel 25 to the lower side and focused through the field lens 17 to form a light source image again between mirrors 20' and 21' arranged near the stop 28 of the projection optical system 22.

The R and B light components will be described next with reference to FIG. 28. The R light component is sequentially reflected by the mirrors 5' and 29', roughly collimated by a field lens 18 having an optical axis set at 60° with respect to the optical axis of the field lens 17, and illuminates a reflection liquid crystal panel 26. The light beam modulated by the liquid crystal panel 26 in accordance with image information is reflected by the reflection liquid crystal panel 26 to the side opposite to the illumination light incident direction and focused through the field lens 18 to form a light source image again on the mirror 20' arranged near the stop 28 of the projection optical system 22. The mirror 57 is three-dimensionally tilted so the plane including the normal is neither parallel nor perpendicular to the liquid crystal panel 26.

The mirror 29' is tilted such that a normal to itself is on the Y-Z plane.

Similarly, the B light component is sequentially reflected by the mirrors 6' and 30', roughly collimated by a field lens 19 having an optical axis set at 60° with respect to the optical axis of the field lens 17, and illuminates a reflection liquid crystal panel 27.

The light beam modulated by the liquid crystal panel 27 in accordance with image information is reflected by the reflection liquid crystal panel 27 to the side opposite to the illumination light incident direction and focused through the field lens 19 to form a light source image again on the mirror 21' arranged near the stop 28 of the projection optical system 22. The mirror 6' is three-dimensionally tilted so the plane including the normal is neither parallel nor perpendicular to the liquid crystal panel 27. The mirror 30a is tilted such that a normal to itself is on the Y-Z plane.

The G light component passes between the mirrors 20' and 21', and the R and B light components are reflected by the mirrors 20' and 219' respectively. The light components are synthesized into a full-color image by the projection optical system 22 and projected on a screen 23.

The arrangement of the field lenses 17 to 19, the liquid crystal panels 25 to 27, and the mirrors 20' and 21', and the method of illuminating each liquid crystal 25 panel in this embodiment will be described next.

Each of the field lenses 18 and 19 has an optical axis set at an angle of 60° with respect to the optical axis of the field lens 17. Each of the mirrors 20' and 21' is arranged at an angle of 30' with respect to the optical axis of the field lens 17. The angle formed by the two mirrors is 60°. When the mirror surfaces of the mirrors 20' and 21' are extended toward the projection optical system, they cross at the intersection of the common optical axes of the field lenses 17, 18, and 19.

When the field lens 18 and the liquid crystal panel 26 are folded back about the mirror 20', they overlap the field lens 17 and the liquid crystal panel 25. Also, when the field lens 19 and the liquid crystal panel 27 are folded back about the mirror 21', they overlap the field lens 17 and the liquid crystal panel 25. As far as this relationship is satisfied, the mirror angle can be arbitrarily set. The mirror angle is preferably 30° to 60° in consideration of interference among the liquid crystal panels or interference between the liquid crystal panels and the projection optical system.

The liquid crystal panels are arranged at optically equivalent positions with respect to the projection optical system. The light beams from the liquid crystal panels are transmitted through different portions of the stop of the projection optical system 22 and synthesized into the full-color image on the screen. To match the liquid crystal panel positions, and make the light beams pass through different portions of the stop of the projection optical system 22, at least the liquid crystal panels 26 and 27 must be illuminated with light beams tilted with respect to the optical axes.

When the transmission diffraction grating 3-1 or reflection diffraction grating 3-2 is used as a color separation element, the diffraction angles of the ±1st-order diffraction light beams are different, so the mirrors 5' and 6' are asymmetrical about the Y-axis. In some cases, the illumination tilt angle of the liquid crystal panel 26 is also slightly different from that of the liquid crystal panel 27. However, when each the light source images of the R, G, and B light components, which are formed by the field lenses 17 to 19, respectively, has a size nearly fit for the stop 28 of the projection optical system, the efficiency of utilization of light transmitted through the stop does not largely lower. In this case, the optical path length in the illumination system slightly changes in units of three light beams although the color variations or luminance variations on the screen can be suppressed within a prescribed allowance.

When a combination of three dichroic mirrors (FIGS. 9, 25, and 26) is selected as a color separation element, the separation angles of the light components can be equalized. Therefore, an illumination system with more satisfactory conditions and a more efficient color synthesis optical system can be formed.

When the liquid crystal panels and field lenses are arranged on the common optical axis, as described above, the pixels match over the entire screen with minimum distortion, thereby obtaining a high-resolution projected image.

In addition, the color separation optical system and the color synthesis optical system are constituted such that the green light component passes through the central portion of the stop 28 of the projection optical system, and the blue and red light components the peripheral portion of the stop, thereby obtaining a projected image having a high resolution.

The mirror arrangement of the illumination optical system of this embodiment is characterized in that each field lens and the corresponding liquid crystal panel are not perpendicular to each other, and each mirror for guiding the light beam to the corresponding liquid crystal panel is three-dimensionally arranged. A plane including a normal to the mirror is neither parallel nor perpendicular to the liquid crystal panel. As compared to the optical arrangement of the fourth embodiment, this arrangement can reduce a distance D from the rear element of the projection optical system to the stop 28 of the projection optical system. When each field lens and the corresponding liquid crystal panel are not perpendicular to each other, the number of mirrors can be decreased relative to the fourth embodiment.

Normally, when reflection liquid crystal panels are combined with the optical system of the present invention, a reflection mirror must be arranged near the stop of the projection optical system. For this reason, the stop of the projection optical system must be set distantly behind the lens, and the projection optical system must be of a retrofocus type. When the distance D from the mirror is increased, the degree of retrofocus of the projection optical system increases. The number of lenses increases or the necessity for use of a number of special lenses such as aspherical lenses arises, resulting in an expensive projection optical system.

With the mirror arrangement of this embodiment, one mirror suffices. Therefore, the distance D can be made small to allow the use of a simple projection optical system. In addition, since the number of mirrors is reduced, the arrangement can be further simplified.

Since the mirrors in this embodiment are high-reflection Al (aluminum) mirrors optimized for the wavelength bands to be used, as in the third embodiment, the light utilization efficiency is improved, and a bright image can be obtained on the screen. Each of the high-reflection mirrors 24', 5', and 6' for guiding the light beams from the color separation element to the corresponding liquid crystal panels has a small size. Each of the high-reflection mirrors 20' and 21' for synthesizing the light beams from the liquid crystal panels also has a small size.

A liquid crystal panel suitable for this embodiment is, e.g., a polymer dispersed liquid crystal panel, as in the third embodiment.

As described above, even in a combination with reflection liquid crystal panels, the color separation optical system and the color synthesis optical system of this embodiment can be formed mainly using high-reflection mirrors without using any cross dichroic prism which is hard to manufacture.

According to this embodiment, an incoming light beam is never transmitted through a tilted flat type dichroic mirror, unlike the prior art. Therefore, no astigmatism is generated, and an image having a satisfactory resolution can be obtained. In addition, with the compact mirror arrangement, the projection optical system can be simplified.

This embodiment is suitable for a liquid crystal projector used as, e.g., a high-resolution computer monitor free from distortion because each field lens need not be decentered from the corresponding liquid crystal panel in the color separation illumination system of the color synthesis optical system. In addition, in this embodiment, a field lens is inserted between each liquid crystal panel and the projection optical system to reduce distortion and curvature of field while realizing a compact and wide-angled projection optical system 22. Furthermore, the compact mirror arrangement enables the use of a simple projection optical system. The projection optical system is further simplified because the number of mirrors decreases.

Figure 36:
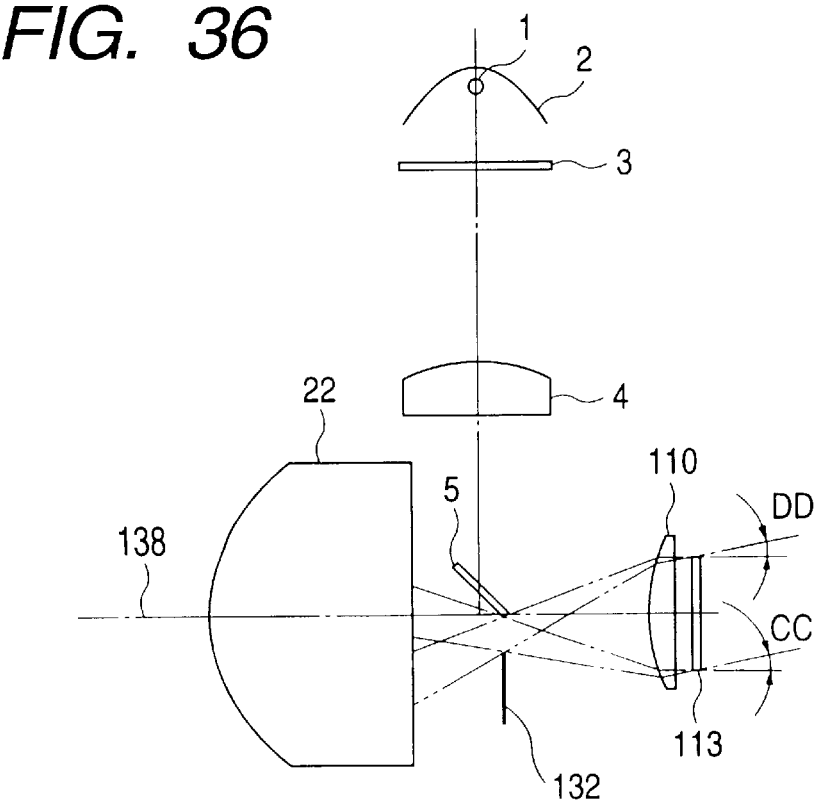
FIG. 36 is an explanatory view of the optical function of the light shielding member according to the present invention.
Figure 37:
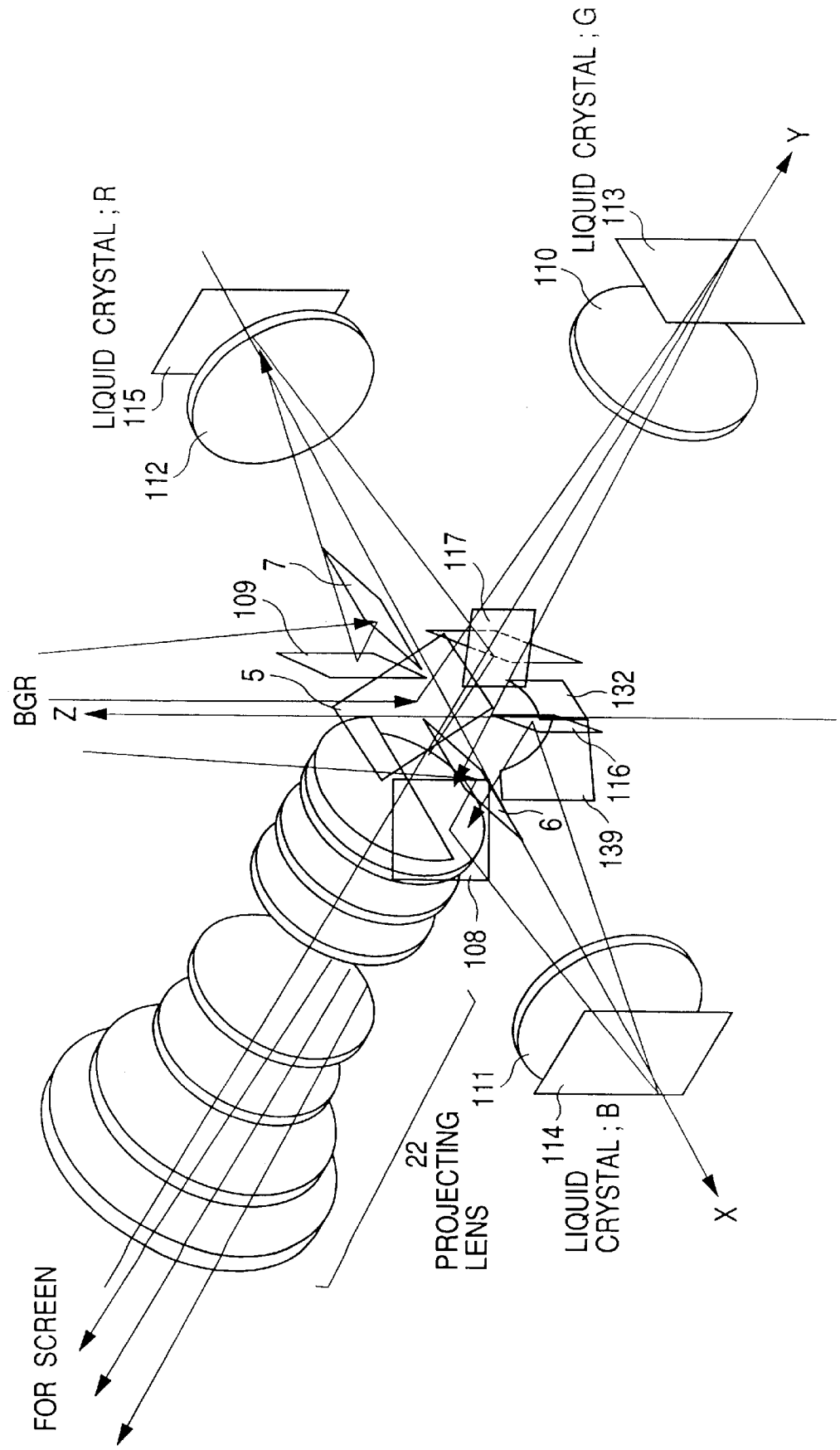
FIG. 37 is a perspective view partially showing the sixth embodiment of the present invention.
Figure 38:
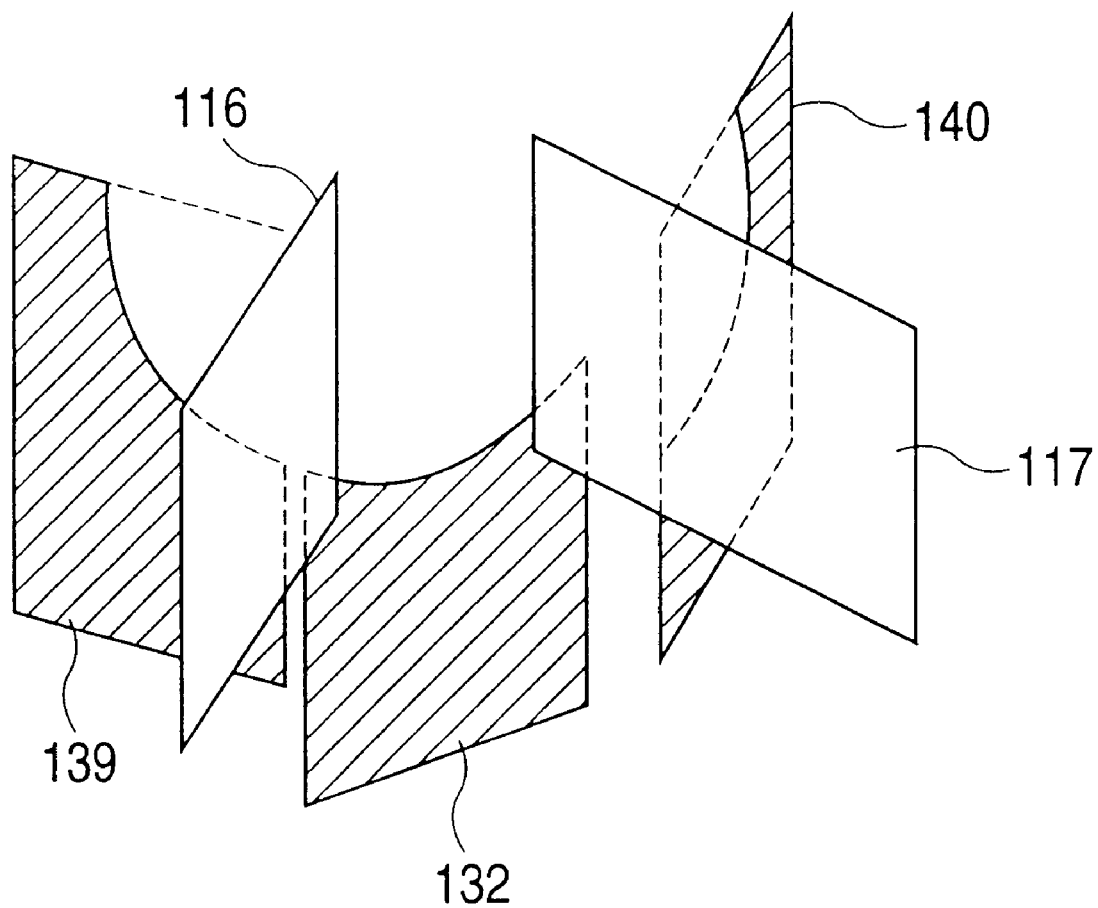
FIG. 38 is a view of part of the arrangement shown in FIG. 37.

FIGS. 29 to 32 are a side view, a rear view, a top view, and a bottom view of the sixth embodiment of the present invention, respectively. FIGS. 33 to 36 are explanatory views of the optical function of a stop according to the present invention. FIG. 37 is an enlarged explanatory view of part of the sixth embodiment of the present invention. FIG. 38 is an explanatory view of part of the arrangement shown in FIG. 37.

White light emitted by a light source (light source means) 1 is reflected and collimated by a reflector (parabolic mirror) 2, and separated into a plurality of color light components, e.g., three colors (three primary colors) of blue (B), green (G), and red (R) by a diffraction grating 3 as a color separation element. The color light components emerge from the diffraction grating at different angles. The three color light components separated by the diffraction grating 3 and emerging therefrom at different angles are focused through a condenser lens 4 and reflected by high-reflection mirrors 5, 6, and 7, respectively. The light component (blue light) reflected by the high-reflection mirror 6 travels toward a plano-convex lens 111 through a high-reflection mirror 108 and illuminates, as a collimated light beam, a reflection liquid crystal panel 114, i.e., an image modulation element (optical modulation element) for blue light.

The light component (green light) reflected by the high-reflection mirror 5 travels toward a plano-convex lens 110 and illuminates, as a collimated light beam, a reflection liquid crystal panel 113 for green light. The light component (red light) reflected by the high-reflection mirror 7 travels toward a plano-convex lens 112 through a high-reflection mirror 109 and illuminates a reflection liquid crystal panel 115 for red light. This apparatus also includes a stop 132.

Figure 32:
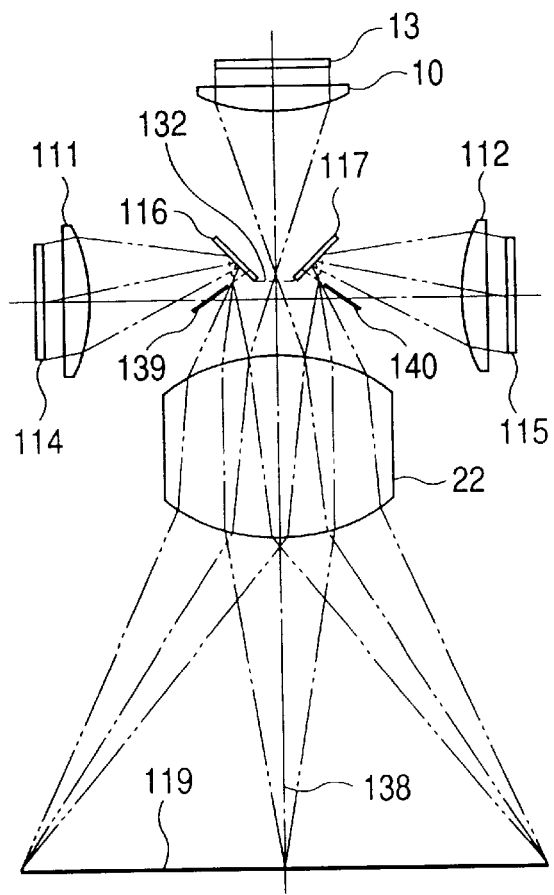
FIG. 32 is a bottom view of the sixth embodiment of the present invention.

The light beam reflected by the liquid crystal panel 114 is focused through the plano-convex lens 111, as shown in FIG. 32 and reflected by a movable high-reflection mirror 116 provided in the pupil of a projecting lens 22. The light beam reflected by a high-reflection mirror (first reflection mirror) 116 is guided to a projecting lens 22. With this arrangement, an original projection image displayed on the liquid crystal panel 113 is projected on a screen 119 through the projecting lens 22. Similarly, the light beam reflected by the liquid crystal panel 115 is guided to the projecting lens 22 through the plano-convex lens 112 and a movable projecting lens (second reflection mirror) 117 arranged near the entrance pupil of the projecting lens 22.

With this arrangement, an original projection image displayed on the liquid crystal panel 115 is projected on the screen 119 through the projecting lens 22. An original projection image displayed on the liquid crystal panel 113 is also projected on the screen 119 through the plano-convex lens 110 and the projecting lens 22.

Since the reflection liquid crystal panels 113 to 115 perform image modulation (optical modulation) according to the respective colors, color image information is projected on the screen 119.

In this embodiment, each of the positive lenses 110 to 112 has a convex surface on the screen side to diffuse illumination light reflected by the lens surface. This almost completely prevents reflected light from being incident on the entrance pupil of the projecting lens 22 whereby ghost is minimized.

Figure 30:
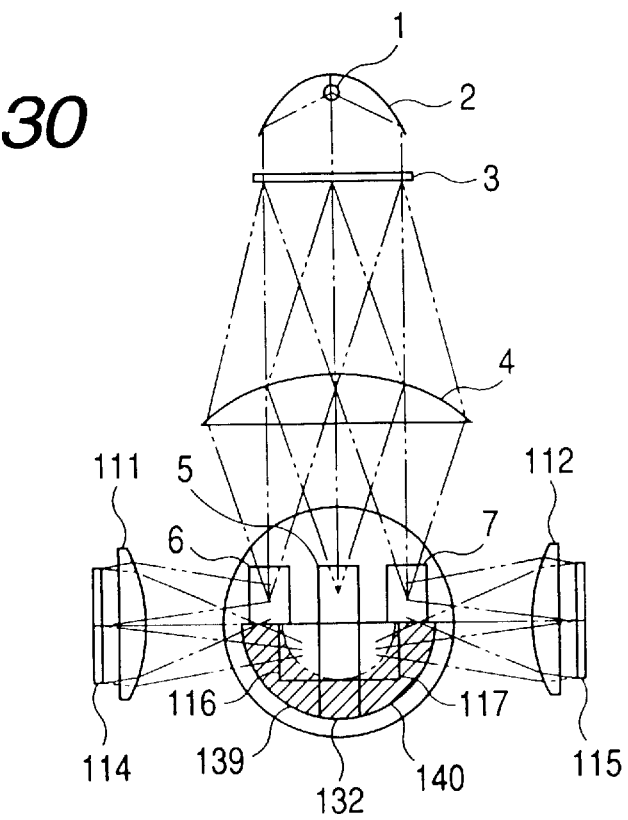
FIG. 30 is a rear view of the sixth embodiment of the present invention.
Figure 31:
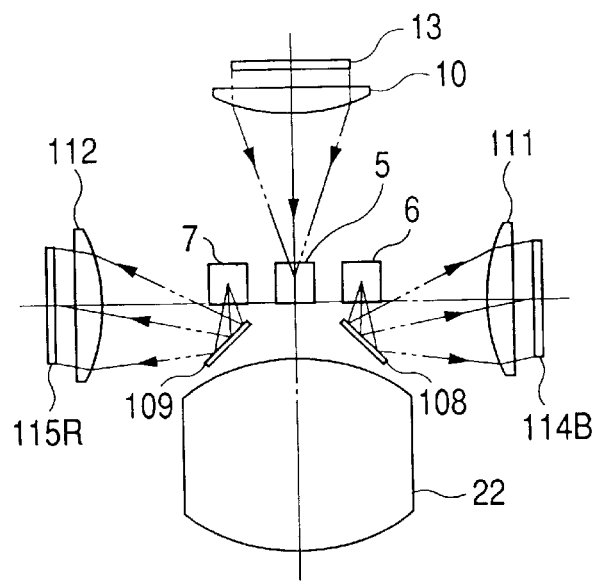
FIG. 31 is a top view of the sixth embodiment of the present invention.

The mirrors 5 to 7 are placed on one of two semicircular areas obtained by dividing the entrance pupil plane near the entrance pupil of the projecting lens 22, as shown in FIG. 30.

The mirrors 116 and 117 are placed on the other semicircular area opposite to that including the mirrors 5 to 7, which are formed by dividing the entrance pupil plane near the entrance pupil of the projecting lens 22, such that the entrance pupil is divided in its area. The mirrors 116 and 117 constitute one element of the image synthesis means, and the mirrors 5 to 9 one element of the color separation system.

The liquid crystal panels 113 to 115 are illuminated with collimated light beams obliquely with respect to the optical axes of the condenser lenses 110 to 112, respectively, so that the central rays from the liquid crystal panels 114 and 115 enter the projecting lens 22 through the mirrors 116 and 117, respectively, and the central ray from the liquid crystal panel 113 directly enters the projecting lens 22 obliquely from one of the semicircular areas of the entrance pupil of the projecting lens 22.

In this embodiment, three light shielding members (stops) 132, 139, and 140 serving as correction means for correcting illuminance variations on the screen 119 are inserted in the optical path between the mirrors 116 and 117 and the projecting lens 22 near the entrance pupil of the projecting lens 22. The light shielding members 132, 139, and 140 are arranged near the entrance pupil of the projecting lens 22, as shown in FIG. 30, to limit the peripheral light components of the green (G), blue (B), and red (R) light components passing through the entrance pupil.

The light shielding members 139 and 140 are tilted with respect to an optical axis 138 of the projecting lens 22. The shapes and arrangement positions of the light shielding members 132, 139, and 140 are appropriately set, and the G, B, and R light passage states are adjusted to unify the light amount distribution of the liquid crystal panels 113 to 115 on the screen. Additionally, satisfactory color balance is maintained.

The optical functions of the light shielding members 132, 139, and 140 of this embodiment will be described next.

Figure 33:
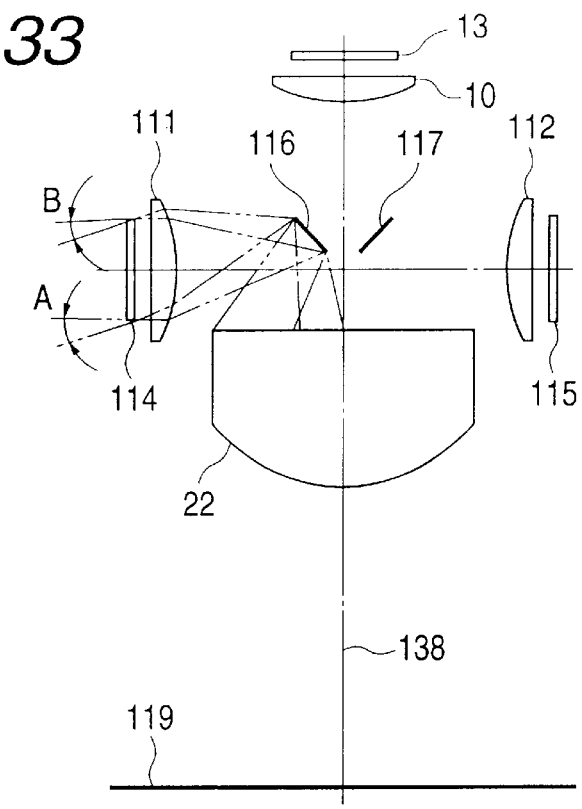
FIG. 33 is an explanatory view of the optical function of a light shielding member according to the present invention.
Figure 34:
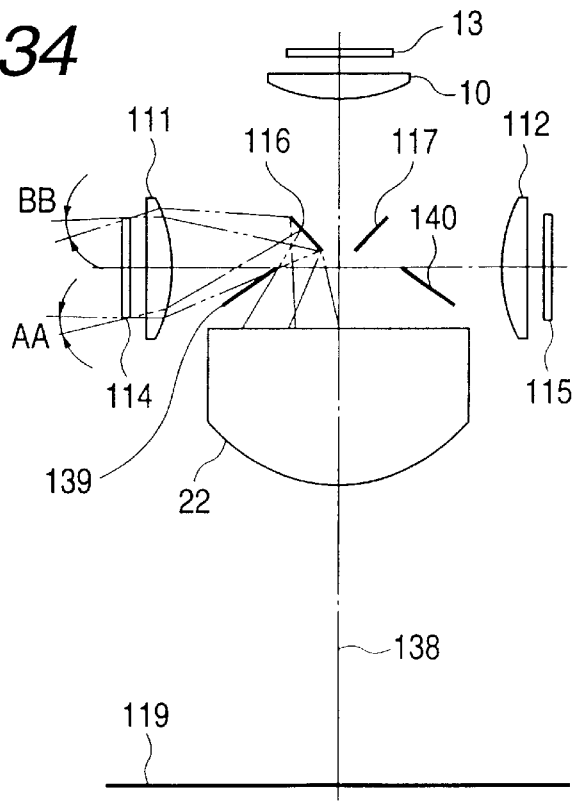
FIG. 34 is an explanatory view of the optical function of the light shielding member according to the present invention.

FIG. 33 is an explanatory view of an arrangement having no light shielding member for the liquid crystal panel 114. FIG. 34 is an explanatory view illustrating how light coming from the liquid crystal panel 114 travels to the projecting lens 22 through the light shielding member 139.

As shown in FIG. 33, when the light shielding member 139 is omitted, the size of the image synthesis mirror 116 viewed from the liquid crystal panel 114 changes depending on the position of the liquid crystal panel 114 in the image. As a result, the light amount varies on the screen 119.

In FIG. 33, when an angle A subtended at the lower edge of the liquid crystal panel 114 in the drawing by the image synthesis mirror 116 is compared with an angle B subtended at the upper edge by the mirror 116, the angle B subtended at the upper edge by the mirror 116 is smaller than the angle A subtended at the lower edge. For this reason, the upper-side image of the liquid crystal panel 114 in the drawing is projected as a darker image on the screen than the lower-side image of the liquid crystal panel 114.

In this embodiment, the light shielding member 139 is arranged between the image synthesis mirror 116 and the projecting lens 22, as shown in FIG. 34. With this arrangement, an angle AA subtended at the lower edge of the liquid crystal panel 114 in the drawing by the mirror 116 is reduced to equal an angle BB subtended at the upper edge of the liquid crystal panel 114 in the drawing by the mirror 116. In FIG. 34, the stop 139 is tilted with respect to the optical axis 138 of the projecting lens 22 to avoid eclipse in the optical path.

The function of the light shielding member 140 for the liquid crystal panel 15 is the same as that of the light shielding member 139 because the optical system of the light shielding member 140 is substantially symmetrical to that of the light shielding member 139 for the liquid crystal panel 114 described with reference to FIGS. 33 and 34.

Figure 35:
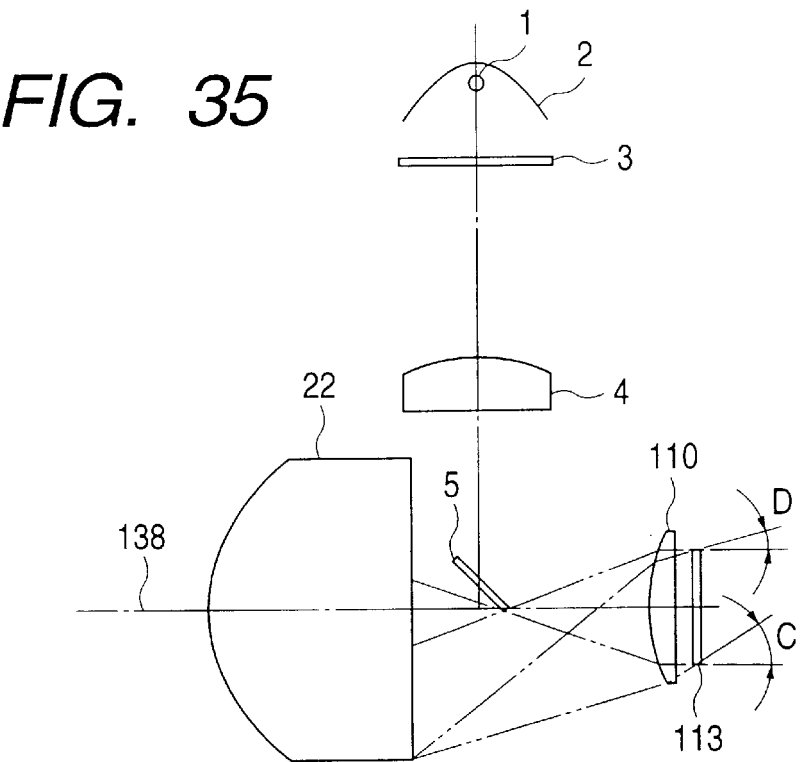
FIG. 35 is an explanatory view of the optical function of the light shielding member according to the present invention.

FIG. 35 is an explanatory view of an arrangement having no light shielding member for the liquid crystal panel 113. FIG. 36 is an explanatory view depicting how light coming from the liquid crystal panel 113 travels to the projecting lens 22 through the light shielding member 132.

As shown in FIG. 35, when the light shielding member 132 is omitted, the size of the entrance pupil of the projecting lens 22 viewed from the liquid crystal panel 113 changes depending on the position of the liquid crystal panel 113 in the image. As a result, the light amount varies on the screen 119.

In FIG. 35, when an angle C subtended at the lower edge of the liquid crystal panel 113 in the drawing by the projecting lens 22 is compared with an angle D subtended at the upper edge of the liquid crystal panel 113 by the projecting lens 22, the angle D subtended at the upper edge is smaller and has a larger eclipse due to the presence of the mirror 5 that sends the incoming illumination light. Therefore, the upper-side image of the liquid crystal panel 113 in the drawing is projected as a darker image on the screen than the lower-side image of the liquid crystal panel 113.

In this embodiment, the light shielding member 132 is inserted between the projecting lens 22 and the positive lens 110, as shown in FIG. 36. With this arrangement, an angle CC subtended at the lower edge of the liquid crystal panel 113 in the drawing by the projecting lens 22 is reduced to equal an angle DD subtended at the upper edge in the drawing. In this manner, the light beam passing through the lower side of the mirror 13 is limited to project the image modulated by the liquid crystal panel 113 on the liquid crystal panel 115 without light amount variations.

In this embodiment, since the light shielding members 139 and 140 are tilted with respect to the optical axis 138 of the projecting lens 22, each of the light shielding members 139 and 140 preferably has an elliptical opening portion on the light passage area side such that a circular image is projected when viewed from the rear surface side of the liquid crystal panel 113.

In this embodiment, the light shielding members 132, 139, and 140 may be exchanged with other light shielding members, or the positions of the light shielding members may be changed to change the size of the opening portion of the light beams limited by the light shielding members 132, 139, and 140. With this arrangement, the color balance can be easily adjusted, so color variations in the diffraction grating or dichroic mirror as a color separation means can be easily corrected.

More specifically, the joint positions of the light shielding members 132, 139, and 140 are shifted to easily adjust the light amount of each color channel. The three light shielding members may be integrated to simplify the arrangement.

In this embodiment, a light attenuation member (e.g., an ND filter) may be used as a correction means in place of the light shielding member. In this embodiment, the correction means has a drive circuit for varying the magnitude of a modulation signal (drive signal) of each of the optical modulation elements (liquid crystal panels) 113 to 115.

The liquid crystal panels 113 to 114 are preferably made of a reflection polymer dispersed liquid crystal (scattering mode) or a twisted nematic liquid crystal.

As described above, in this embodiment, a diffraction grating is used as a color separation means, and the plurality of mirrors 5 to 7, 108, 109, 116, and 117 and the light shielding members 132, 139, and 140 are appropriately set near the entrance pupil of the projecting lens 22. Thus, the respective color light components from the liquid crystal panels 113 to 115 are projected on the screen 119 with high optical performance.

Figure 39:
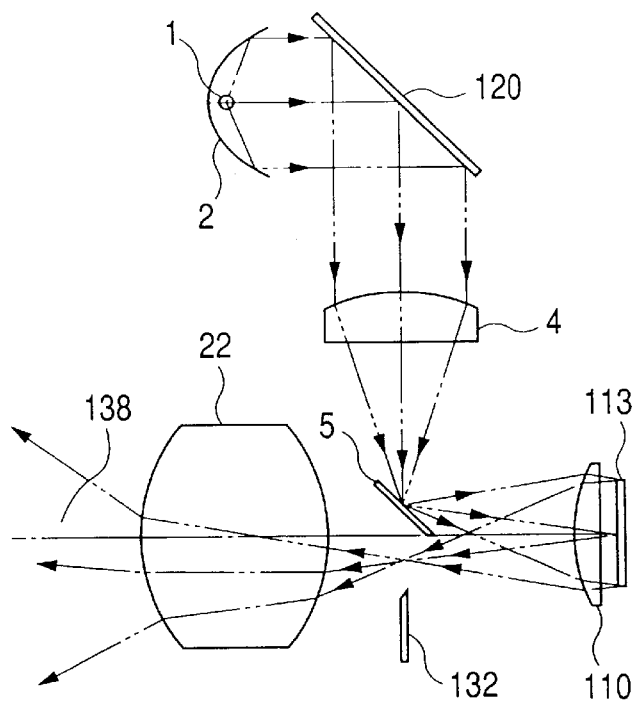
FIG. 39 is a side view of the seventh embodiment of the present invention.
Figure 40:
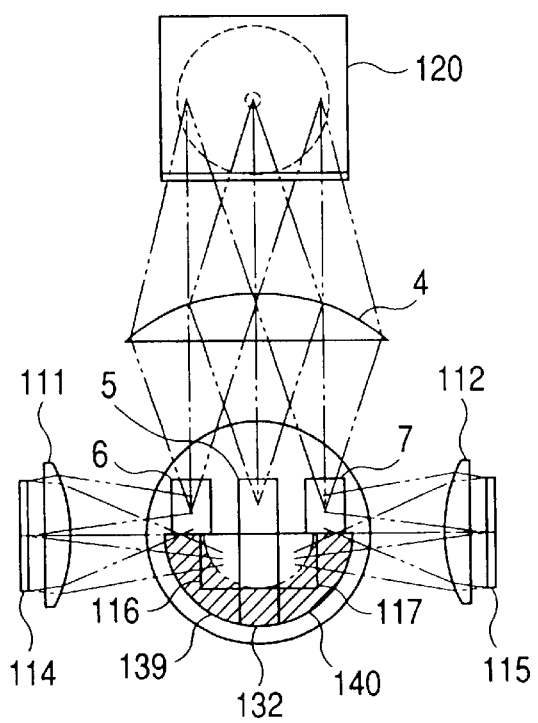
FIG. 40 is a rear view of the seventh embodiment of the present invention.

FIGS. 39 and 40 are a side view and a rear view, respectively, of the seventh embodiment of the present invention. The seventh embodiment has the same arrangement as that of the first embodiment except that a reflection diffraction grating 120 is used as a diffraction grating for color separation in place of a transmission diffraction grating.

In FIGS. 39 and 40, the reflection diffraction grating 120 as a color separation element separates white light emitted by a light source 1 and reflected by a reflection mirror 2 into three color light components of blue (B), green (G), and red (R), reflects these light components, and sends them to a condenser lens 4. The arrangement after the condenser lens 4 is the same as that of the sixth embodiment. The reflection diffraction grating can have shallower grating grooves relative to a transmission diffraction grating and can be easily manufactured.

Figure 41:
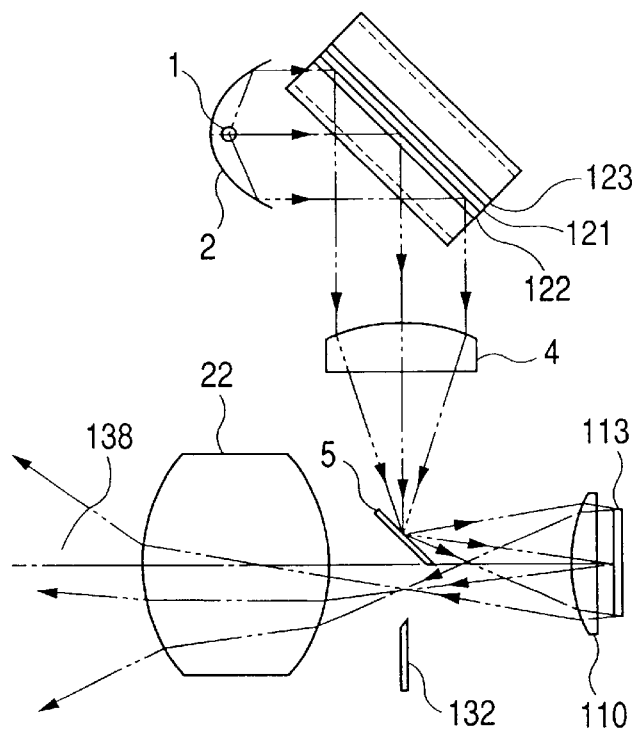
FIG. 41 is a side view of the eighth embodiment of the present invention.
Figure 42:
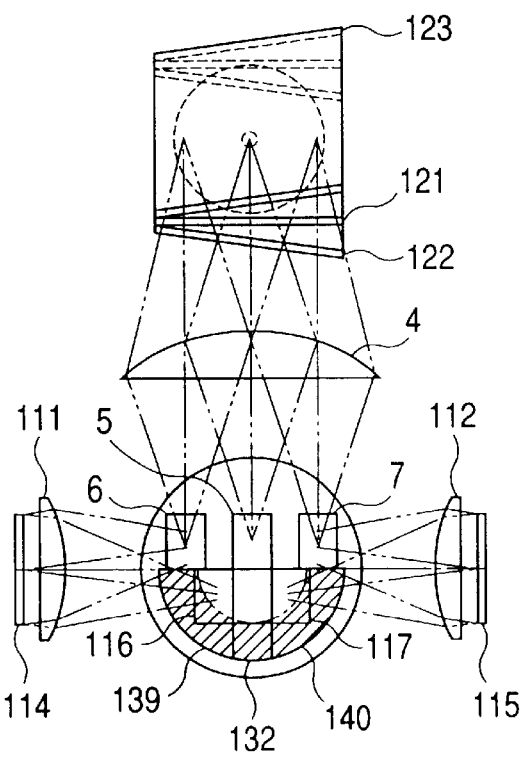
FIG. 42 is a rear view of the eighth embodiment of the present invention.

FIGS. 41 and 42 are a side view and a rear view, respectively, of the eighth embodiment of the present invention. The eighth embodiment has the same arrangement as that of the sixth embodiment except that three dichroic mirrors 121, 122, and 123 stacked at different angles are used as a color separation means instead of the diffraction grating.

In FIGS. 41 and 42, white light emitted by a light source 1 and reflected by a reflection mirror 2 is sequentially reflected by the dichroic mirrors 121, 122, and 123. The light is separated into three color light components of blue (B), green (G), and red (R) and incident on a condenser lens 4 at different angles. The arrangement after the condenser lens 4 is the same as in the sixth embodiment.

Figure 43:
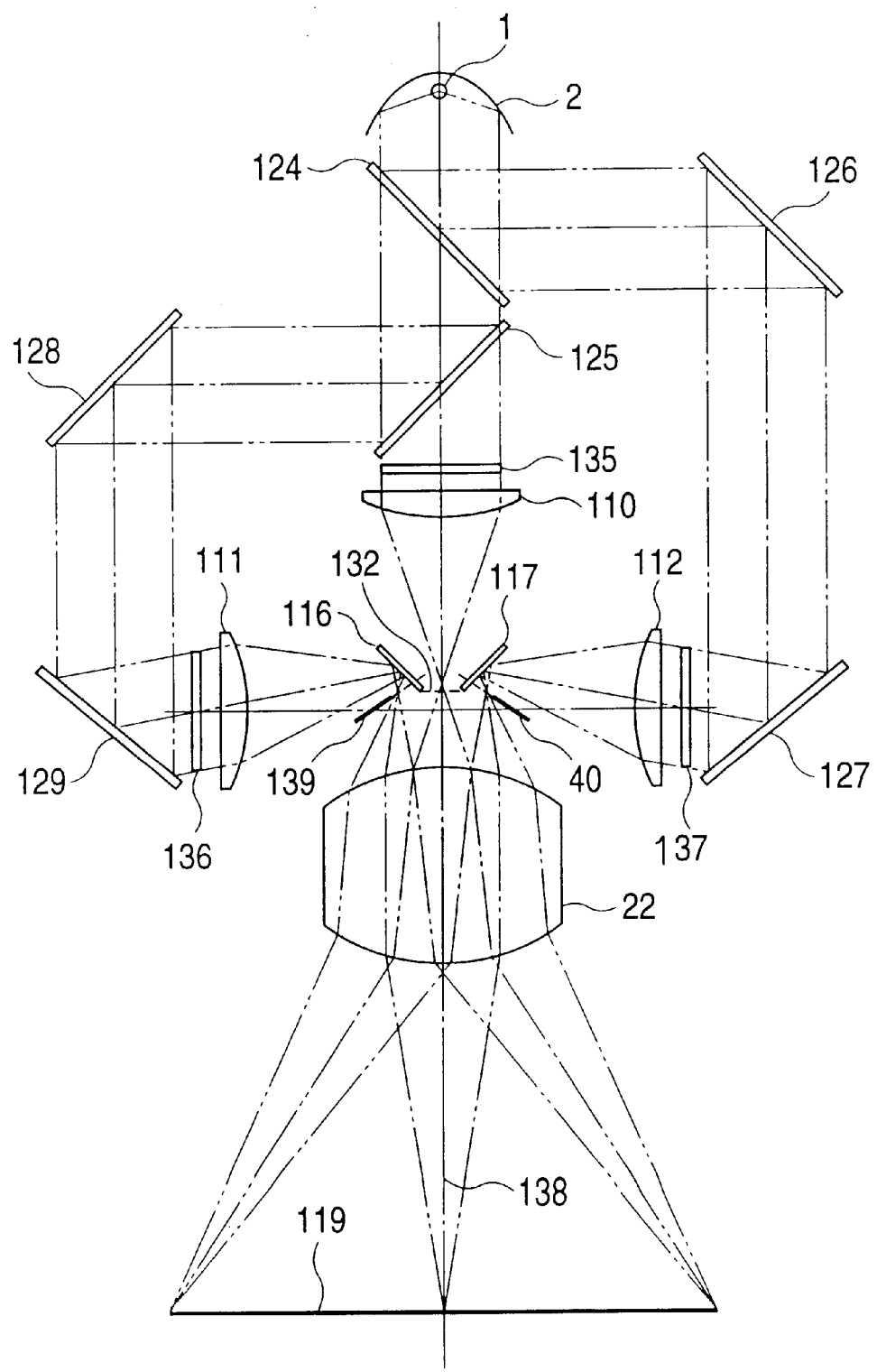
FIG. 43 is a schematic view of the ninth embodiment of the present invention.

FIG. 43 is a top view of the ninth embodiment of the present invention. The ninth embodiment basically has the same arrangement as that of the sixth embodiment except that two separately arranged dichroic mirrors 124 and 125 are used as a color separation means in place of the diffraction grating, and transmission liquid crystal panels 135, 136, and 137 are used instead of the reflection liquid crystal panels.

The optical modulation element of this embodiment can be switched between the transmission mode and a nontransmission mode such as the scattering mode. A modulation signal sets the optical modulation element in the transmission mode.

Referring to FIG. 43, white light emitted by a light source 1 is reflected and then collimated by a parabolic mirror 2. A blue light component (B light component) is reflected by the dichroic mirror 124 and incident on a mirror 126 while green and red light components (G and R light components) are transmitted through the dichroic mirror 124 and incident on the dichroic mirror 125. Of the G and R light components incident on the dichroic mirror 125, the R light component is reflected and the G light component is transmitted.

The white light from the light source 1 is separated into three color light components. The B light component reflected by the mirror 126 illuminates the transmission image modulation element 137 through a reflection mirror 127. Similarly, the R light component reflected by the dichroic mirror 125 illuminates the transmission image modulation element 136 through reflection mirrors 128 and 129. The G light component transmitted through the dichroic mirror 125 illuminates the transmission image modulation element 135.

The image of the G light component modulated by the transmission image modulation element 135 is focused on the entrance pupil of a projecting lens 22 through a positive lens 110. The G light component is partially limited by a light shielding member 132 and projected on a screen 119 through the projecting lens 22.

The image of the R light component modulated by the transmission image modulation element 136 is focused, through a positive lens 111, on a reflection mirror 116 arranged in the entrance pupil of the projecting lens 22 and reflected by the reflection mirror 116. The R light component is partially limited by a light shielding member 139 and projected on the screen 119 through the projecting lens 22. Similarly, the B light component modulated by the transmission image modulation element 137 is focused, through a positive lens 112, on a reflection mirror 117 set in the entrance pupil of the projecting lens 22 and reflected by the reflection mirror-117. The B light component is partially limited by a light shielding member 140 and projected on the screen 119 through the projecting lens 22.

In this embodiment, the three color images are synthesized by the two reflection mirrors 116 and 117 placed in the entrance pupil.

The light shielding member 139 (140) is inserted between the mirror 116 (117) and the projecting lens 22, and the light shielding member 132 between the positive lens 110 and the projecting lens 22 to limit passing light beams in units of color light components, thereby minimizing light amount variations (color variations) of the liquid crystal panels 135 to 137 on the screen 119.

Even when this embodiment is to be applied to a transmission (transmission mode) image modulation element, each of the positive lenses 110 to 112 preferably comprises a plano-convex lens having a convex surface facing the projecting lens 22 to minimize distortion.

The three optical modulation elements 135 to 137 may be illuminated with light beams from independent light source means.

In the embodiment of the present invention, the image synthesis mirrors 116 and 117 may be moved obliquely in a direction of, e.g., 45° with respect to the optical axis of the projecting lens 22 to freely change the pupil area ratio of the respective colors in the entrance pupil of the projecting lens 22. According to this arrangement, the light intensity of each color can be freely changed, so the color balance can be easily adjusted while minimizing the net light amount loss.

Figure 44:
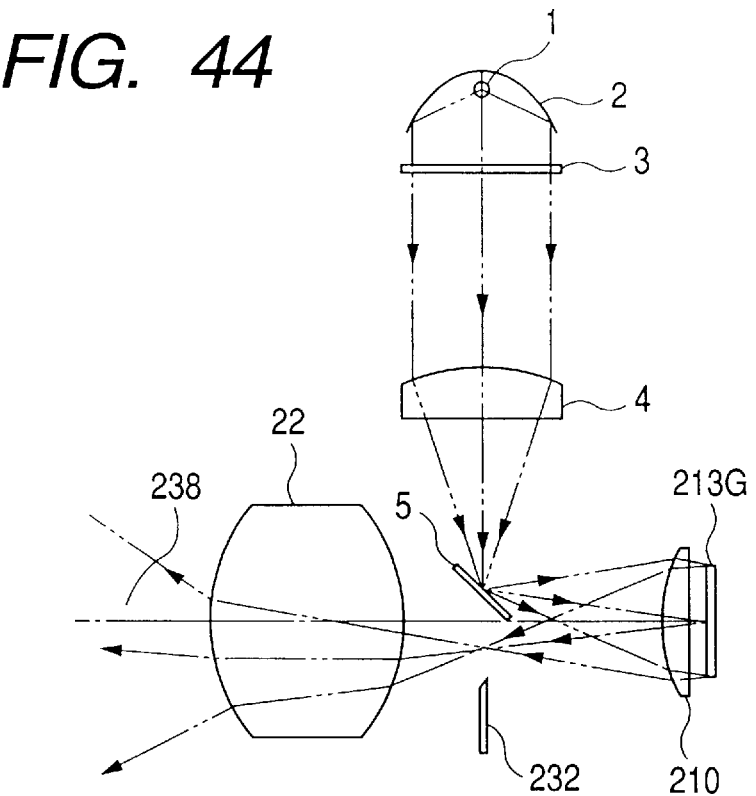
FIG. 44 is a side view of the tenth embodiment of the present invention.
Figure 47:
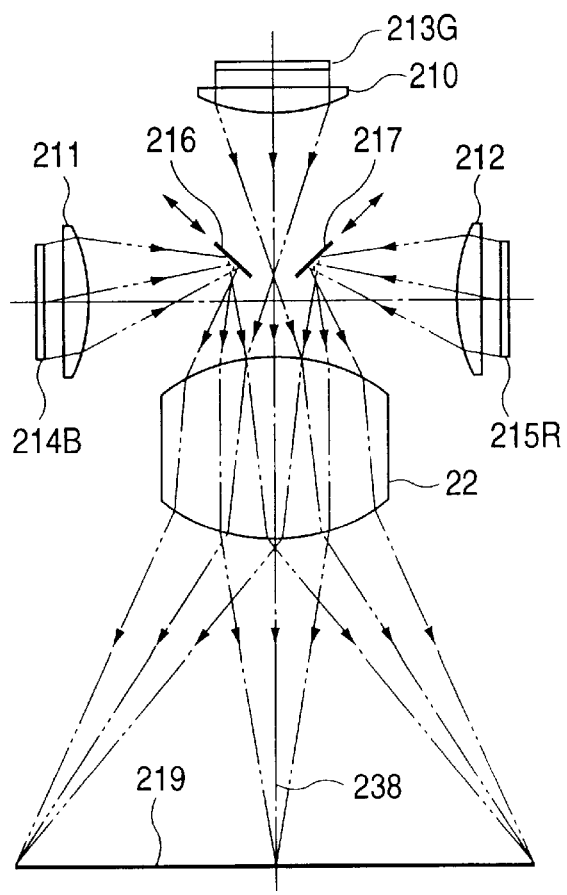
FIG. 47 is a bottom view of the tenth embodiment of the present invention.
Figure 48:
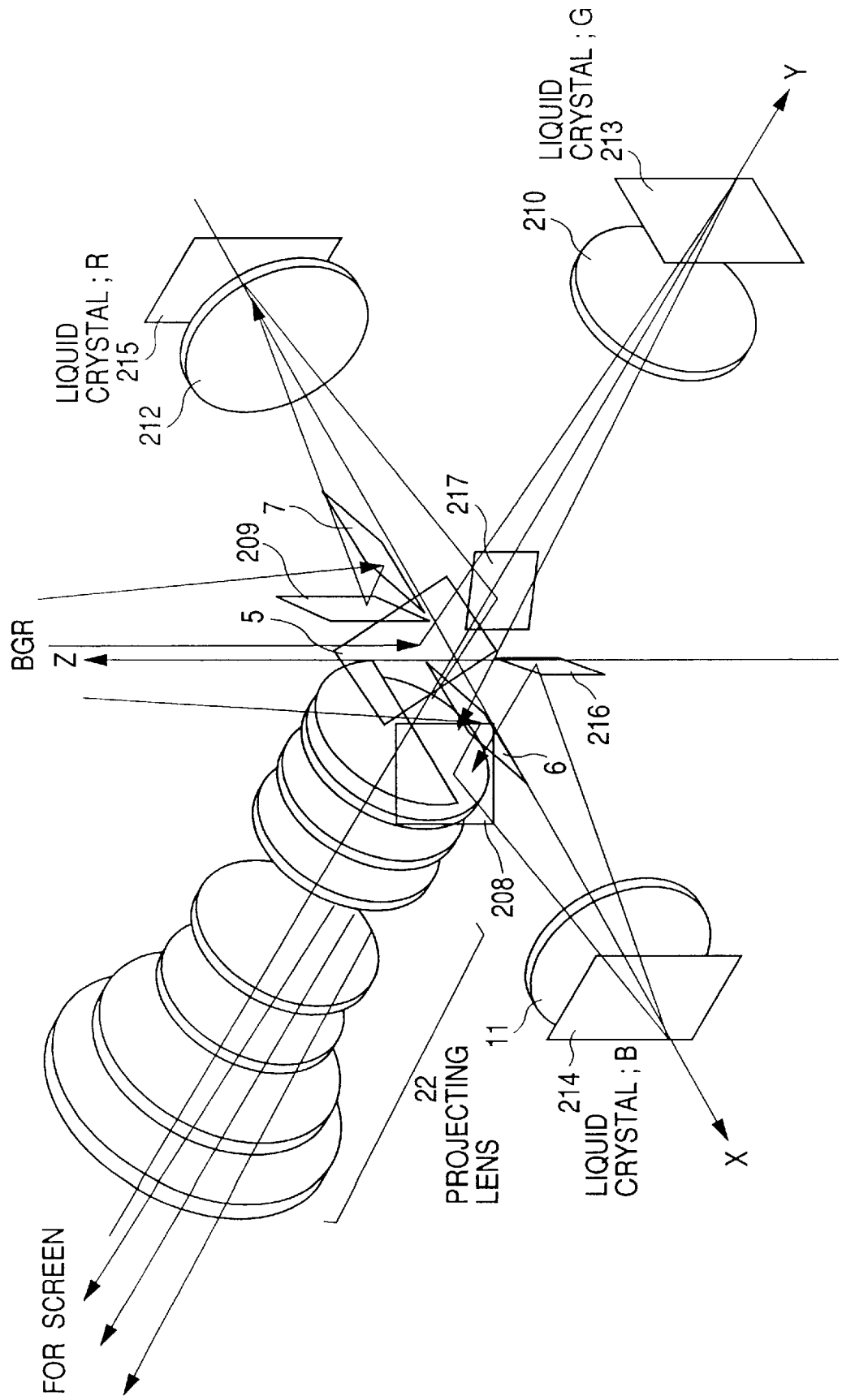
FIG. 48 is a perspective view partially showing the tenth embodiment of the present invention.

FIGS. 44 and 47 are a side view, a rear view, a top view, and a bottom view, respectively, of the tenth embodiment of the present invention. FIG. 48 is a perspective view partially showing the arrangement of the tenth embodiment of the present invention. Referring to FIGS. 44 to 48, white light emitted by a light source 1 is reflected and then collimated by a reflection mirror (parabolic mirror) 2, and separated into a plurality of color light components, e.g., three color light components of blue (B), green (G), and red (R) by a diffraction grating 3 as a color separation means. These light components emerge at different angles. The three color light components separated and emerging from the diffraction grating 3 at different angles are focused through a condenser lens 4 and reflected by high-reflection mirrors 5, 6, and 7. The light component (blue light component) reflected by the high-reflection mirror 6 is reflected by a high-reflection mirror 208 toward a plano-convex lens 211. The collimated light beam illuminates a reflection liquid crystal panel 214 as an image. modulation element (optical modulation element) for blue light.

The light component (green light component) reflected by the high-reflection mirror 5 travels toward a plano-convex lens 210. The light beam collimated through the plano-convex lens 210 illuminates a reflection liquid crystal panel 213 for green light. The light component (red light component) reflected by the high-reflection mirror 7 travels toward a plano-convex lens 212 through a high-reflection mirror 209 and illuminates a reflection liquid crystal panel 215 for red light. The apparatus also includes a stop 232.

The light component reflected by the liquid crystal panel 214 is focused through the plano-convex lens 211 and reflected to a movable high-reflection mirror 216 provided in the pupil of a projection optical system 22, as shown in FIG. 47. The light component reflected by the high-reflection mirror 216 is guided to the projection optical system 22. With this arrangement, an original projection image (image) displayed on the liquid crystal panel 213 is projected on a screen 219 through the projection optical system (projecting lens) 22. In a similar manner, the light component reflected by the liquid crystal panel 215 is guided to the projection optical system 22 through the plano-convex lens 212 and a movable high-reflection mirror 217 provided near the projection optical system 22 of the projection optical system 22.

With this arrangement, an original projection image displayed on the liquid crystal panel 215 is projected on the screen 219 through the projection optical system 22. An original projection image displayed on the liquid crystal panel 213 is similarly projected on the screen 219 through the plano-convex lens 210 and the projection optical system 22.

Since the reflection liquid crystal panels 213 to 215 perform image modulation (optical modulation) according to the respective colors, color image information is projected on the screen 219.

Figure 45:
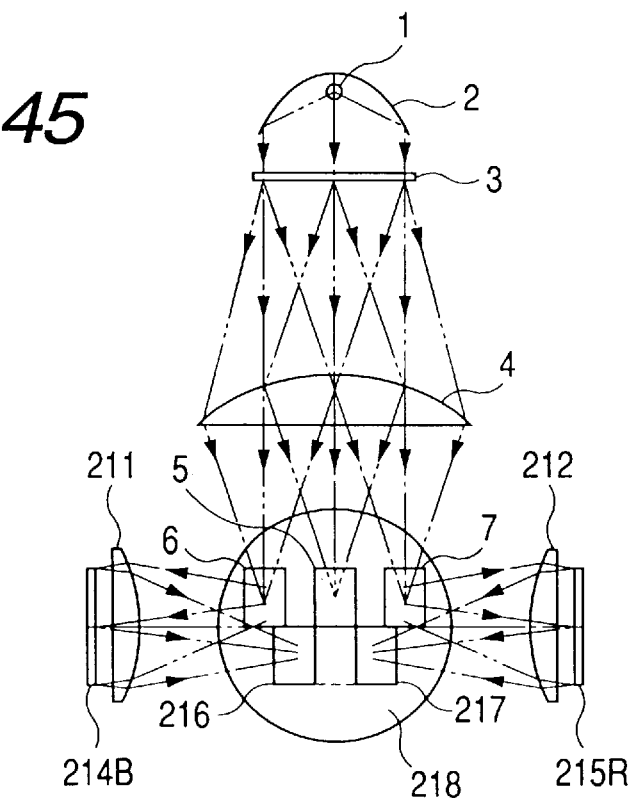
FIG. 45 is a rear view of the tenth embodiment of the present invention.
Figure 46:
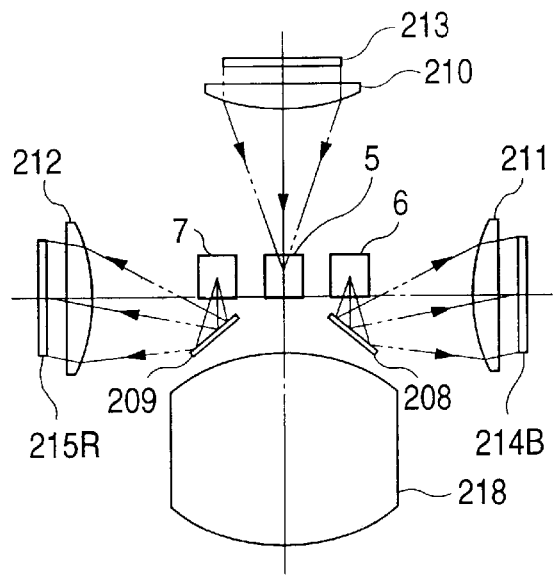
FIG. 46 is a top view of the tenth embodiment of the present invention.

The mirrors 5 to 7 are placed on one of two semicircular areas obtained by dividing the entrance pupil plane near the entrance pupil of the projecting optical system 22, as shown in FIG. 45.

The mirrors 216 and 217 are placed on the other semicircular area opposite to that including the mirrors 5 to 7, which are formed by dividing the entrance pupil plane near the entrance pupil of the projection optical system 22, such that the entrance pupil is divided in its area. The mirrors (reflection mirrors) 216 and 217 constitute one element of the deflection means. The mirrors 5 to 7, 208, and 209 constitute one element of the color separation system.

The liquid crystal panels 213 to 215 are illuminated with collimated light beams obliquely with respect to the optical axes of the condenser lenses 210 to 212, respectively, so that the central rays from the liquid crystal panels 214 and 215 enter the projection optical system 22 through the mirrors 216 and 217, respectively, and the central ray from the liquid crystal panel 213 directly enters the projection optical system 22 obliquely from one of the semicircular areas of the entrance pupil of the projection optical system 22.

In this embodiment, each of the positive lenses 210 to 212 has a convex surface on the screen side to diffuse illumination light reflected by the lens surface. This almost completely prevents reflected light from being incident on the entrance pupil of the projection optical system 22 whereby ghost is minimized.

In this embodiment, the mirrors 216 and 217 can be moved in directions indicated by arrows in FIG. 47 (at 45° with respect to an optical axis 238 of the projection optical system) to freely change the pupil area ratio of the respective colors in the entrance pupil of the projection optical system 22. According to this arrangement, the light intensity ratio (light amount balance) of the B, G, and R color light components is freely changed, so satisfactory color balance can be maintained.

Assume that the G light component is too strong, and the white portion of an image synthesized on the screen 219 looks greenish. In this case, the reflection mirrors 216 and 217 are moved in the direction close to the optical axis 238 of the projection optical system 22 to reduce the pupil area for the G light component and increase the pupil area for the B and R light components. Consequently, the amount of the G light component decreases while the amounts of the B and R light components increase, so satisfactory white balance can be obtained for the image synthesized on the screen 219 as a whole.

In this embodiment, the light amount of a strong color can be easily decreased, and that of a weak color can be easily increased. Therefore, the color balance can be easily adjusted without excessively lowering the entire illumination efficiency. The reason why the reflection mirrors 216 and 217 are moved in the direction of 45° with respect to the optical axis 238 of the projection optical system 22 is that the images of the reflection image modulation elements 214 and 215, which are projected on the screen 219, can be prevented from being blurred only when the mirrors are moved in this direction.

Even when the reflection mirrors 216 and 217 are moved in a direction of an angle other than 45° with respect to the optical axis 238, the color balance can be adjusted.

A reflection polymer dispersed liquid crystal or a twisted nematic liquid crystal can be applied to the reflection image modulation elements 213 to 215.

As described above, in this embodiment, the diffraction grating is used as a color separation means, and the plurality of mirrors 5 to 7, 208, 209, 216, and 217 are appropriately set near the entrance pupil of the projection optical system 22. Thus, the respective color light components from the liquid crystal panels 213 to 215 are projected on the screen 219 with high optical performance.

Figure 49:
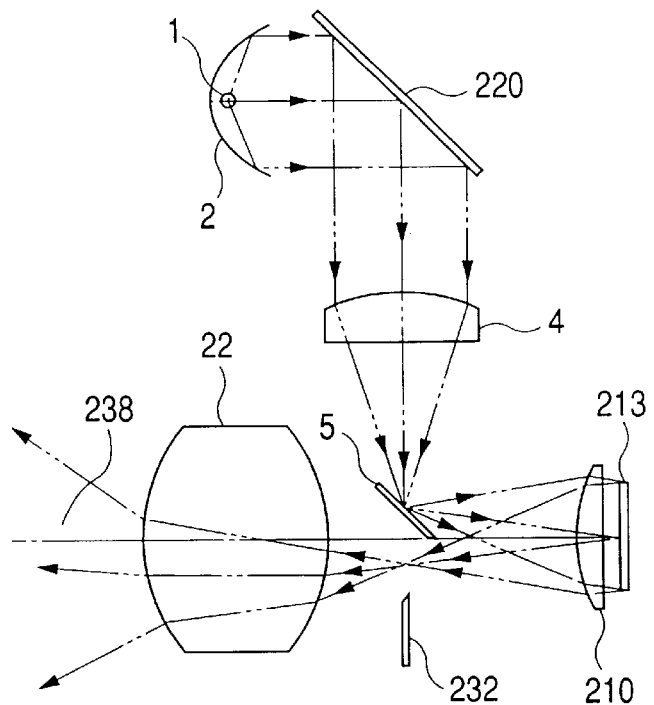
FIG. 49 is a side view of the eleventh embodiment of the present invention.
Figure 50:
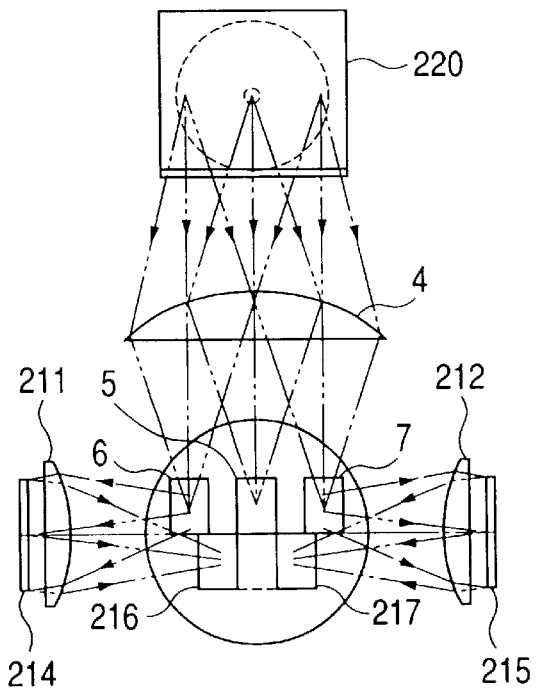
FIG. 50 is a rear view of the eleventh embodiment of the present invention.

FIGS. 49 and 50 are a side view and a rear view, respectively, of the eleventh embodiment of the present invention. The eleventh embodiment has the same arrangement as that of the tenth embodiment shown in FIGS. 44 to 47 except that a reflection diffraction grating 220 is used as a diffraction grating for color separation in place of a transmission diffraction grating.

In FIGS. 49 and 50, the reflection diffraction grating 220 as a color separation element separates white light emitted by a light source 1 and reflected by a reflection mirror 2 into three color light components of blue (B), green (G), and red (R), reflects these light components, and sends them to a condenser lens 4. The arrangement after the condenser lens 4 is the same as that of the tenth embodiment. The reflection diffraction grating can have shallower grating grooves relative to a transmission diffraction grating and can be easily manufactured.

Figure 51:
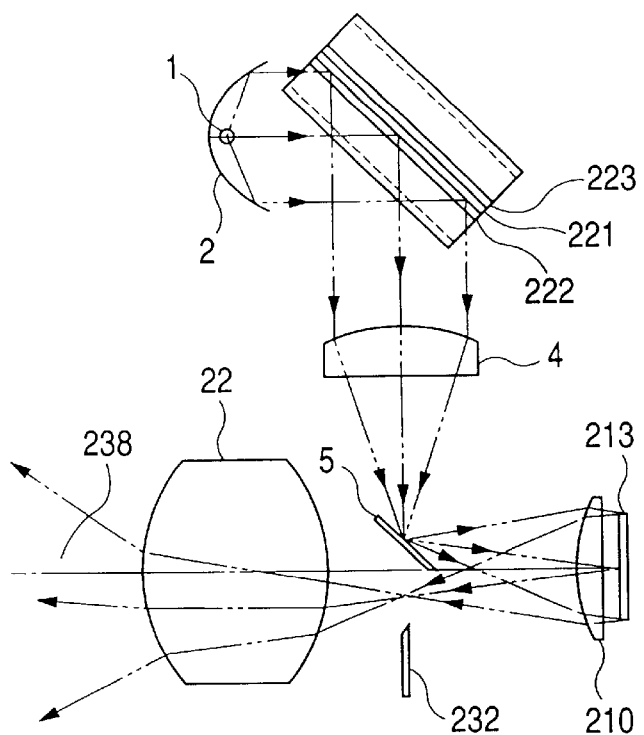
FIG. 51 is a side view of the twelveth embodiment of the present invention.
Figure 52:
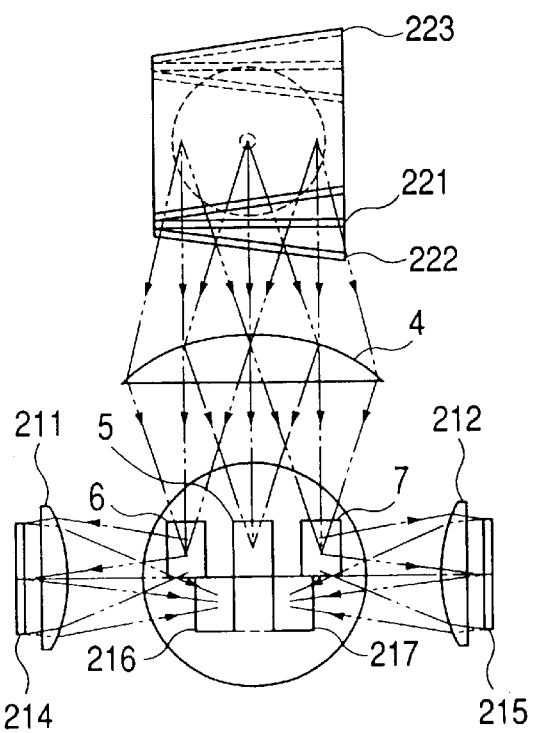
FIG. 52 is a rear view of the twelveth embodiment of the present invention.

FIGS. 51 and 52 are a side view and a rear view, respectively, of the twelveth embodiment of the present invention. The twelveth embodiment has the same arrangement as that of the tenth embodiment shown in FIGS. 44 to 47 except that three dichroic mirrors 221, 222, and 223 stacked at different angles are used as a color separation means instead of the diffraction grating.

In FIGS. 51 and 52, white light emitted by a light source 1 and reflected by a reflection mirror 2 is sequentially reflected by the dichroic mirrors 221, 222, and 223. The light is separated into three color light components of blue (B), green (G), and red (R) and incident on a condenser lens 4 at different angles. The arrangement after the condenser lens 4 is the same as in the tenth embodiment.

Figure 53:
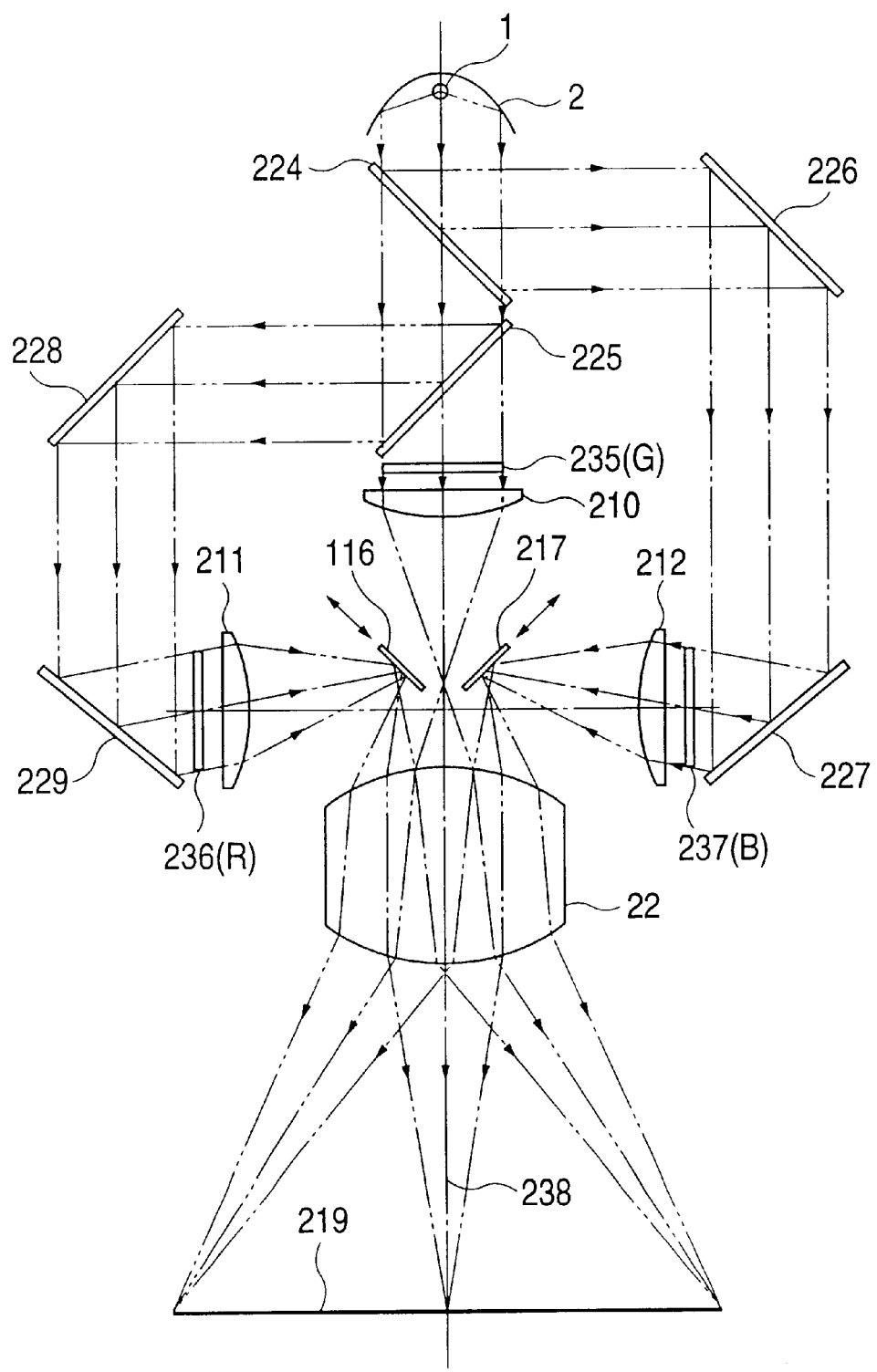
FIG. 53 is a schematic view of the thirteenth embodiment of the present invention.

FIG. 53 is a top view of the thirteenth embodiment of the present invention. The thirteenth embodiment basically has the same arrangement as that of the tenth embodiment shown in FIGS. 44 to 47 except that two separately arranged dichroic mirrors 224 and 225 are used as a color separation means in place of the diffraction grating, and transmission liquid crystal panels 235, 236, and 237 are used instead of the reflection liquid crystal panels.

Referring to FIG. 53, white light emitted by a light source 1 is reflected and then collimated by a parabolic mirror 2. A blue light component (B light component) is reflected by the dichroic mirror 224 and incident on a mirror 226 while green and red light components (G and R light components) are transmitted through the dichroic mirror 224 and incident on the dichroic mirror 225. Of the G and R light components incident on the dichroic mirror 225, the R light component is reflected and the G light component is transmitted.

The white light from the light source 1 is separated into three color light components. The B light component reflected by the mirror 226 illuminates the transmission image modulation element 237 through a reflection mirror 227. Similarly, the R light component reflected by the dichroic mirror 225 illuminates the transmission image modulation element 236 through reflection mirrors 228 and 229. The G light component transmitted through the dichroic mirror 225 illuminates the transmission image modulation element 235.

The image of the G light component modulated by the transmission image modulation element 235 is focused on the entrance pupil of a projecting lens 22 through a positive lens 210 and projected on a screen 219 through the projection optical system 22. The image of the R light component modulated by the transmission image modulation element 236 is focused, through a positive lens 211, on a reflection mirror 216 arranged in the entrance pupil of the projection optical system 22 and projected on the screen 219 through the projection optical system 22. Also, the image of the B light component modulated by the transmission image modulation element 237 is focused, through a positive lens 212, on a reflection mirror 217 arranged in the entrance pupil of the projection optical system 22, reflected by the high-reflection mirror 217, and projected on the screen 219 through the projection optical system 22.

In this embodiment, the three color images are synthesized by the two reflection mirrors 216 and 217 arranged in the entrance pupil. The two reflection mirrors 216 and 217 are moved in a direction of 45° with respect to the optical axis of the projection optical system 22 to freely change the pupil area ratio of the respective colors in the entrance pupil of the projection optical system 22. According to this arrangement, the light intensity of each color can be freely changed, so the color balance can be adjusted while minimizing the net light amount loss.

Even when this embodiment is to be applied to a transmission (transmission mode) image modulation element, each of the positive lenses 210 to 212 preferably comprises a plano-convex lens having a convex surface facing the projection optical system 22 to minimize distortion.

Figure 54:
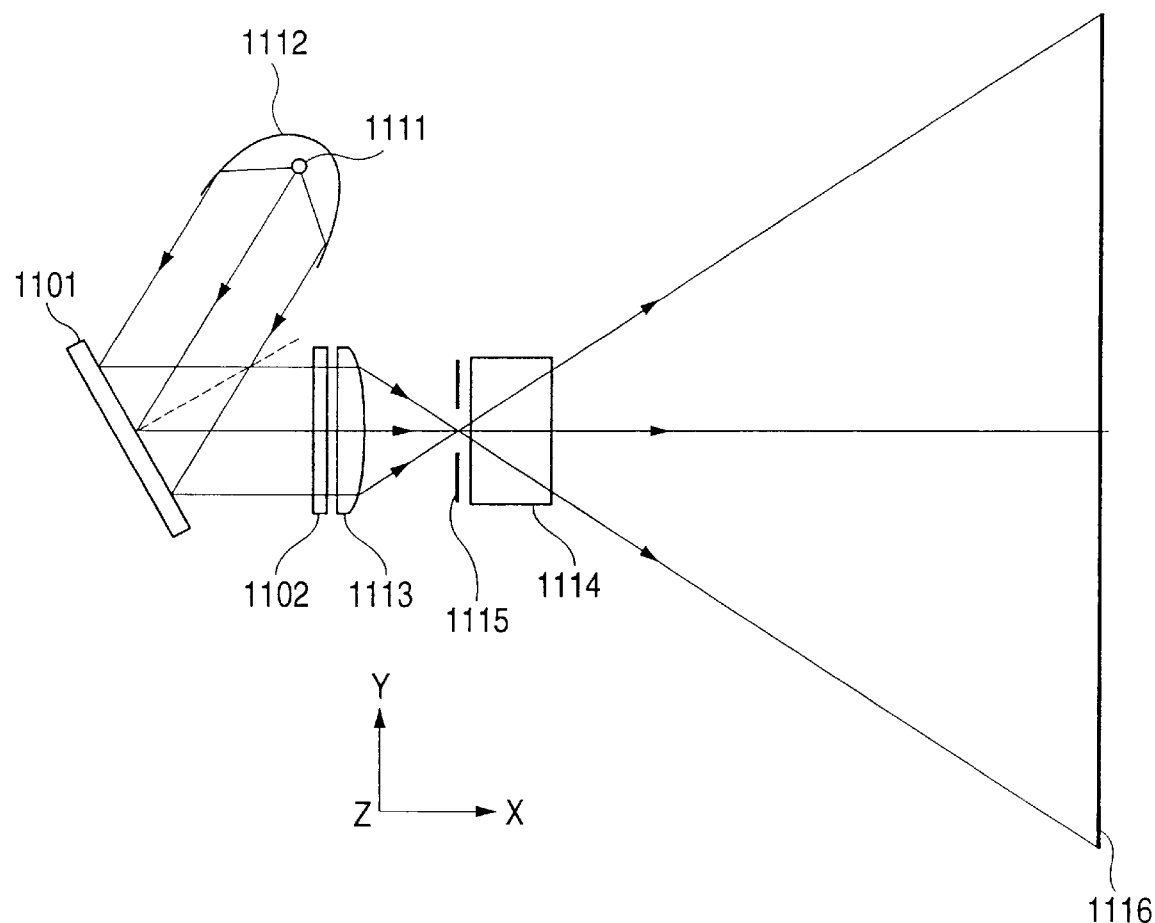
FIG. 54 is a schematic view of the fourteenth embodiment of the present invention.
Figure 55:
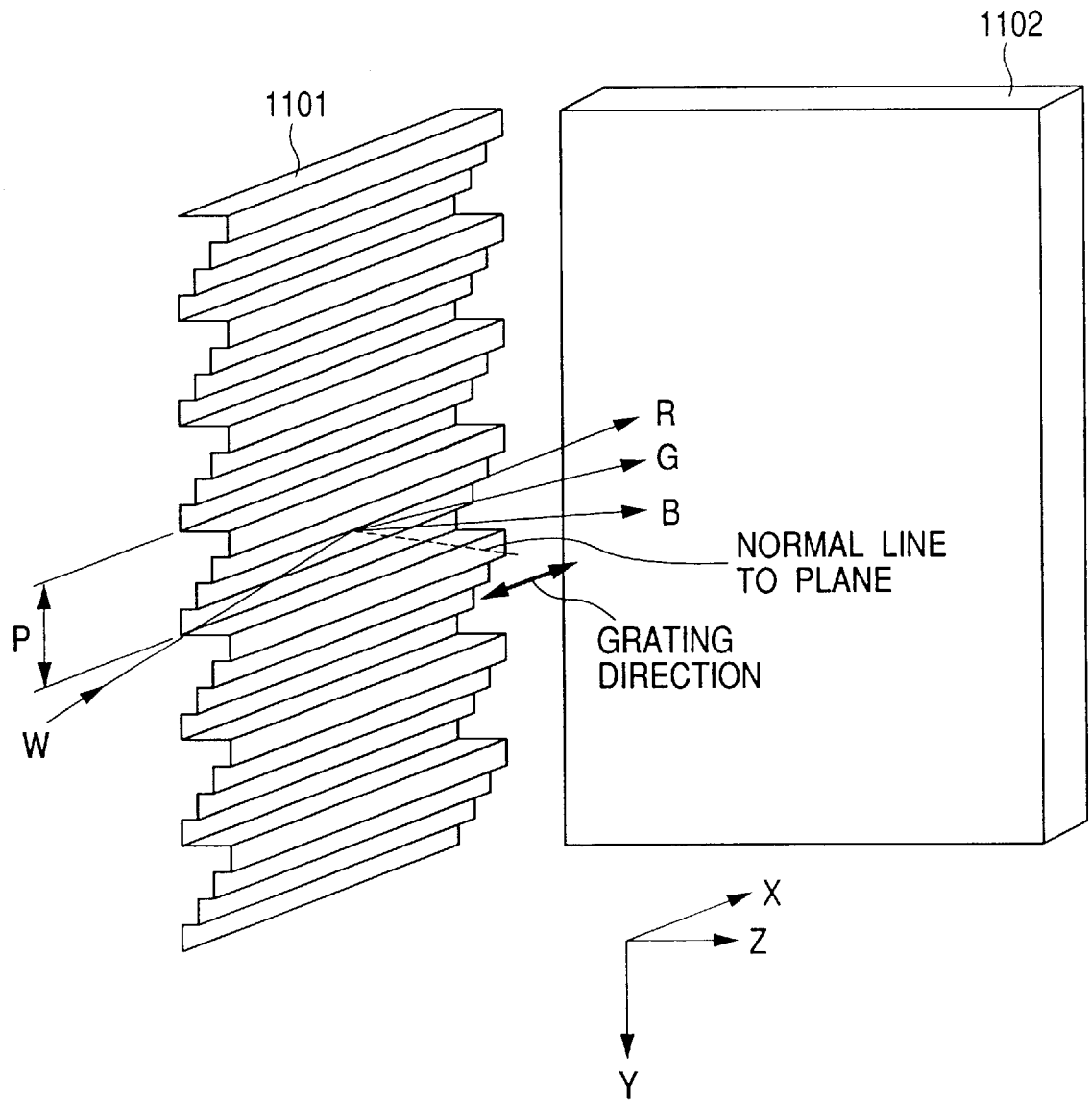
FIG. 55 is an enlarged explanatory view of part of the arrangement shown in FIG. 54.
Figure 56:
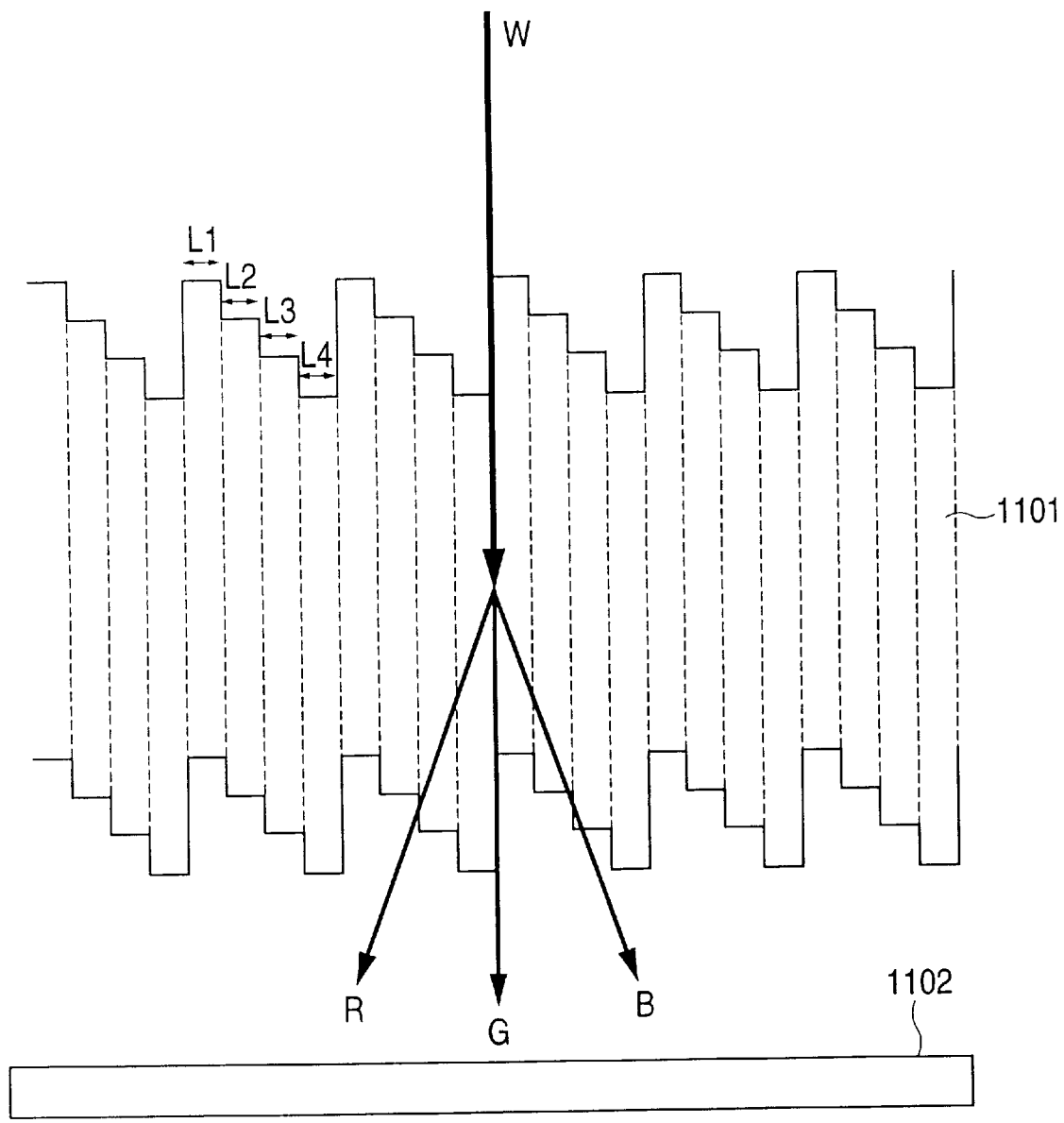
FIG. 56 is an enlarged explanatory view of part of the arrangement shown in FIG. 54.

FIG. 54 is a schematic view of the fourteenth embodiment of the present invention. FIGS. 55 and 56 are enlarged explanatory views of part of the arrangement shown in FIG. 54. Referring to FIGS. 54 to 56, a parabolic mirror 1112 collimates light from a white light source 1111 disposed at the focal position of the parabolic mirror 1112 and obliquely sends it to a reflection one-dimensional binary diffraction grating 1101. The reflection one-dimensional binary diffraction grating 1101 separates the incident light into three color light components of red (R), green (G), and blue (B) and reflects them.

An optical modulation element 1102 consists of, e.g., a liquid crystal and displays image information of a color light component. A condenser lens 1113 focuses the light beam from the optical modulation element 1102 to an entrance pupil (stop) 1115 of a projection optical system (projecting lens) 1114. The projection optical system 1114 projects the image information (pixels) of the respective color light components displayed on the optical modulation element 1102 on a screen 1116.

In this embodiment, the light emitted by the white light source 1111 is roughly collimated by the parabolic mirror 1112 and obliquely sent to the diffraction grating 1101. Thereafter, the optical modulation elements 1102 arranged in units of colors are illuminated with the R, G, and B light components emerging from the diffraction grating 1101. The image information of the light components displayed on the optical modulation elements 1102 is projected on the screen 1116 through the condenser lens 1113 and the projection optical system 1114.

In this embodiment, the diffraction grating 1101 and the optical modulation element 1102 constitute one element of the optical modulation device.

The reflection one-dimensional binary diffraction grating 1101 shown in FIG. 54 will be described next with reference to FIGS. 55 and 56.

The reflection one-dimensional binary diffraction grating 1101 has an echelon-shaped section, as shown in FIGS. 55 and 56. This diffraction grating is made of a resin or the like and coated with a reflection film of, e.g., aluminum.

In this embodiment, four steps having step widths L1, L2, L3, and L4, respectively are formed in a grating pitch P. By specifying the line pitch and phase change amount of the diffraction grating, most of the incident light energy is concentrated in the 0th-order light component (G light component) and the ±1st-order light components (R and B light components) from the diffraction grating, and a wavelength (to be referred to as a principal wavelength hereinafter) having the highest energy of the 0th and ±1st-order light components is made to correspond to one of the R, G, and B light components. The step widths are set to be uneven.

This embodiment can be applied to both a reflection and a transmission one-dimensional binary diffraction gratings. In this embodiment, the diffraction grating is of a reflection type.

The characteristic features of the reflection diffraction grating will be described next in comparison to those of a transmission one-dimensional binary diffraction grating.

The transmission diffraction grating transmits and diffracts incident light and separates it into light components mainly in three directions, as disclosed in *Applied Optics*, Vol. 17, No. 15, pp. 2,273–2,279 (1978. 8. 1.) Let the blazed wavelength of the transmission diffraction grating be λ0. Then a grating thickness dT necessary for the blazed wavelength λ0 is given by:

$$dT = m \cdot \lambda 0/(n-1)$$

where n is the refraction index of the medium of the diffraction grating, and m is an integer. When m=2, λ0=530 nm, and the refraction index n is about 1.5, the grating thickness dT of the transmission diffraction grating must be 2,120 nm.

For the reflection one-dimensional binary diffraction grating (the light incident angle on the optical axis is 45°), a grating thickness dR must be 749.5 nm. As is apparent from this fact, the grating thickness dT of the transmission diffraction grating requires a step three-time deeper than that of the grating thickness dR of the reflection diffraction grating.

Generally, the reflection diffraction grating is advantageous for size reduction of the entire apparatus from the viewpoint of the space efficiency in the apparatus.

In this embodiment, a plane (X-Z plane) defined by the central axis (optical axis) of the white light W obliquely incident on the reflection diffraction grating 1101 and the central axis (optical axis) of the 0th-order diffraction light (G light component) emerging from the diffraction grating is set to be parallel to the grating direction of the diffraction grating, as shown in FIG. 55. For this reason, the optical axes of the separated R, G, and B light components are present in the X-Y plane in FIG. 55.

Figure 57:
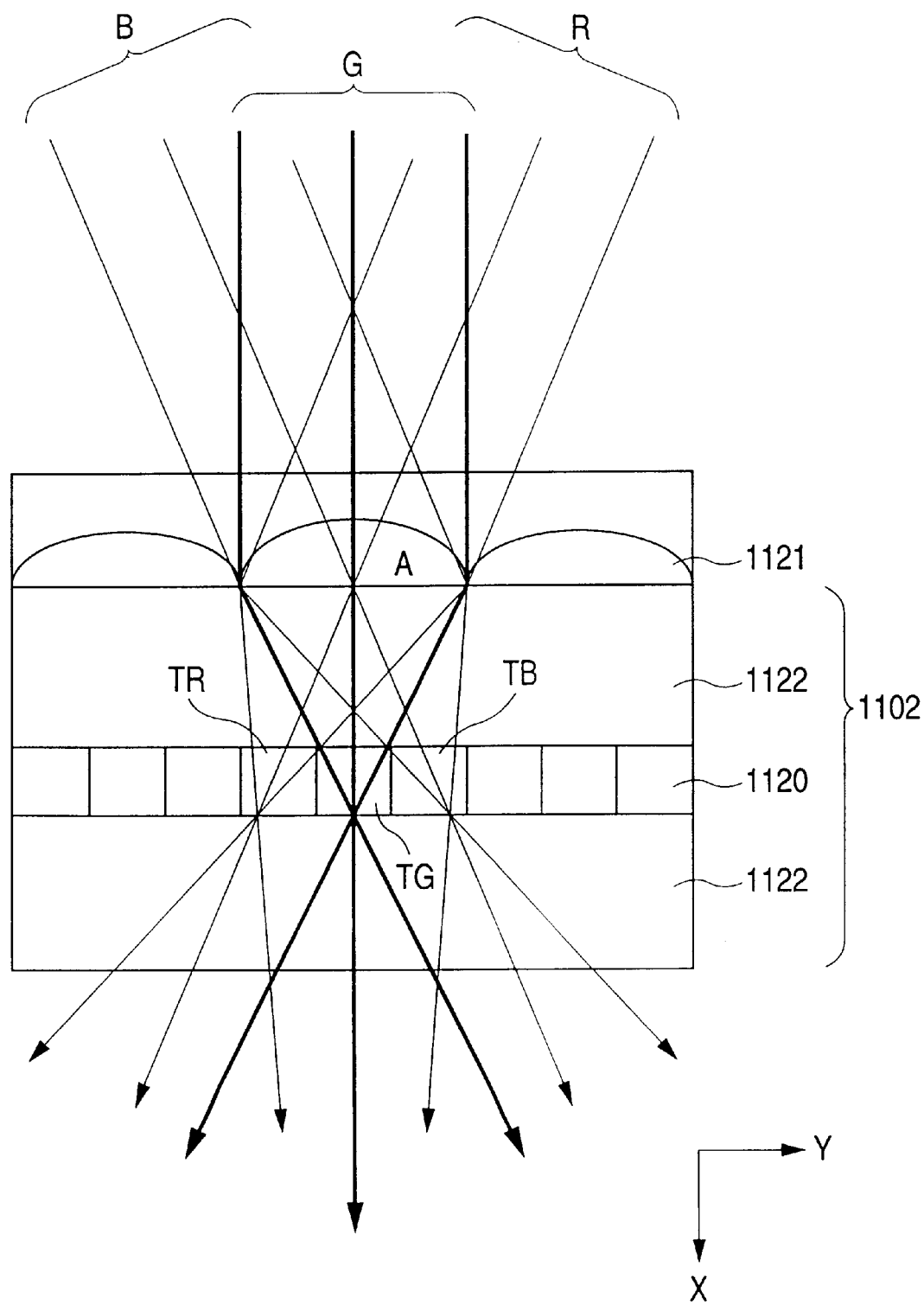
FIG. 57 is an enlarged explanatory view of part of the arrangement shown in FIG. 54.

FIG. 57 shows the relationship between the optical modulation element 1102 and light beams emerging from the reflection diffraction grating. In FIG. 57, the -optical modulation element 1102 has an optical modulation control portion (not shown) and an optical modulation control target portion 1120.

In FIG. 57, a microlens array 1121 serving as a condenser lens for focusing incident light comprises a plurality of microlenses. A transparent substrate 1122 holds the target control portion 1120 (pixels) of the optical modulation element.

In FIG. 57, suffixes R (red), G (green), and B represent the wavelength ranges of the light components incident/emerging on/from the respective optical modulation elements. Referring to FIG. 57, one arbitrary microlens is represented by A; one pixel constituting the control target portion 1120 of the optical modulation element 1102 including the optical axis (the central line of the focused light beam) of the microlens A, TG; and pixels adjacent to the pixel TG, TR and TB. The R, G, and B light components incident on the microlens A arranged on the incident side of the optical modulation element 1102 at different angles are focused in the corresponding pixels TR, TG, and TB through the microlens A, subjected to optical modulation, and emerge from the optical modulation element 1102 as light beams bearing image information.

In this embodiment, since the target control portion 1120 of the optical modulation element 1102 uses a polymer dispersed liquid crystal and is combined with a Schlieren optical arrangement, the image information of the R, G, and B light components depend on the degree of diffusion of light beams.

When the stop 1115 having an aperture on the optical axis is used, as shown in FIG. 54, a light beam whose degree of diffusion is low passes through the stop 1115 of the projection optical system 1114 to reach the projection screen 1116 while a light beam whose degree of diffusion is high is shielded by the stop 1115 and cannot reach the projection screen 1116. More specifically, when the dispersion properties of the light beam are changed by the optical modulation element 1102, the number of light beams reaching the projection screen 1116 can be changed, so a halftone image can be displayed.

The principle of optical modulation of a polymer dispersed liquid crystal is generally known, and a detailed description thereof will be omitted.

With the above arrangement, white light from the light source 1111 is separated into three color light components by the one-dimensional binary diffraction grating 1101 without causing eclipse of effective light beams on the side surface of the step portion, and efficiently focused on the pixels TB, TG, and TR of the optical modulation element 1102 corresponding to the respective color light components through the microlens array 1121, thereby largely improving the light utilization efficiency.

Simultaneously, the plane (X-Z plane) defined by the optical axis of the white light (W) incident on the reflection diffraction grating and the optical axis of the 0th-order diffraction light (G light component) emerging from the diffraction grating 1101 is set to be parallel to the grating direction of the diffraction grating. With this arrangement, a constant light beam size can be maintained after RGB light separation, unlike an arrangement in which the plane (X-Z plane) defined by the optical axis of white light incident on the reflection diffraction grating and the optical axis of the 0th-order diffraction light emerging from the diffraction grating is perpendicular to the grating direction of the diffraction grating. Therefore, the optical modulation element can be uniformly illuminated.

The grating shape is appropriately selected such that the light is separated into color light components having spectral characteristics close to those of the three primary colors of an NTSC signal used as, e.g., a TV signal. When these color light components are synthesized after optical modulation, an image having excellent color reproduction properties is displayed.

The angle of light incident on the optical modulation element can be adjusted only by the one-dimensional binary diffraction grating. For this reason, the assembly properties can be improved, and an inexpensive color image display apparatus can be provided.

In this embodiment, the grating thickness in one pitch of the diffraction grating is slightly changed in units of steps, and the shape of the diffraction grating is designed such that the grating width in one pitch becomes uneven. With this arrangement, the inner band components of the ±1st-order diffraction light are reduced, thereby further facilitating ideal color separation.

Figure 58:
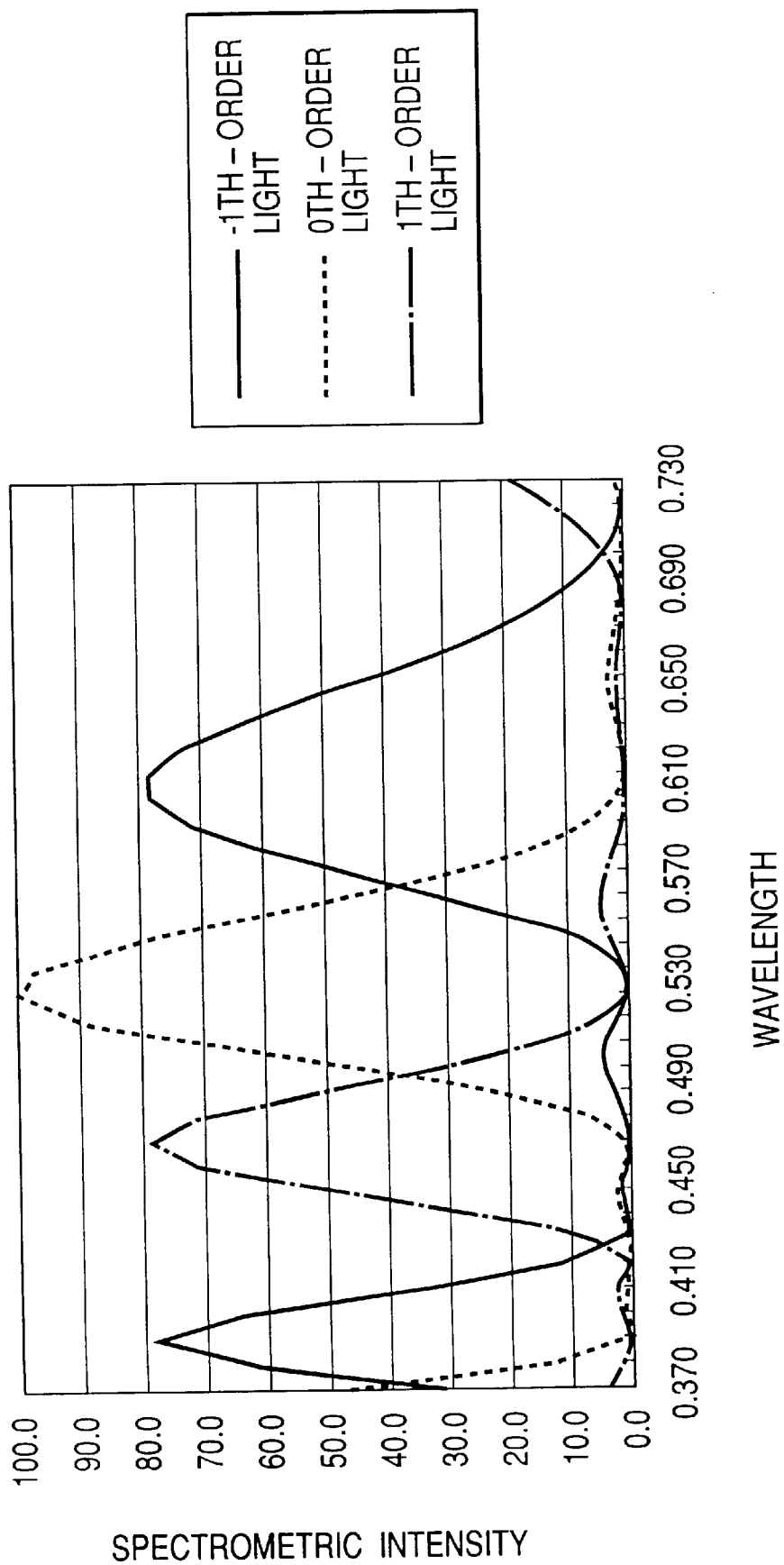
FIG. 58 is a graph showing the spectral characteristics of a reflection diffraction grating according to the present invention.

In this embodiment, the ratio of the grating widths L1, L2, L3, and L4 is set to be 0.9:1.3:1.3:0.9 to reduce the inner band components of the ±1st-order diffraction light. In this embodiment, a diffraction grating whose light beam incident angle on the optical axis is 30°, and the depth of each step of 615 nm is used. FIG. 58 shows the spectral characteristics of this diffraction grating. This embodiment is designed assuming that the G light component is 0th-order light. However, ideal spectral characteristics can be obtained by using other light components as 0th-order light.

Figure 59:
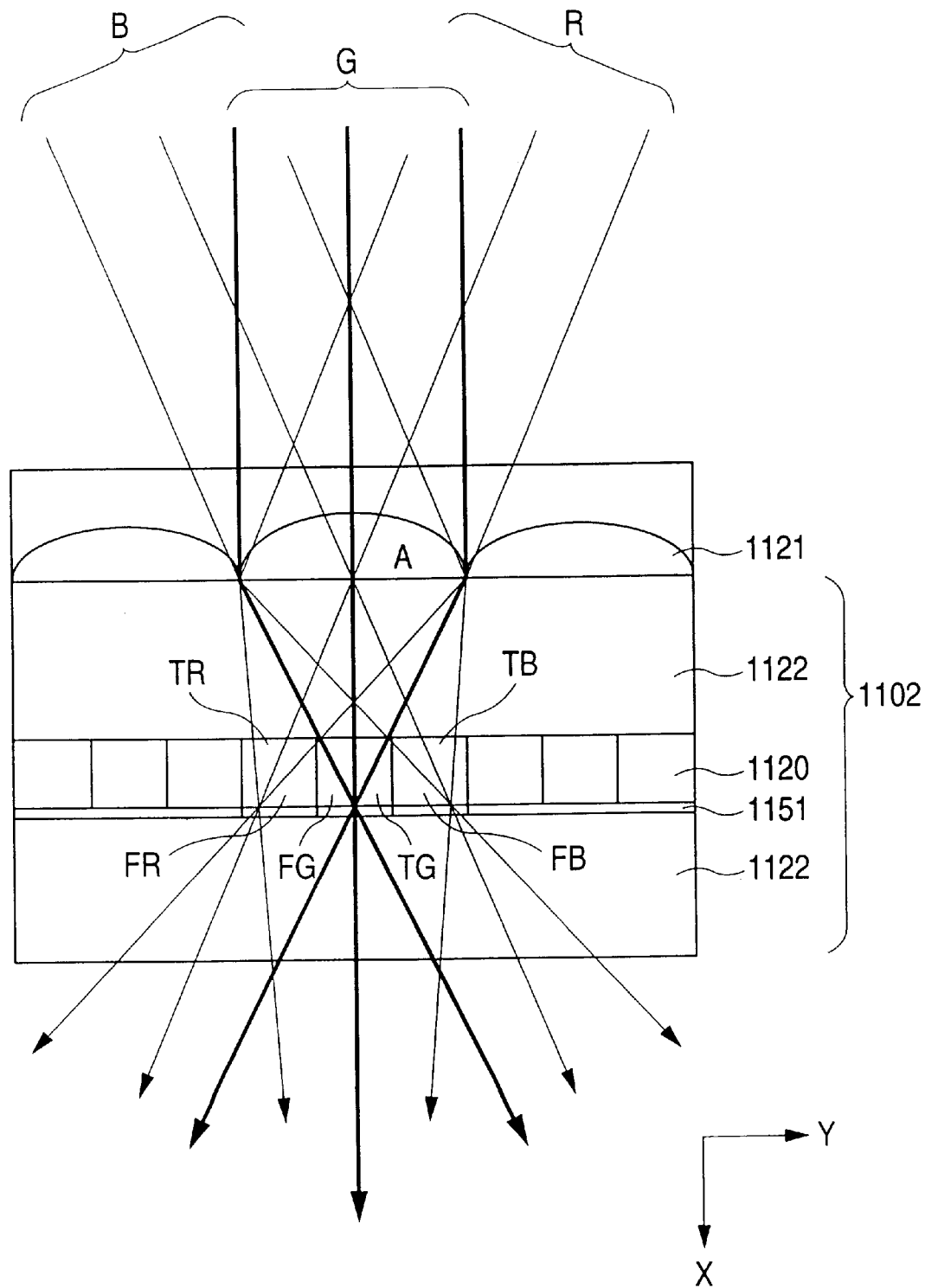
FIG. 59 is a schematic view of an optical modulation device according to the present invention.

As shown in FIG. 59, a color filter 1151 for color correction may be arranged at a position where the color light components are separated. If the spectral characteristics of the color light components separated by the diffraction grating are different from those of the image signal, the color light components are sent to color filters FR, FG, and FB of the color filter 1151 for color correction to obtain ideal color information, thereby facilitating faithful image color reproduction. In this case, the light is separated into color light components and then transmitted through the color filter 1151, so the light utilization efficiency does not largely lower.

Figure 60:
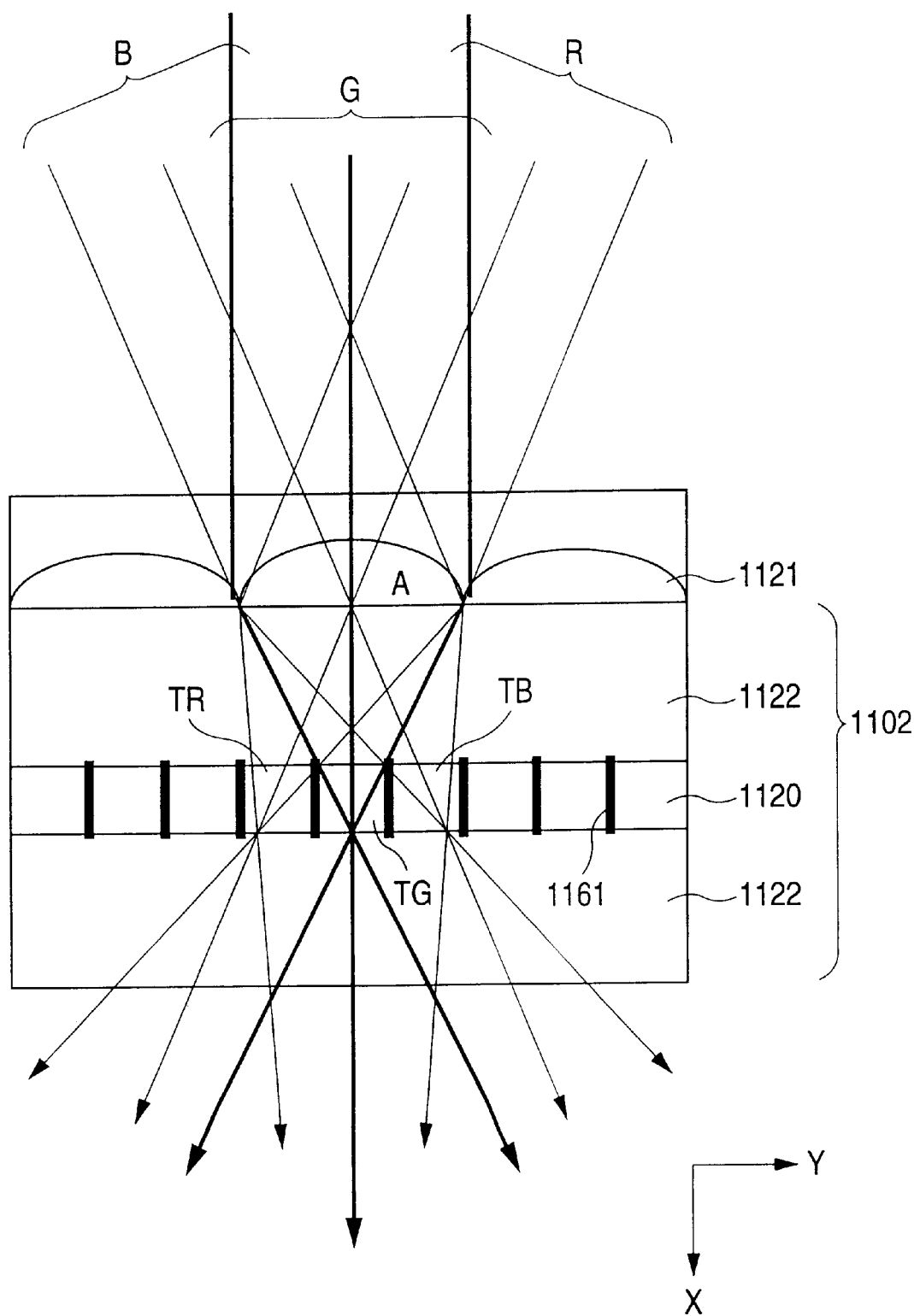
FIG. 60 is a schematic view of the optical modulation device according to the present invention.

As shown in FIG. 60, to prevent diffusion light in the polymer-dispersed liquid crystal from being incident on adjacent pixels of the optical modulation element 1102 to generate crosstalk, light shielding walls 1161 are preferably formed. With this arrangement, a higher-quality image can be easily displayed.

The color filter 1151 shown in FIG. 59 and the light shielding wall 1161 shown in FIG. 60 may be used together.

Figure 61:
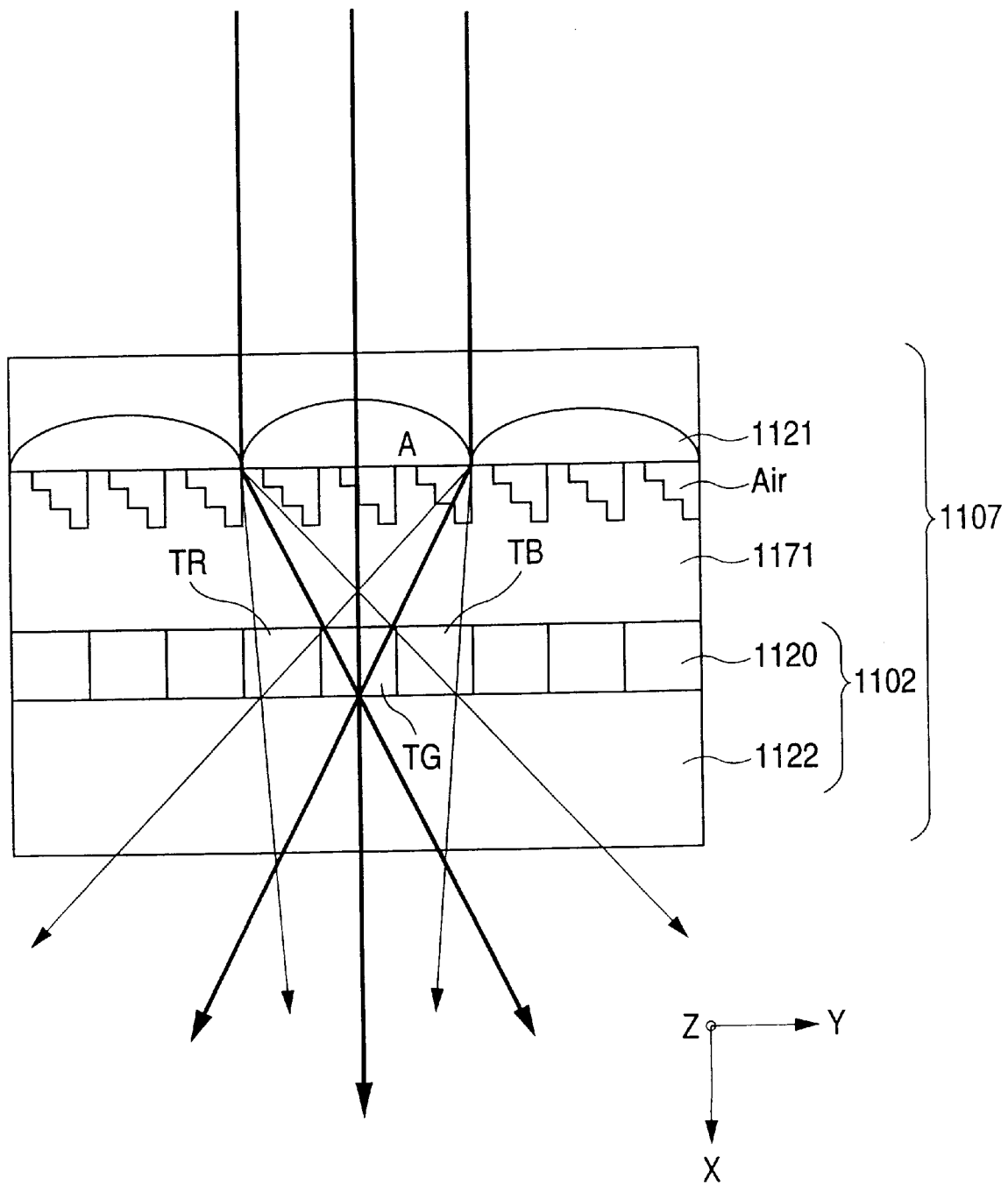
FIG. 61 is a schematic view of the fifteenth embodiment of the present invention.

FIG. 61 is a schematic view of the fifteenth embodiment of the present invention. The fifteenth embodiment has the same arrangement as that of the fourteenth embodiment shown in FIG. 54 except that a transmission diffraction grating 1171 is used as a color separation means in place of the reflection diffraction grating of the fourteenth embodiment arranged between a microlens array 1121 and a control target portion 1120 of an optical modulation element 1102, and these elements are integrated into one optical member 1107.

In this embodiment, a plane (X-Z plane) defined by the optical axis of white light incident on the diffraction grating 1171 and the optical axis of 0th-order diffraction light emerging from the diffraction grating 1171 is set to be parallel to the grating direction of the diffraction grating, and the light obliquely strikes the grating plane at an arbitrary incident angle other than 0°. In comparison to a case wherein the light is perpendicularly incident on the transmission diffraction grating, the grating thickness can be decreased, and the apparatus can be made smaller. With this arrangement, the same effect as that of the fourteenth embodiment is obtained.

In this embodiment, the diffraction grating 1171 and the optical modulation element 1102 are integrated.

However, these elements may be independently arranged. In addition, the arrangement positions of the microlens array 1121 and the diffraction grating 1102 may be reversed.

Even when the diffraction grating (either a transmission type or a reflection type) is constituted such that R, G, and B. light components emerging from the optical modulation element 1102 are synthesized, the same effect as described above can be obtained.

Figure 62:
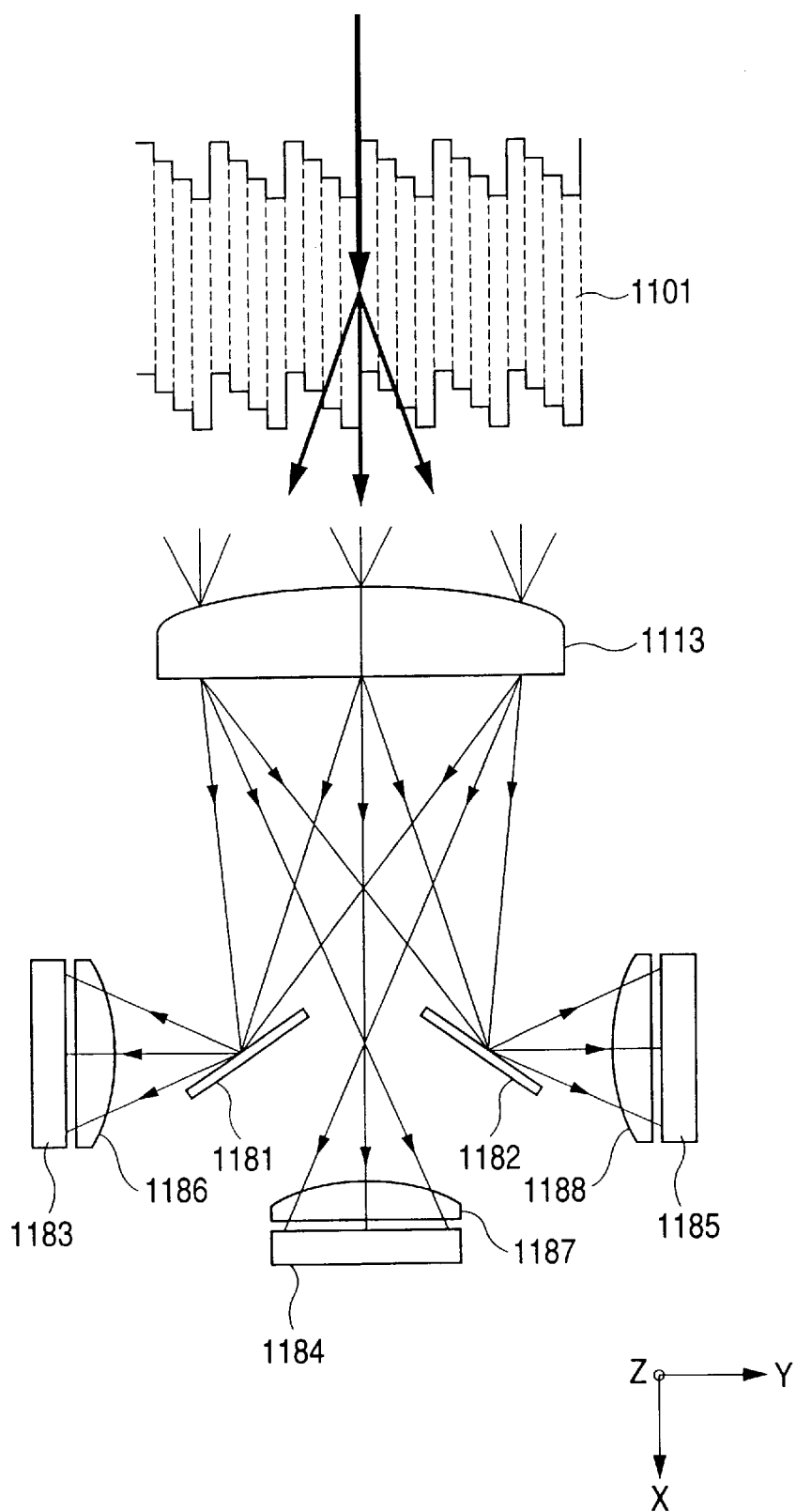
FIG. 62 is a schematic view of the sixteenth embodiment of the present invention.
Figure 63:
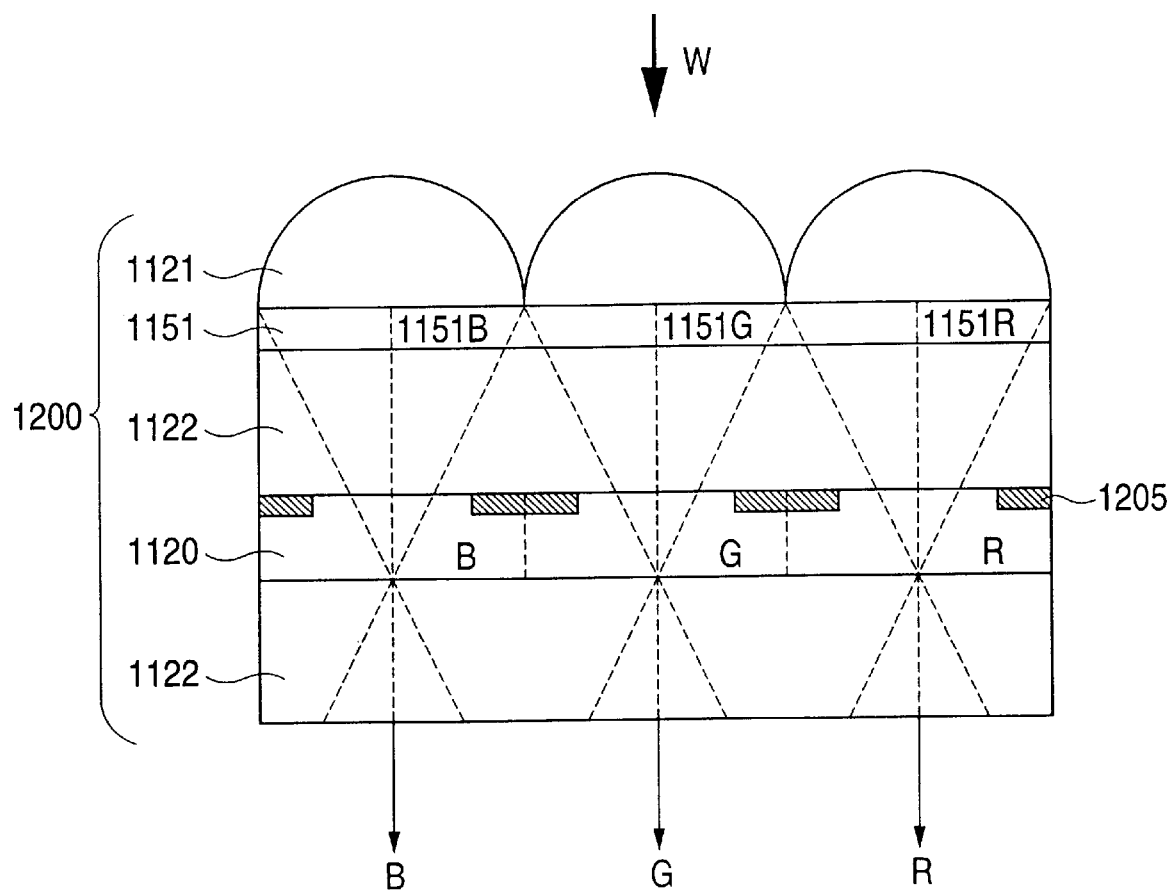
FIG. 63 is a schematic view of a conventional optical modulation device.

FIG. 62 is a schematic view of the sixteenth embodiment of the present invention. In FIG. 62, the apparatus includes a reflection one-dimensional binary diffraction grating 1101. A plane (X-Z plane) defined by the optical axis of white light incident on the diffraction grating 1101 and the optical axis of 0th-order diffraction light emerging from the diffraction grating 1101 is set to be parallel to the grating direction of the diffraction grating 1101, and the light enters the grating plane at an arbitrary incident angle other than 0°.

Condenser lenses 1113, 1186, 1187, and 1188 and high-reflection mirrors 1181, 1182, 1183, 1184, and 1185 are transmission optical modulation elements. Each of the optical modulation elements 1183 to 1185 is constituted by an optical modulation control portion (not shown), an optical modulation control target portion, two transparent substrates for holding the optical modulation target control portion made of a TN liquid crystal, and two polarizing plates adjacent to the two transparent substrates and set in a crossed nicol arrangement.

In this embodiment, an optical modulation element having a high light utilization efficiency is realized without using any microlens array.

In this embodiment, light beams emerging from the optical modulation elements 1183 to 1185 are synthesized into an image on a screen through three projecting lenses (not shown), or the three images are synthesized by a dichroic mirror or the like and then projected on the screen through one projection optical system, thereby obtaining the same effect as in the fourteenth embodiment. If the optical modulation elements have the same size, a color image display apparatus having a higher resolution can be easily realized.

In this embodiment, transmission optical modulation elements are used. However, even when reflection optical modulation elements each having an optical modulation control portion covered with a reflection surface are used to synthesize light beams emerging therefrom into an image on the screen through one projection optical system, the same effect as described above can be obtained.

In this embodiment, the TN liquid crystal is used for the optical modulation control target portion. However, any other liquid crystal may be used. When a polymer dispersed liquid crystal is to used, as in the fourteenth embodiment, it may be combined with not the pair of polarizing plates but a Schlieren optical system to obtain same effect as described above.

What is claimed is:

1. A projecting apparatus having optical modulation elements arranged for a plurality of color light components, which illuminates said optical modulation elements with the respective color light components, and superposes and projects pieces of image information displayed on said optical modulation elements on a predetermined surface through a projecting lens, wherein the color light components from the image information are guided near an entrance pupil of said projecting lens through condenser lenses arranged in units of color light components, the guided color light components are at least partially guided to said projecting lens through a mirror provided near the entrance pupil, and a light shielding member is inserted in an optical path between said mirror and said projecting lens to partially shield the light beam guided to said projecting lens.

2. An apparatus according to claim 1, wherein said light shielding member is arranged for each of color light components from the pieces of image information.

3. An apparatus according to claim 1, wherein a plurality of mirrors are arranged near the entrance pupil, and said light shielding member is arranged for each of said plurality of mirrors.

4. An apparatus according to claim 2 or 3, wherein said plurality of light shielding members are tilted with respect to an optical axis of said projecting lens.

5. An apparatus according to claim 3, wherein said plurality of light shielding members are tilted with respect to an optical axis of said projecting lens, and an opening of a light beam passage area has a partially elliptical shape for shielding the light beam.

6. A apparatus according to claim 1, wherein said plurality of light shielding members are adapted to be exchanged or displaced to change an amount of each color light component incident on the entrance pupil area of said projecting lens.

7. An apparatus according to claim 1, wherein a plurality of mirrors are arranged near the entrance pupil, and divide an area of the entrance pupil.

8. An apparatus according to claim 1, wherein a light beam from light source means is collimated by reflection means and sent to color separation means.

9. An apparatus according to claim 1, wherein said color separation means comprises a diffraction grating.

10. An apparatus according to claim 1, wherein a positive lens having a convex surface facing said projecting lens is arranged in front of each image information.

11. An apparatus according to claim 10, wherein said projecting-lens-side convex surface of said positive lens comprises an aspherical surface in which positive refracting power decreases with increasing distance from an optical axis.

12. An apparatus according to claim 11, wherein said aspherical surface comprises a hyperbolic surface.

13. A projection apparatus for projecting a full-color image onto a plane, said apparatus comprising:
three optical modulation elements for modulating three primary color light components;
an illumination optical system for illuminating each of said three primary optical modulation elements with corresponding one of said three primary color light components; and
a projection optical system for projecting said modulated three primary color light components from said three optical modulation elements onto said plane,
wherein said projection optical system comprise a projection lens, a first reflector and a second reflector for reflecting the modulated primary color light component from at least one optical modulation element to said projection lens, and a corrector for correcting an illuminance unevenness on the plane of said modulated primary color light component reflected by said first and second reflectors,
wherein said correction means has a drive circuit for varying a magnitude of a modulation signal of said optical modulation element, and
wherein said optical modulation element is adapted to be switched between a transmission mode and a scattering mode as a nontransmission mode, and the modulation signal sets said optical modulation element in the transmission mode.

14. A projection apparatus for projecting a full-color image onto a plane, said apparatus comprising:
three optical modulation elements for modulating three primary color light components;
an illumination optical system for illuminating each of said three primary optical modulation elements with corresponding one of said three primary color light components; and
a projection optical system for projecting said modulated three primary color light components from said three optical modulation elements onto said plane,
wherein said projection optical system comprise a projection lens, a first reflector, a second reflector and a third reflector for reflecting the modulated primary color light component from at least one optical modulation element to said projection lens, and a corrector for correcting an illuminance unevenness on the plane of said modulated primary color light component reflected by said first, second and third reflectors.

15. A projection apparatus for projecting a full-color image onto a plane, said apparatus comprising;
three optical modulation elements for modulating three primary color light components;
an illumination optical system for illuminating each of said three primary optical modulation elements with corresponding one of said three primary color light components; and
a projection optical system for projecting said modulated three primary color light components from said three optical modulation elements onto said plane,
wherein said projection optical system comprise a projection lens, a first reflector and a second reflector for reflecting the modulated primary color light component from at least one optical modulation element to said projection lens, and a corrector for correcting an illuminance unevenness on the plane of said modulated primary color light component reflected by said first and second reflectors wherein said correction means comprises a light attenuation member for varying amounts of the color light components for illuminating said optical modulation elements.

16. A projection apparatus
for projecting a full-color image onto a plane, said apparatus comprising:
a plurality of optical modulation elements for modulating color light components:
an illumination optical system for illuminating each of said plurality of optical modulation elements with corresponding one of said color light components; and
a projection optical system for projecting modulated color light components from said optical modulation elements onto said plane,
wherein said projection optical system comprises a projection lens, at least one reflector for reflecting the modulated color component from at least one optical modulation element to said projection lens, and a corrector for correcting an illuminance unevenness on the plane of said modulated color light component reflected by said at least one reflector.

17. An apparatus according to claim 16, wherein said correction means has a drive circuit for varying a magnitude of a modulation signal of said optical modulation element.

18. An apparatus according to claim 16, wherein said correction means comprises a light shielding member or a light attenuation member arranged between said reflection means and said projecting lens.

19. An apparatus according to claim 16, wherein said correction means comprises a light attenuation member for varying amounts of the color light components for illuminating said optical modulation elements.

20. A projection apparatus
for projecting a full-color image onto a plane, said apparatus comprising;
three optical modulation elements for modulating three primary color light components;
an illumination optical system for illuminating each of said three primary optical modulation elements with corresponding one of said three primary color light components: and
a projection optical system for projecting said modulated three primary color light components from said three optical modulation elements onto said plane,
wherein said projection optical system comprise a projection lens, a first reflector and a second reflector for reflecting the modulated primary color light component from at least one optical modulation element to said projection lens, and a corrector for correcting an illuminance unevenness on the plane of said modulated primary color light component reflected by said first and second reflectors.

21. An apparatus according to claim 16 or 20, wherein said optical modulation element comprises a reflect ion liquid crystal display element.

22. An apparatus according to claim 20, wherein said correction means comprises a light shielding member or a light attenuation member inserted between said projecting lens and each of said reflection mirrors.

23. An apparatus according to claim 20, wherein said correction means has a drive circuit for varying a magnitude of a modulation signal of said optical modulation element.

24. An apparatus according to claim 16 or 20, further comprising two light source units for emitting the three primary color light components.

25. An apparatus according to claim 16 or 20, further comprising a white light source, and color separation means for separating a light beam from said white light source into the three primary color light components.

26. An apparatus according to claim 25, wherein said color separation means comprises a diffraction grating.

27. An apparatus according to claim 25, wherein said color separation means comprises a plurality of dichroic mirrors.

28. An apparatus according to claim 16 or 20, wherein said optical modulation element comprises a transmission liquid crystal display element.

29. An optical modulation device which comprises a diffraction grating for separating incident light into a plurality of color light components, and an optical modulation element having a plurality of pixels to optically modulate the incident light in units of pixels, and sends the color light components generated from said diffraction grating when the light beam is obliquely incident on said diffraction grating to said pixels of said optical modulation element, which are arranged in units of-color light components, thereby performing optical modulation, wherein said diffraction grating comprises a one-dimensional grating, and a plane defined by a central axis of the light beam incident on said diffraction grating and a central axis of 0th-order diffraction light from said diffraction grating is parallel to a grating direction of said diffraction grating.

30. An optical modulation device which comprises a diffraction grating for separating incident light into a plurality of color light components, and optical modulation elements arranged in units of color light components and having a plurality of pixels to optically modulate the incident light in units of pixels, and sends the color light components generated from said diffraction grating when the light beam is obliquely incident on said diffraction grating to said plurality of optical modulation elements, thereby performing optical modulation, wherein said diffraction grating comprises a one-dimensional grating, and a plane defined by a central axis of the light beam incident on said diffraction grating and a central axis of 0th-order diffraction light from said diffraction grating is parallel to a grating direction of said diffraction grating.

31. A projecting apparatus for projecting an image displayed on an optical modulation element of an optical modulation apparatus of claim 29 or 30 on a predetermined surface.

32. A device according to claim 29 or 30, wherein said diffraction grating comprises a one-dimensional binary diffraction grating.

33. A device according to claim 32, wherein said one-dimensional binary diffraction grating has an echelon step structure having uneven step widths.

34. A device according to claim 29 or 30, wherein the color light components from said diffraction grating are sent to said pixels of said optical modulation element through a condenser lens.

35. A device according to claim 29 or 30, further comprising color filters corresponding to the respective color light components and arranged in optical paths of the color light components incident on said plurality of pixels of said optical modulation element at a position where the color light components are spatially separated.

36. A device according to claim 29 or 30, wherein said plurality of pixels are formed from a liquid crystal.

37. A device according to claim 36, wherein the liquid crystal is a polymer dispersed liquid crystal.

38. A device according to claim 37, wherein light shielding walls are formed between said plurality of pixels.

39. A device according to claim 36, wherein the liquid crystal is a TN liquid crystal.

40. A device according to claim 29 or 30, wherein the light beams modulated by said pixels of said optical modulation element are reflected by reflection means and output.

* * * * *

UNITED STATES PATENT AND TRADEMARK OFFICE
CERTIFICATE OF CORRECTION

PATENT NO.    : 6,188,529 B1
DATED         : February 13, 2001
INVENTOR(S)   : Osamu Koyama et al.

Page 1 of 1

It is certified that error appears in the above-identified patent and that said Letters Patent is hereby corrected as shown below:

<u>Title page,</u>
Item [75], the addresses for the inventors should read as follows: -- Osamu Koyama, Tokyo, Japan; Junko Kuramochi, Kanagawa-ken, Japan; and Saburo Sugawara, Kanagawa-ken, Japan --

<u>Column 18,</u>
Line 58, "convention al" should read -- conventional --
Line 59, "FIG. 4b" should read -- FIG. 4, --

<u>Column 19,</u>
Line 2, "pest-order" should read -- $\pm 1^{st}$-order --

<u>Column 20,</u>
Line 43, "341" should read -- 34' --
Line 50, "341" should read -- 34' --
Line 56, "356" should read -- 35' --

<u>Column 30,</u>
Line 1, "30a" should read -- 30' --
Line 5, " 219' " should read -- 21', --
Line 10, "crystal 25 panel" should read -- crystal panel --
Line 15, " 30' " should read -- 30° --

<u>Column 46, claim 21,</u>
Line 56, "a reflect ion" should read -- reflection --

Signed and Sealed this

Ninth Day of April, 2002

Attest:

*Attesting Officer*

JAMES E. ROGAN
*Director of the United States Patent and Trademark Office*